US012358056B2

(12) United States Patent
Koike

(10) Patent No.: US 12,358,056 B2
(45) Date of Patent: Jul. 15, 2025

(54) CUTTING TOOL, MODULE, CUTTING TOOL UNIT, AND CUTTING SYSTEM

(71) Applicant: Sumitomo Electric Industries, Ltd., Osaka (JP)

(72) Inventor: Yusuke Koike, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 682 days.

(21) Appl. No.: 17/639,343

(22) PCT Filed: Aug. 31, 2020

(86) PCT No.: PCT/JP2020/032804
§ 371 (c)(1),
(2) Date: Mar. 1, 2022

(87) PCT Pub. No.: WO2021/044989
PCT Pub. Date: Mar. 11, 2021

(65) Prior Publication Data
US 2022/0324032 A1 Oct. 13, 2022

(30) Foreign Application Priority Data
Sep. 3, 2019 (JP) .................................. 2019-160746

(51) Int. Cl.
*B23B 27/16* (2006.01)
(52) U.S. Cl.
CPC .................................... *B23B 27/16* (2013.01)

(58) Field of Classification Search
CPC ............ B23B 25/06; B23B 2260/1285; B23B 2260/128; B23B 2270/48; B23B 2270/483; B23C 2260/76; B23Q 17/0952; B23Q 17/0976; B23Q 17/098; B23Q 17/0985; B23Q 17/12
See application file for complete search history.

(56) References Cited

U.S. PATENT DOCUMENTS

| 3,754,487 | A | * | 8/1973 | Nachtigal | ............... | B23B 29/12 82/1.11 |
| 4,444,061 | A | | 4/1984 | Mathias | | |
| 4,555,955 | A | * | 12/1985 | Morgan | ................ | G01L 5/1627 73/862.06 |
| 6,531,861 | B1 | * | 3/2003 | Jacobsen | .............. | H10N 30/306 257/E29.022 |
| 6,661,157 | B1 | * | 12/2003 | Lundblad | .............. | F16F 15/005 310/326 |
| 6,694,213 | B2 | * | 2/2004 | Claesson | ............... | F16F 15/005 82/158 |
| 6,729,212 | B2 | * | 5/2004 | Muller | ................... | B23Q 17/20 82/112 |

(Continued)

FOREIGN PATENT DOCUMENTS

| CN | 104139322 A | 11/2014 |
| CN | 106112694 A | 11/2016 |

(Continued)

*Primary Examiner* — Nicole N Ramos
(74) *Attorney, Agent, or Firm* — XSENSUS LLP

(57) ABSTRACT

A cutting tool includes a shaft portion. The shaft portion includes an increased-diameter portion having a diameter larger than a diameter of other portion of the shaft portion.

(Continued)

The increased-diameter portion has a recessed portion formed in a peripheral surface of the increased-diameter portion.

11 Claims, 56 Drawing Sheets

(56) References Cited

U.S. PATENT DOCUMENTS

| | | | | |
|---|---|---|---|---|
| 6,925,915 | B1* | 8/2005 | Claesson | G05B 19/18 |
| | | | | 82/904 |
| 7,490,536 | B2* | 2/2009 | Murakami | B23B 29/022 |
| | | | | 82/158 |
| 7,591,209 | B2* | 9/2009 | Murakami | B23B 29/022 |
| | | | | 82/158 |
| 11,285,543 | B2* | 3/2022 | Ostling | B23Q 17/12 |
| 2002/0033083 | A1* | 3/2002 | Claesson | B23Q 11/0032 |
| | | | | 82/133 |
| 2002/0036091 | A1* | 3/2002 | Claesson | F16F 15/005 |
| | | | | 82/904 |
| 2002/0083805 | A1* | 7/2002 | Lundblad | B23Q 11/0039 |
| | | | | 82/163 |
| 2009/0175694 | A1* | 7/2009 | Craig | B23B 51/00 |
| | | | | 700/173 |
| 2012/0269590 | A1* | 10/2012 | Buck | B23Q 17/2225 |
| | | | | 408/16 |
| 2014/0140781 | A1* | 5/2014 | Sjoo | B23F 21/166 |
| | | | | 408/8 |
| 2016/0045994 | A1 | 2/2016 | Jayr et al. | |
| 2016/0303698 | A1 | 10/2016 | Takahashi et al. | |
| 2019/0358709 | A1* | 11/2019 | Chen | B23B 29/12 |
| 2022/0274183 | A1* | 9/2022 | Hashimoto | B23Q 17/0985 |

FOREIGN PATENT DOCUMENTS

| | | | | |
|---|---|---|---|---|
| CN | 106181578 | A * | 12/2016 | ......... B23Q 17/0952 |
| CN | 106312689 | A * | 1/2017 | ............... B06B 1/02 |
| CN | 110103076 | A | 8/2019 | |
| EP | 0203490 | A1 * | 12/1986 | |
| EP | 2 051 041 | A2 | 4/2009 | |
| EP | 2050535 | A1 * | 4/2009 | ............ B23B 29/04 |
| JP | 59-500429 | A | 3/1984 | |
| JP | 9-174384 | A | 7/1997 | |
| JP | 2010-105095 | A | 5/2010 | |
| JP | 2012-4490 | A | 1/2012 | |
| JP | 2015-77658 | A | 4/2015 | |
| JP | 2018043339 | A * | 3/2018 | ............ B23B 27/00 |
| JP | 2020062746 | A * | 4/2020 | |
| KR | 10-1407861 | B1 | 6/2014 | |
| SE | 503189 | C2 * | 4/1996 | ........ B23Q 17/0966 |
| WO | WO-2015011489 | A1 * | 1/2015 | ........ B23Q 17/0966 |
| WO | WO-2015022967 | A1 * | 2/2015 | ......... B23K 20/1255 |
| WO | WO-2018029308 | A1 * | 2/2018 | ....... B23B 29/03403 |
| WO | 2019/121189 | A1 | 6/2019 | |
| WO | WO-2020173562 | A1 * | 9/2020 | ........ B23Q 17/0966 |

* cited by examiner

CUTTING TOOL, MODULE, CUTTING TOOL UNIT, AND CUTTING SYSTEM

CROSS-REFERENCE TO RELATED APPLICATIONS

The present application is based on PCT/JP2020/032804 filed on Aug. 31, 2020, which claims priority to Japanese Application No. 2019-160746, filed Sep. 3, 2019, the entire contents of each are incorporated herein by reference.

TECHNICAL FIELD

The present disclosure relates to a cutting tool, a module, a cutting tool unit, and a cutting system.

BACKGROUND ART

Patent Literature 1 (Japanese Unexamined Patent Application Publication No. 2010-105095) discloses the following cutting tool. The cutting tool has a head piece in which a cutting blade is provided at a tip of a body portion and a chip flute extending from a position along the cutting blade to a back surface of the body portion is provided on an outer periphery of the body portion. In a chip recovery type cutting tool in which the head piece is connected to a tip of a hollow shaft through which an air flow for chip evacuation is passed, the head piece is provided with a step portion for changing a rear outside diameter of the body portion and a small-diameter portion disposed behind the step portion, the small-diameter portion is fitted into a through-hole at the tip of the hollow shaft, and the step portion is brought into contact with the tip of the hollow shaft.

CITATION LIST

Patent Literature

Patent Literature 1: Japanese Patent Laid-Open No. 2010-105095

SUMMARY OF THE INVENTION

A cutting tool according to the present disclosure includes a shaft portion. The shaft portion includes an increased-diameter portion having a diameter larger than a diameter of other portion of the shaft portion. The increased-diameter portion includes a recessed portion formed in a peripheral surface of the increased-diameter portion.

A cutting tool according to the present disclosure includes a shaft portion. The shaft portion includes a recessed portion formed in a peripheral surface of the shaft portion and a sensor mounting portion that is provided near the recessed portion and to which a strain sensor is mountable.

A module according to the present disclosure is a module mountable to a shaft portion of a cutting tool including the shaft portion. The module includes a body that has a cylindrical shape allowing insertion of the shaft portion and that is mountable to the shaft portion so that an inner peripheral surface of the body covers a peripheral surface of the shaft portion. The body includes a recessed portion formed in an outer peripheral surface of the body.

A module according to the present disclosure is a module mountable to a shaft portion of a cutting tool including the shaft portion. The module includes a columnar body that is mountable to the shaft portion in an axial direction of the shaft portion. The body includes a recessed portion formed in a peripheral surface of the body, and a sensor mounting portion that is provided near the recessed portion and to which a strain sensor is mountable.

A cutting tool unit according to the present disclosure includes a cutting tool having a shaft portion and a module mountable to the shaft portion. The module includes a body that has a cylindrical shape allowing insertion of the shaft portion and that is mountable to the shaft portion so that an inner peripheral surface of the body covers a peripheral surface of the shaft portion. The body includes a recessed portion in an outer peripheral surface of the body.

A cutting tool unit according to the present disclosure includes a cutting tool having a shaft portion and a module mountable to the shaft portion. The module includes a columnar body mountable to the shaft portion in an axial direction of the shaft portion. The body includes a recessed portion formed in a peripheral surface of the body, and a sensor mounting portion that is provided near the recessed portion and to which a strain sensor is mountable.

A cutting system according to the present disclosure includes a cutting tool and a management device. The cutting tool includes a shaft portion. The shaft portion has an increased-diameter portion having a diameter larger than a diameter of other portion of the shaft portion. The increased-diameter portion includes a recessed portion formed in a peripheral surface of the increased-diameter portion. The cutting tool further includes a strain sensor mounted to the shaft portion. The cutting tool transmits sensor information indicating a measurement result of the strain sensor. The management device receives the sensor information from the cutting tool and processes the measurement result indicated by the received sensor information.

A cutting system according to the present disclosure includes a cutting tool unit and a management device. The cutting tool unit includes a cutting tool having a shaft portion, and a module mountable to the shaft portion. The module includes a body that has a cylindrical shape allowing insertion of the shaft portion and that is mountable to the shaft portion so that an inner peripheral surface of the body covers a peripheral surface of the shaft portion. The body includes a recessed portion formed in an outer peripheral surface of the body. The cutting tool unit further includes a strain sensor mounted to the module. The cutting tool unit transmits sensor information indicating a measurement result of the strain sensor. The management device receives the sensor information from the cutting tool unit and processes the measurement result indicated by the received sensor information.

A cutting system according to the present disclosure includes a cutting tool unit and a management device. The cutting tool unit includes a cutting tool having a shaft portion, and a module mountable to the shaft portion. The module includes a columnar body that is mountable to the shaft portion in an axial direction of the shaft portion. The body includes a recessed portion formed in a peripheral surface of the body, and a sensor mounting portion that is provided near the recessed portion and to which a strain sensor is mountable. The cutting tool unit further includes a strain sensor mounted to the module. The cutting tool unit transmits sensor information indicating a measurement result of the strain sensor. The management device receives the sensor information from the cutting tool unit and processes the measurement result indicated by the received sensor information.

A cutting tool according to the present disclosure includes a blade mounting portion and a shaft portion connected to the blade mounting portion. In a cross section perpendicular to a central axis of the shaft portion, the shaft portion has a rod shape having a circular or a polygonal peripheral surface. The shaft portion includes a first section that is a part along a direction of the central axis, a second section adjacent to one side of the first section in the direction of the central axis, and a third section adjacent to the other side of the first section in the direction of the central axis. A rigidity of the first section is lower than a rigidity of the second section and a rigidity of the third section.

A cutting tool according to the present disclosure includes a shaft portion. The shaft portion has an increased-diameter portion having a diameter larger than a diameter of other portion of the shaft portion. The increased-diameter portion includes a hollow portion formed inside the increased-diameter portion.

A cutting tool according to the present disclosure includes a shaft portion. The shaft portion includes a hollow portion formed inside the shaft portion and a sensor mounting portion to which a strain sensor is mountable at a peripheral surface of the shaft portion. The sensor mounting portion overlaps the hollow portion when the hollow portion is projected to the peripheral surface of the shaft portion in a direction perpendicular to a direction of a central axis of the shaft portion.

DETAILED DESCRIPTION

Figure 1:
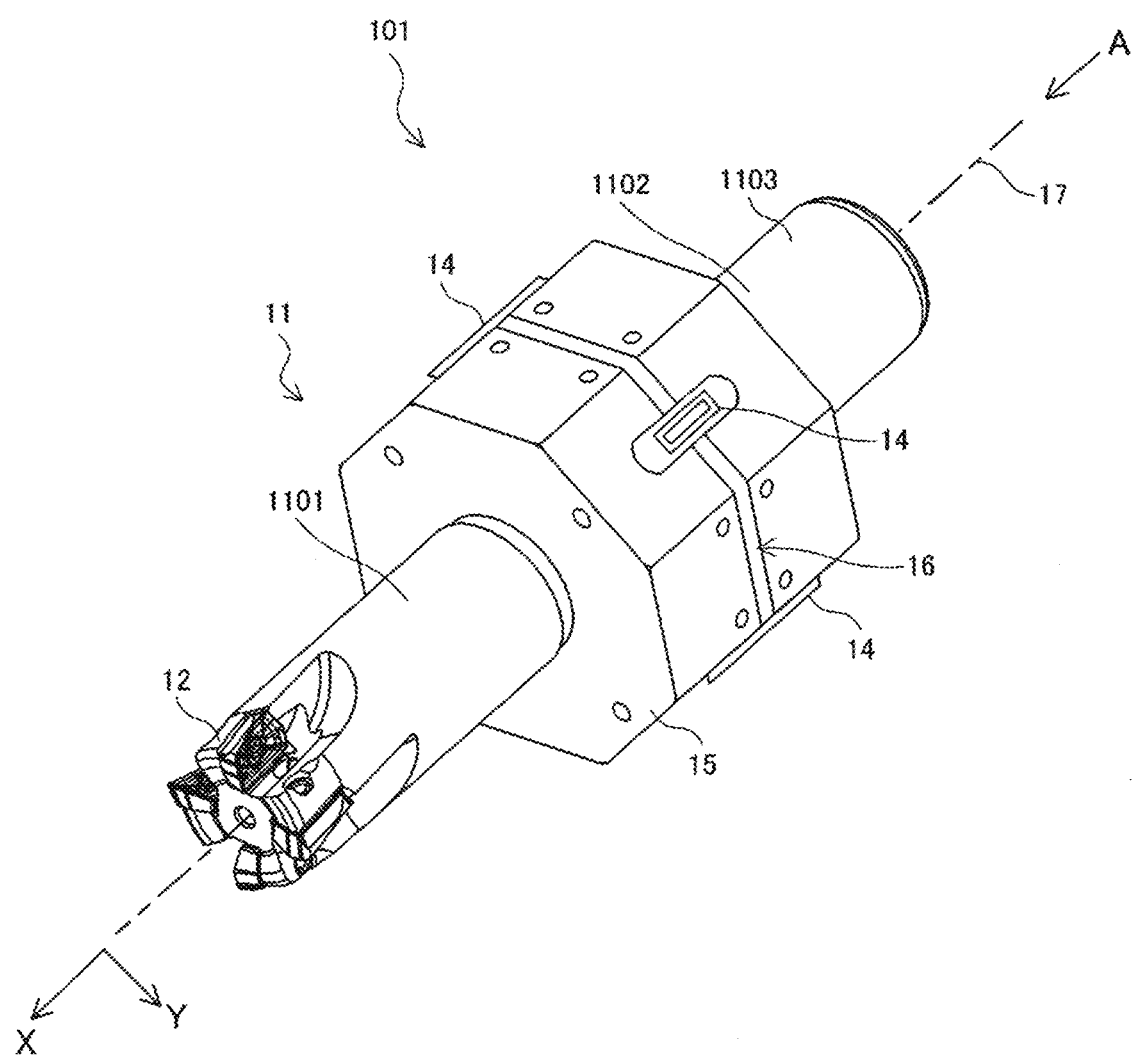
FIG. 1 is a perspective view illustrating a configuration of a cutting tool according to a first embodiment of the present disclosure.

Cutting tools such as milling cutters and drills have been developed in the past.

Problems to be Solved by the Present Disclosure

For example, a cutting force can be grasped by measuring a strain of a cutting tool caused by cutting. A superior technology that enables measurement of such a strain is desired.

The present disclosure has been made to solve the above-described problem, and an object of the present disclosure is to provide a cutting tool, a module, a cutting tool unit, and a cutting system that can accurately measure a strain of a cutting tool caused by cutting.

Effects of the Present Disclosure

According to the present disclosure, it is possible to accurately measure a strain of a cutting tool caused by cutting.

Description of Embodiment of the Present Disclosure

First, the contents of embodiments according to the present disclosure will be listed and described.

(1) A cutting tool according to an embodiment of the present disclosure includes a shaft portion. The shaft portion includes an increased-diameter portion having a diameter larger than a diameter of other portion of the shaft portion. The increased-diameter portion includes a recessed portion formed in a peripheral surface of the increased-diameter portion.

In this manner, a rigidity of the increased-diameter portion can be locally reduced with a configuration in which the shaft portion includes an increased-diameter portion and the increased-diameter portion has a recessed portion. As a result, a strain generated during cutting increases locally. Therefore, the strain of the cutting tool caused by cutting can be measured with a high accuracy by mounting a strain sensor to a portion of the increased-diameter portion where the rigidity is locally reduced.

(2) A cutting tool according to an embodiment of the present disclosure includes a shaft portion. The shaft portion includes a recessed portion formed in a peripheral surface of the shaft portion and a sensor mounting portion that is provided near the recessed portion and to which a strain sensor is mountable.

In this manner, by providing the sensor mounting portion in the shaft portion, a strain generated in the recessed portion and a periphery of the recessed portion can be detected by the strain sensor. Further, with such a configuration, for example, when a rigidity of the entire shaft portion is ensured to a certain degree, the rigidity of the shaft portion can be locally reduced. As a result, the strain generated during cutting increases locally. Therefore, the strain of the cutting tool caused by cutting can be measured with a high accuracy by mounting the strain sensor to a portion of the shaft portion where the rigidity is locally reduced.

(3) Preferably, the recessed portion is formed in a circumferential direction of the shaft portion, and has a rectangular shape when viewed in a cross section including a central axis of the shaft portion With such a configuration, a rigidity of the shaft portion in the circumferential direction of the shaft portion can be easily adjusted, and thus a strain in the circumferential direction can be easily adjusted. Further, the processing of the recessed portion is relatively easy. Therefore, the accuracy of the strain measurement of the cutting tool can be further ensured at the same time.

(4) Preferably, in a plane in which a central axis of the shaft portion is a normal line, the recessed portion has a shape that is point-symmetrical with respect to an intersection point where the central axis and the plane intersect each other.

With such a configuration, generation of an anisotropic strain can be suppressed. Therefore, for example, when multiple strain sensors are mounted to the peripheral surface of the shaft portion, the state of the cutting tool can be more accurately reflected in a measurement value of each of strain sensors.

(5) Preferably, in a plane in which a central axis of the shaft portion is a normal line, the shaft portion includes at least one set of the recessed portions provided at positions that are point-symmetrical with respect to an intersection point where the central axis and the plane intersect each other.

With such a configuration, generation of an anisotropic strain can be suppressed. Therefore, for example, when multiple strain sensors are mounted to the peripheral surface of the shaft portion, the state of the cutting tool can be more accurately reflected in a measurement value of each of strain sensors.

(6) More preferably, the one set of the recessed portions have identical widths and identical depths.

With such a configuration, it is possible to more reliably suppress generation of an anisotropic strain. Therefore, for example, when multiple strain sensors are mounted to the peripheral surface of the shaft portion, the state of the cutting tool can be more accurately reflected in a measurement value of each of strain sensors.

(7) Preferably, a shape of a bottom surface of the recessed portion in a cross section including a central axis of the shaft portion is rounded.

With such a configuration, it is possible to suppress generation of excessive stress concentration in a vicinity of a bottom surface of the recessed portion, and thus the durability of the cutting tool can be improved.

(8) Preferably, the shaft portion is provided with a mark indicating a position where a strain sensor is to be mounted.

With such a configuration, a user can mount the strain sensor to an appropriate position of the shaft portion. Therefore, it is possible to suppress a measurement value from being affected by a deviation of the mounting position of the strain sensor.

(9) Preferably, a distance from a bottom surface of the recessed portion to a central axis of the shaft portion is greater than or equal to a radius of a portion of the shaft portion other than the increased-diameter portion.

With such a configuration, the influence of a depth of the recessed portion on a displacement of the cutting edge can be reduced, so that a displacement amount of the cutting edge during cutting can be kept small.

(10) Preferably, a distance from a bottom surface of the recessed portion to a central axis of the shaft portion is less than a radius of a portion of the shaft portion other than the increased-diameter portion.

With such a configuration, an increase in strain locally generated during cutting is promoted, and thus the strain can be measured with a higher accuracy.

(11) Preferably, the cutting tool further includes a strain sensor mounted to the shaft portion.

With such a configuration, the strain sensor can be used to accurately measure a strain generated in the shaft portion during cutting.

(12) More preferably, the strain sensor is mounted to the shaft portion so as to span the recessed portion.

With such a configuration, since the strain sensor can be disposed in a portion where a larger strain is likely to appear, the strain of the cutting tool caused by cutting can be measured with a higher accuracy.

(13) Preferably, a width of the recessed portion is 0.1 mm or greater and 10 mm or less.

With such a configuration, the following effects can be achieved by the width of the recessed portion. That is, by adopting such a width, the influence of the width of the recessed portion on the displacement of the cutting edge can be reduced, so that a displacement amount of the cutting edge during cutting can be kept small. In addition, it is possible to reduce a possibility that opposing wall surfaces of the recessed portion come into contact with each other during cutting. Further, when the strain sensor is mounted so as to span the recessed portion, that is, the strain sensor is mounted in a bridge-like shape, since a relatively wide area of the strain sensor is in a state of floating in the air, a stress distribution in a vicinity of the center of the strain sensor becomes nearly uniform, and the influence on a measurement value due to a deviation of the mounting position of the strain sensor can be reduced.

(14) Preferably, a depth of the recessed portion is 2 mm or greater and 40 mm or less.

With such a configuration, the following effects can be achieved by the depth of the recessed portion. That is, by adopting such a depth, the influence of the depth of the recessed portion on a displacement of the cutting edge can be reduced, so that a displacement amount of the cutting edge during cutting can be kept small. In addition, since the effect of amplifying a strain is enhanced, the strain can be measured more accurately.

(15) A module according to an embodiment of the present disclosure is a module mountable to a shaft portion of a cutting tool including the shaft portion. The module includes a body having a cylindrical shape allowing insertion of the shaft portion. The body is mountable to the shaft portion so that an inner peripheral surface of the body covers a peripheral surface of the shaft portion. The body includes a recessed portion formed in an outer peripheral surface of the body.

As described above, a rigidity of the module is locally reduced with a configuration in which the module includes the cylindrical body mountable to the peripheral surface of the shaft portion and the recessed portion is formed in the body. Accordingly, when cutting is performed in a state where the module is mounted to the shaft portion, a strain generated in the module during cutting is locally increased. Therefore, by mounting a strain sensor to a portion of the module where the rigidity is locally reduced, the strain caused by cutting can be measured with a high accuracy.

(16) A module according to an embodiment of the present disclosure is a module mountable to a shaft portion of a cutting tool including the shaft portion. The module includes a columnar body mountable to the shaft portion in an axial direction of the shaft portion. The body includes a recessed portion formed in a peripheral surface of the body and a sensor mounting portion that is provided near the recessed portion and to which a strain sensor is mountable.

As described above, a rigidity of the module is locally reduced with a configuration in which the module includes the columnar body mountable to the shaft portion and the recessed portion is formed in a peripheral surface of the body. Accordingly, when cutting is performed in a state where the module is mounted to the shaft portion, a strain generated in the module during cutting is locally increased. Therefore, by mounting a strain sensor to a portion where the rigidity is locally reduced, the strain caused by cutting can be measured with a high accuracy.

(17) A cutting tool unit according to an embodiment of the present disclosure includes a cutting tool including a shaft portion, and the module described in (15) above.

As described above, a rigidity of the module is locally reduced with a configuration in which the module includes the cylindrical body mountable to the peripheral surface of the shaft portion and the recessed portion is formed in the body. Accordingly, when cutting is performed in a state where the module is mounted to the shaft portion, a strain generated in the module during cutting is locally increased. Therefore, by mounting a strain sensor to a portion of the module where the rigidity is locally reduced, the strain caused by cutting can be measured with a high accuracy.

(18) A cutting tool unit according to an embodiment of the present disclosure includes a cutting tool including a shaft portion, and the module described in (16) above.

As described above, a rigidity of the module is locally reduced with a configuration in which the module includes the columnar body mountable to the shaft portion and the recessed portion is formed in the peripheral surface of the body. Accordingly, when cutting is performed in a state where the module is mounted to the shaft portion, a strain generated in the module during cutting is locally increased. Therefore, by mounting a strain sensor to a portion of the module where the rigidity is locally reduced, the strain caused by cutting can be measured with a high accuracy.

(19) A cutting system according to an embodiment of the present disclosure includes the cutting tool described in (11) above and a management device. The cutting tool transmits sensor information indicating a measurement result of the strain sensor. The management device receives the sensor information from the cutting tool and processes the measurement result indicated by the received sensor information.

As described above, with a configuration in which the management device processes the measurement result indicated by the sensor information, for example, it is possible to estimate whether or not a blade portion is damaged and a life time of the blade portion on the basis of a position and a magnitude of a strain generated in the shaft portion.

(20) A cutting system according to an embodiment of the present disclosure includes the cutting tool unit described in (17) or (18) above and a management device. The cutting tool unit further includes a strain sensor mounted to the module. The cutting tool unit transmits sensor information indicating a measurement result of the strain sensor. The management device receives the sensor information from the cutting tool unit and processes the measurement result indicated by the received sensor information.

As described above, with a configuration in which the management device processes the measurement result indicated by the sensor information, for example, it is possible to estimate whether or not the blade portion is damaged and a life time of the blade portion on the basis of a position and a magnitude of a strain generated in the module.

(21) A cutting tool according to an embodiment of the present disclosure includes a blade mounting portion and a shaft portion connected to the blade mounting portion. In a cross section perpendicular to a central axis of the shaft portion, the shaft portion has a rod shape having a circular or a polygonal peripheral surface. The shaft portion includes a first section that is a part along a direction of the central axis, a second section adjacent to one side of the first section in the direction of the central axis, and a third section adjacent to the other side of the first section in the direction of the central axis. A rigidity of the first section is lower than a rigidity of the second section and a rigidity of the third section.

As described above, a rigidity of the shaft portion can be locally reduced with a configuration in which the shaft portion includes the first section. As a result, a strain generated during cutting increases locally. Therefore, the strain of the cutting tool caused by cutting can be measured with a high accuracy by mounting a strain sensor to a portion of the shaft portion where the rigidity is locally reduced.

(22) Preferably, the shall portion includes a cutting-side section that is continuous with the blade mounting portion, a gripping-side section including an end portion different from an end portion of the blade mounting portion side, and an intermediate section positioned between the cutting-side section and the gripping-side section. The intermediate section has, preferably, a shape thicker than the cutting-side section and the gripping-side section. The first section, the second section, and the third section are provided preferably in the intermediate section.

With such a configuration, it is possible to locally reduce a rigidity of the intermediate section having a diameter larger than a diameter of other portion of the shaft portion. As a result, a strain generated during cutting increases locally. Therefore, the strain of the cutting tool caused by cutting can be measured with a high accuracy by mounting a strain sensor to a portion where the rigidity is locally reduced.

(23) Preferably, the first section includes a recessed portion formed in a peripheral surface of the first section and a sensor mounting portion that is provided near the recessed portion and to which a strain sensor is mountable.

In this manner, by providing the sensor mounting portion in the shaft portion, a strain generated in the recessed portion and a periphery of the recessed portion can be detected by a strain sensor. Further, with such a configuration, for example, when a rigidity of the entire shaft portion is ensured to a certain degree, the rigidity of the shaft portion can be locally reduced. As a result, the strain generated during cutting increases locally. Therefore, the strain of the cutting tool caused by cutting can be measured with a high accuracy by mounting the strain sensor to a portion of the shaft portion where the rigidity is locally reduced.

(24) Preferably, the first section includes a recessed portion formed in a peripheral surface of the first section.

In this manner, with a configuration in which the first section of the shaft portion has the recessed portion, a rigidity of the shaft portion can be locally reduced. As a result, a strain generated during cutting increases locally. Therefore, the strain of the cutting tool caused by cutting can be measured with a high accuracy by mounting a strain sensor to a portion where the rigidity is locally reduced.

(25) Preferably, the first section may include a hollow portion formed inside the first section.

In this manner, since the hollow portion is formed inside the first section, processing heat is conducted so as to avoid the hollow portion inside the shaft portion and is conducted in a vicinity of the peripheral surface of the shaft portion. Therefore, by measuring a temperature of the peripheral surface of the shaft portion, a thermal strain generated in the shaft portion can be grasped, and the strain can be measured more accurately.

(26) A cutting tool according to an embodiment of the present disclosure includes a shaft portion. The shaft portion includes an increased-diameter portion having a diameter larger than a diameter of other portion of the shaft portion. The increased-diameter portion includes a hollow portion formed inside the increased-diameter portion.

In this manner, since the hollow portion is formed inside the increased-diameter portion, the processing heat is conducted so as to avoid the hollow portion inside the increased-diameter portion and is conducted in a vicinity of the peripheral surface of the increased-diameter portion. Therefore, by measuring a temperature of the peripheral surface of the increased-diameter portion, a thermal strain generated in the increased-diameter portion can be grasped, and the strain can be measured more accurately.

(27) A cutting tool according to an embodiment of the present disclosure includes a shaft portion. The shaft portion has a hollow portion formed inside the shaft portion and a sensor mounting portion to which a strain sensor is mountable at a peripheral surface of the shaft portion. The sensor mounting portion overlaps the hollow portion when the hollow portion is projected to the peripheral surface of the shaft portion in a direction perpendicular to a direction of a central axis of the shaft portion.

As described above, since the hollow portion is formed inside the shaft portion, the processing heat is conducted so as to avoid the hollow portion inside the shaft portion and is conducted in a vicinity of the peripheral surface of the shaft portion. Therefore, by measuring a temperature of the peripheral surface of the shaft portion, a thermal strain generated in the shaft portion can be grasped, and the strain can be measured more accurately.

Hereinafter, embodiments according to the present disclosure will be described with reference to the drawings. In the description, like or corresponding elements are denoted by like reference numerals and descriptions thereof will not be repeated. Further, at least a part of the embodiments described below may be optionally combined.

First Embodiment

FIG. 1 is a perspective view illustrating a configuration of a cutting tool according to a first embodiment of the present disclosure.

A cutting tool 101 is, for example, an end mill used in a milling machine or the like, and is used to cut a to-be-cut object made of metal or the like.

Referring to FIG. 1, cutting tool 101 includes a shaft portion 11, a blade mounting portion 12, a blade portion (not illustrated), and a strain sensor 14. Note that cutting tool 101 may have a configuration without the blade portion. Further, the blade portion may be integrally fixed to blade mounting portion 12, or may be detachably mounted to blade mounting portion 12.

Figure 4:
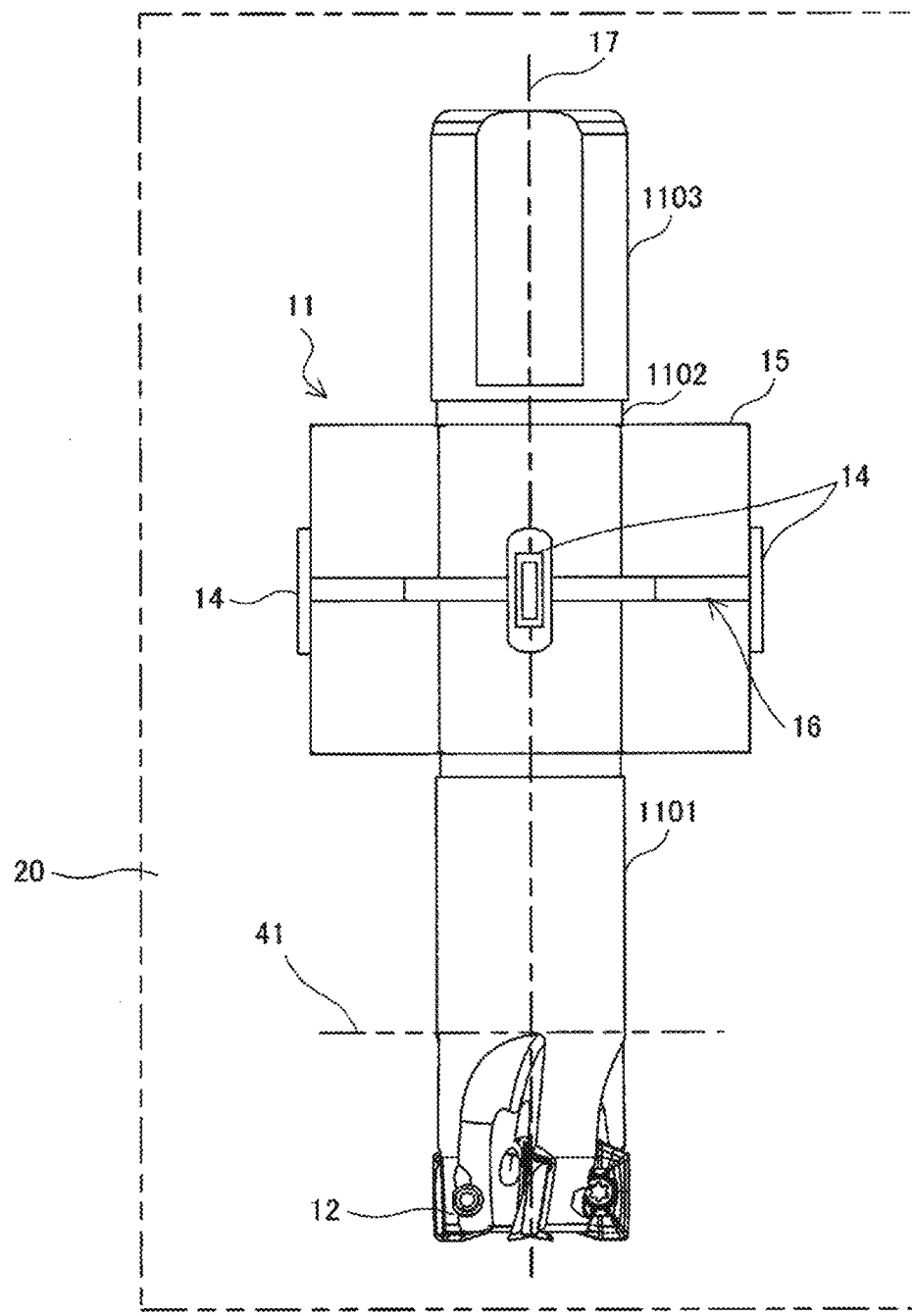
FIG. 4 is a side view illustrating a configuration of a cutting tool according to the first embodiment of the present disclosure.

In an example illustrated in FIG. 4, a boundary between shaft portion 11 and blade mounting portion 12 is indicated by a two-dot chain line 41.

Shaft portion 11 is rod-shaped with a circular or polygonal peripheral surface in a cross section perpendicular to a central axis 17 of shaft portion 11. A base material of shaft portion 11 is made of, for example, cemented carbide for cutting tools or steel for dies.

Technical Problem

By measuring a strain of a cutting tool caused by cutting, a cutting force can be grasped, for example. A superior technology that can measure such strain is desired. However, since a cutting tool is manufactured with a high rigidity, a generated strain is small, and it may be difficult to measure the strain as it is.

In order to solve such a problem, it is conceivable to intentionally reduce a rigidity of a cutting tool. However, if the rigidity of the cutting tool is simply reduced, a displacement of the cutting tool due to a cutting force increase, which may make it difficult to perform precise cutting and may reduce a durability of the cutting tool.

Therefore, a cutting tool according to an embodiment of the present disclosure solves such a problem, with the following configurations.

Shaft portion 11 includes an increased-diameter portion 15 that has a diameter larger than a diameter of other portion of the shaft portion.

Specifically, in shaft portion 11, an increased-diameter portion 15 whose diameter increases in a perpendicular direction Y, which is a direction perpendicular to a longitudinal direction X, is provided in an area (intermediate section) of the shaft portion 11 along an axial direction of cutting tool 101, specifically, along longitudinal direction X.

In shaft portion 11, cutting-side section 1101 is provided in a portion close to a blade mounting portion 12 of increased-diameter portion 15 which is the intermediate section. Cutting-side section 1101 extends from increased-diameter portion 15 toward blade mounting portion 12 and includes one end portion of shaft portion 11, that is, an end portion of shaft portion 11 close to blade mounting portion 12. At the end portion of shaft portion 11 close to blade mounting portion 12, shaft portion 11 is connected to blade mounting portion 12.

In shaft portion 11, gripping-side section 1102 is provided on the opposite side of shaft portion 11 from blade mounting portion 12 of increased-diameter portion 15 which is the intermediate section. Gripping-side section 1102 extends from increased-diameter portion 15 in a direction opposite to cutting-side section 1101 and includes the other end portion of shaft portion 11, that is, an end portion of shaft portion 11 that is different from the end portion of shaft portion 11 close to blade mounting portion 12. In gripping-side section 1102, a portion located within a predetermined distance from the other end portion of shaft portion 11 forms a shank 1103.

Longitudinal direction X of cutting tool 101 is along a longitudinal direction of shaft portion 11. For example, longitudinal direction X of cutting tool 101 and the longitudinal direction of shaft portion 11 are parallel to each other.

Increased-diameter portion 15 is formed, for example, in a shape of a polygonal prism, specifically a regular polygonal prism. A central axis of increased-diameter portion 15 is located on central axis 17 of shaft portion 11.

More specifically, for example, increased-diameter portion 15 is formed in an octagonal prism shape. Increased-diameter portion 15 preferably has an octagonal prism shape, but may have, for example, a quadrangular prism shape, a hexagonal prism shape, a decagonal prism shape, or a dodecagonal prism shape. Also, increased-diameter portion 15 may be columnar.

Increased-diameter portion 15 increases a diameter of shaft portion 11 over the entire periphery in a circumferential direction of shaft portion 11. That is, the diameter of increased-diameter portion 15 is larger than a diameter of a portion of shaft portion 11 other than increased-diameter portion 15. In other words, increased-diameter portion 15 is thicker than the portion of shaft portion 11 other than increased-diameter portion 15. It should be noted that the diameter of increased-diameter portion 15 refers to a length of the largest one of line segments which passes through central axis 17 and has both ends on the peripheral surface of increased-diameter portion 15 when viewed in a direction of central axis 17. In an example illustrated in FIG. 1, the diameter of increased-diameter portion 15 corresponds to a diagonal line on an end face of an octagonal prism.

Increased-diameter portion 15 is a portion that increases a rigidity of shaft portion 11. Even when a length of shaft portion 11 is increased in order to mount strain sensor 14 to shaft portion 11, a decrease in the rigidity of shaft portion 11 can be suppressed by providing increased-diameter portion 15.

Increased-diameter portion 15 has a recessed portion 16 in its peripheral surface (outer peripheral surface). In this case, recessed portion 16 is formed so as to be recessed toward central axis 17 of shaft portion 11.

In the example illustrated in FIG. 1, recessed portion 16 is formed in a circumferential direction of shaft portion 11 and has a rectangular shape in a cross-sectional view including central axis 17 of shaft portion 11. Recessed portion 16 is formed continuously over the entire circumferential direction of shaft portion 11, for example. Note that the circumferential direction of shaft portion 11 means a direction along the peripheral surface of shaft portion 11 when shaft portion 11 is projected onto a plane in which central axis 17 of shaft portion 11 is a normal line.

With such a configuration, a rigidity of shaft portion 11 in the circumferential direction can be easily adjusted, and thus a strain in the circumferential direction can be easily adjusted. Further, the processing of recessed portion 16 is relatively easy. This makes it possible to more reliably ensure both a rigidity of cutting tool 101 and an accuracy of a strain measurement of cutting tool 101.

Recessed portion 16 is formed in a central portion (first section) of increased-diameter portion 15 in a direction of central axis 17 of shaft portion 11. In increased-diameter portion 15, of parts adjacent to the first section, a part close to shank 1103 is a second section, and a part close to blade mounting portion 12 is a third section.

Recessed portion 16 is a portion having a function of locally increasing a strain generated in increased-diameter portion 15. Specifically, recessed portion 16 is a portion that (i) causes the first section of increased-diameter portion 15 to have a lower rigidity than the second and third sections, that is, locally reduces a rigidity of increased-diameter portion 15, (ii) makes a distance from central axis 17 of shaft portion 11 to a position where strain sensor 14 is mounted greater than a distance from central axis 17 of shaft portion 11 to a bottom surface of recessed portion 16 in increased-diameter portion 15, and (iii) locally causes a stress concentration in increased-diameter portion 15.

In other words, as for (i) above, the rigidity of increased-diameter portion 15 can be locally reduced by locally reducing a section modulus of increased-diameter portion 15, so that a strain generated in increased-diameter portion 15 can be locally increased. Accordingly, mounting strain sensor 14 at or near recessed portion 16 of increased-diameter portion 15 allows strain sensor 14 to measure a strain having a value larger than a value measured when strain sensor 14 is mounted at a position other than increased-diameter portion 15 of shaft portion 11.

Strain sensor 14 is mounted to shaft portion 11, for example, so as to span recessed portion 16, that is, in a bridge-like shape. In this case, strain sensor 14 may span recessed portion 16 along central axis 17 of shaft portion 11, or may span recessed portion 16 in a direction inclined with respect to central axis 17 of shaft portion 11. An angle of inclination can be, for example, 45° with respect to central axis 17 of shaft portion 11.

Note that strain sensor 14 may be mounted to shaft portion 11 so as not to span recessed portion 16. In this case, strain sensor 14 is mounted, for example, near recessed portion 16 of shaft portion 11.

As for (ii) above, mounting strain sensor 14 to the peripheral surface of increased-diameter portion 15 allows the distance between the mounting position of strain sensor 14 and central axis 17 of cutting tool 101 to be greater than the distance between the bottom of recessed portion 16 in increased-diameter portion 15 and central axis 17 of cutting tool 101. This will be described in detail below.

Figure 2:
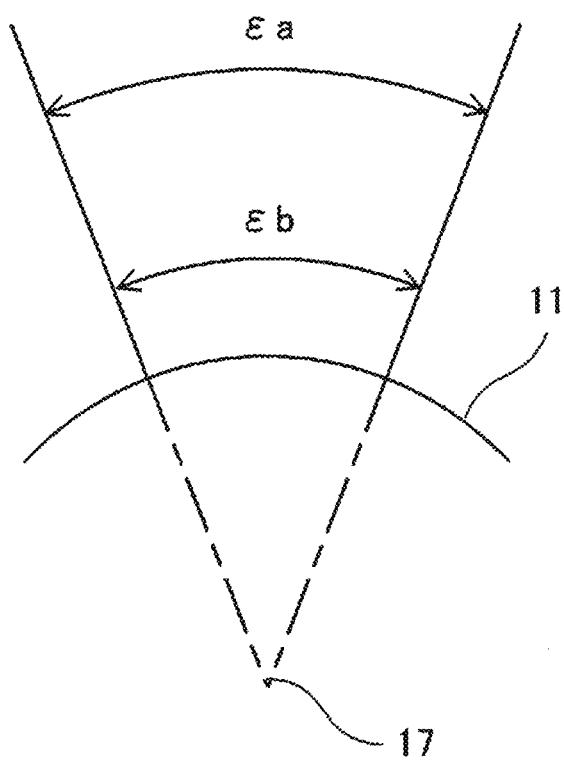
FIG. 2 is a schematic diagram illustrating amplification of a strain in the cutting tool according to the first embodiment of the present disclosure.

FIG. 2 is a schematic diagram illustrating amplification of a strain in the cutting tool according to the first embodiment of the present disclosure. Specifically, FIG. 2 schematically illustrates that a magnitude of a strain generated in cutting tool 101 varies depending on a distance from central axis 17 of cutting tool 101.

Referring to FIG. 2, the strain generated in shaft portion 11 becomes larger as the distance from central axis 17 becomes larger. That is, a strain $\varepsilon a$ at a position far from central axis 17 is larger than a strain $\varepsilon b$ at a position close to central axis 17. Therefore, mounting strain sensor 14 to the peripheral surface of increased-diameter portion 15 allows strain sensor 14 to measure a strain having a larger value.

Figure 3:
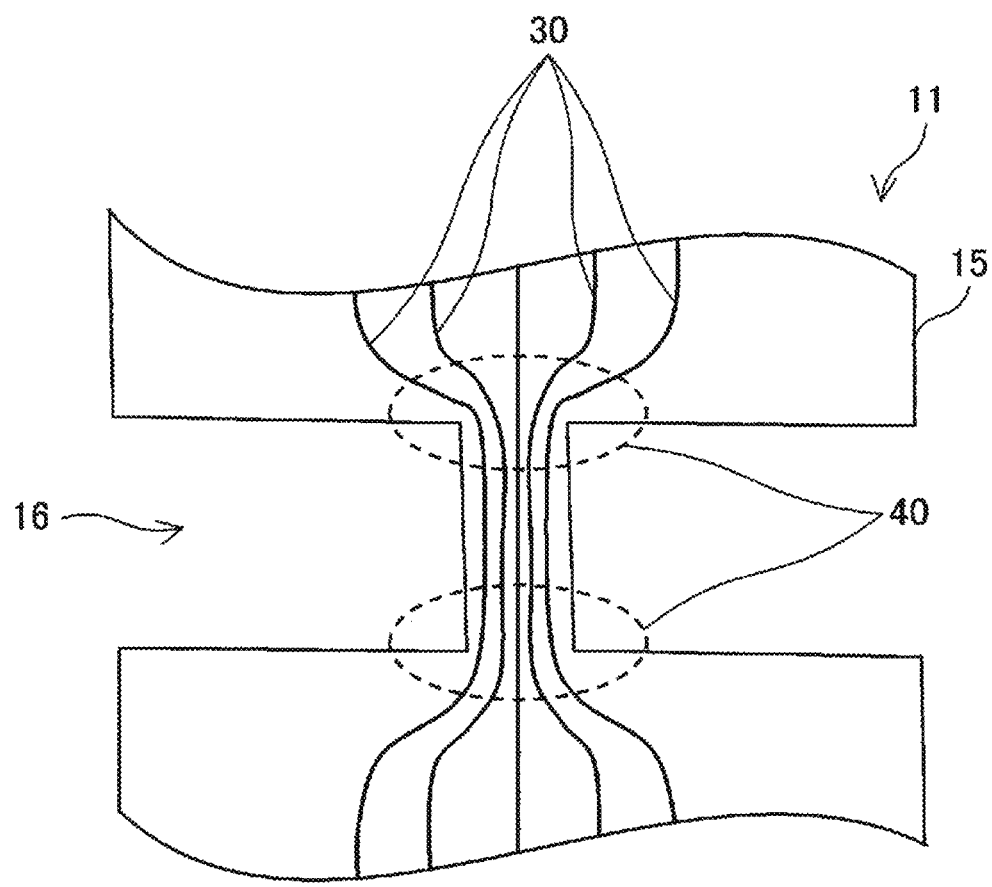
FIG. 3 is a schematic diagram illustrating amplification of a strain in a cutting tool according to the first embodiment of the present disclosure.

FIG. 3 is a schematic diagram illustrating amplification of a strain in the cutting tool according to the first embodiment of the present disclosure. Specifically, FIG. 3 uses a flow of force to schematically illustrate that in increased-diameter portion 15, stress concentration generated around recessed portion 16.

As for (iii) above, as illustrated in FIG. 3, in the vicinity of recessed portion 16 in increased-diameter portion 15, a density of streamlines 30 indicating the flow of force is high, or streamlines 30 are curved. Since stress concentration is generated in such a portion, strain tends to increase. In particular, at a portion 40 near the bottom of recessed portion 16, the density of the streamlines 30 is high and streamlines 30 are curved. Therefore, mounting strain sensor 14 at or near recessed portion 16 allows strain sensor 14 to measure a larger strain.

As described above, by the functions (i) to (iii) of recessed portion 16, a strain is amplified, that is, the strain locally appears largely at recessed portion 16 and near recessed portion 16. By mounting strain sensor 14 to a portion where a rigidity is locally reduced, it is possible to accurately measure a strain of cutting tool 101 caused by cutting, for example, a strain caused by a cutting force, while securing a rigidity of cutting tool 101.

When strain sensor 14 is mounted to shaft portion 11 so as to span recessed portion 16, strain sensor 14 can measure a more amplified strain than when strain sensor 14 is mounted to shaft portion 11 so as not to span recessed portion 16. Therefore, the accuracy of measurement can be further improved.

Blade mounting portion 12 is formed integrally, for example, with shaft portion 11. A base material of blade mounting portion 12 is made of, for example, cemented carbide for cutting tools or steel for dies.

Blade mounting portion 12 is configured such that a blade portion can be detachably mounted to blade mounting portion 12. Specifically, for example, screw holes are formed in blade mounting portion 12 and the blade portion, respectively. In a state in which each of the screw holes of blade mounting portion 12 and a corresponding screw hole of the screw holes of the blade portion are aligned with each other, the blade portion can be mounted to blade mounting portion 12 by screwing a screw into each of screw holes.

FIG. 4 is a side view illustrating a configuration of a cutting tool according to the first embodiment of the present disclosure.

When increased-diameter portion 15 is cut along a plane 20 that passes through central axis 17 of shaft portion 11, the size and the shape of the cross section of recessed portion 16 are the same over the entire circumferential direction of shaft portion 11. In FIG. 4, plane 20 is indicated by a two-dot chain line which is an imaginary line.

Note that recessed portion 16 may be formed intermittently along the circumferential direction of shaft portion 11. That is, multiple recessed portions 16 may be formed in a discontinuous manner with each other.

Figure 5:
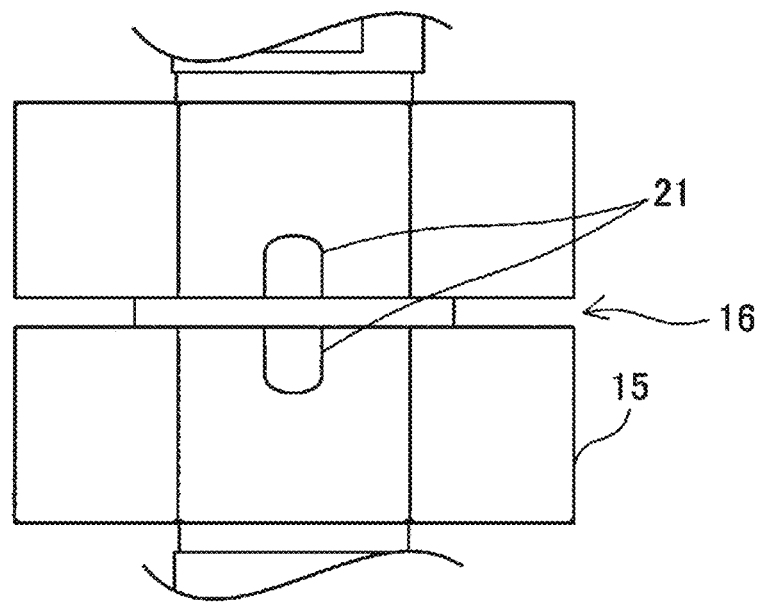
FIG. 5 is aside view illustrating an increased-diameter portion of a cutting tool according to the first embodiment of the present disclosure in a state where a strain sensor is removed.

FIG. 5 is a side view illustrating an increased-diameter portion of a cutting tool according to the first embodiment of the present disclosure in a state where a strain sensor is removed.

Referring to FIG. 5, shaft portion 11 is provided with a mark 21 (sensor mounting portion) indicating a position where strain sensor 14 is to be mounted. Mark 21 is, for example, a contour line indicating an area where strain sensor 14 is to be mounted.

With such a configuration, a user can mount strain sensor 14 to an appropriate position of shaft portion 11. Therefore, it is possible to reduces the likelihood that a measurement value is affected by a deviation of the mounting position of strain sensor 14.

Figure 6:
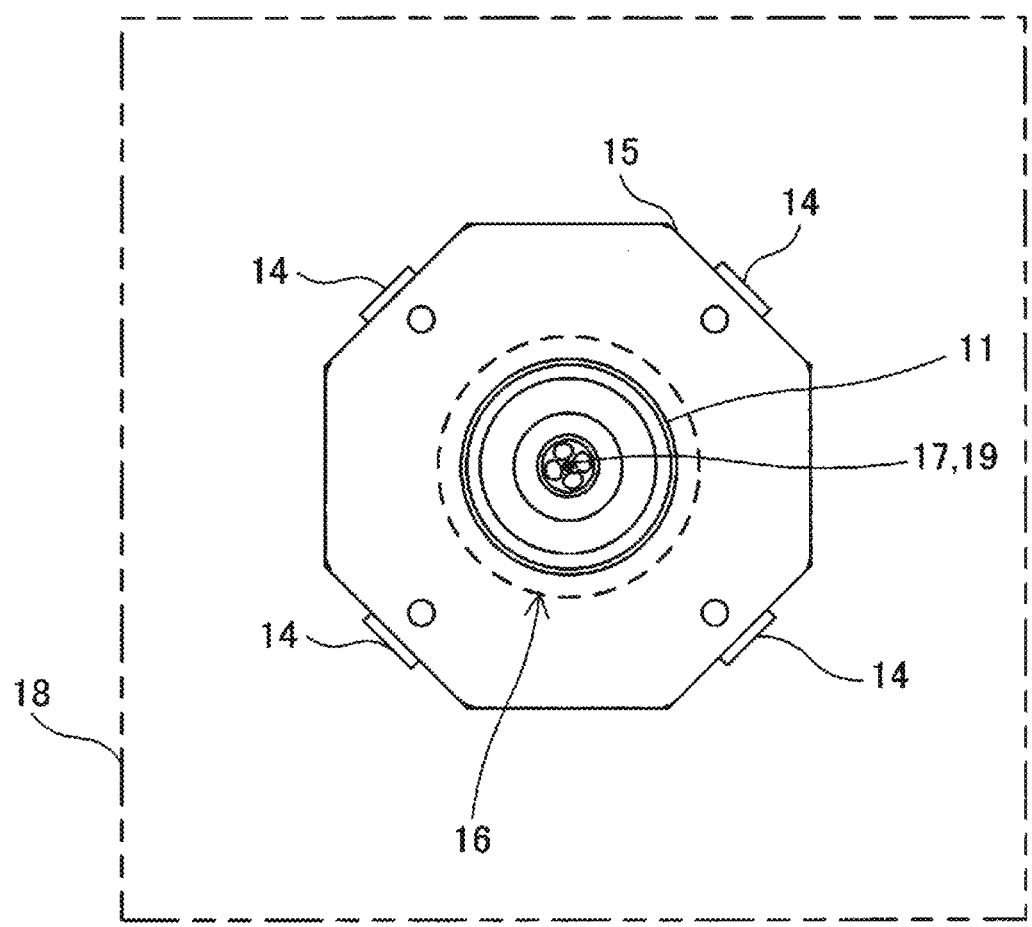
FIG. 6 is a diagram illustrating a configuration of a cutting tool according to the first embodiment of the present disclosure.

FIG. 6 is a diagram illustrating a configuration of a cutting tool according to the first embodiment of the present disclosure. Specifically, FIG. 6 is an arrow view seen from a direction A in FIG. 1.

Referring to FIG. 6, in a plane 18 in which central axis 17 of shaft portion 11 is a normal line, recessed portion 16 has a shape that is point-symmetrical with respect to an intersection point 19 where central axis 17 and plane 18 intersect each other. In FIG. 6, plane 18 is indicated by a two-dot chain line which is an imaginary line.

With such a configuration, since generation of an anisotropic strain can be suppressed, for example, when multiple strain sensors 14 are mounted to the peripheral surface of shaft portion 11, cutting tool 101 can be more accurately reflected in a measurement value of each of strain sensors 14.

Figure 7:
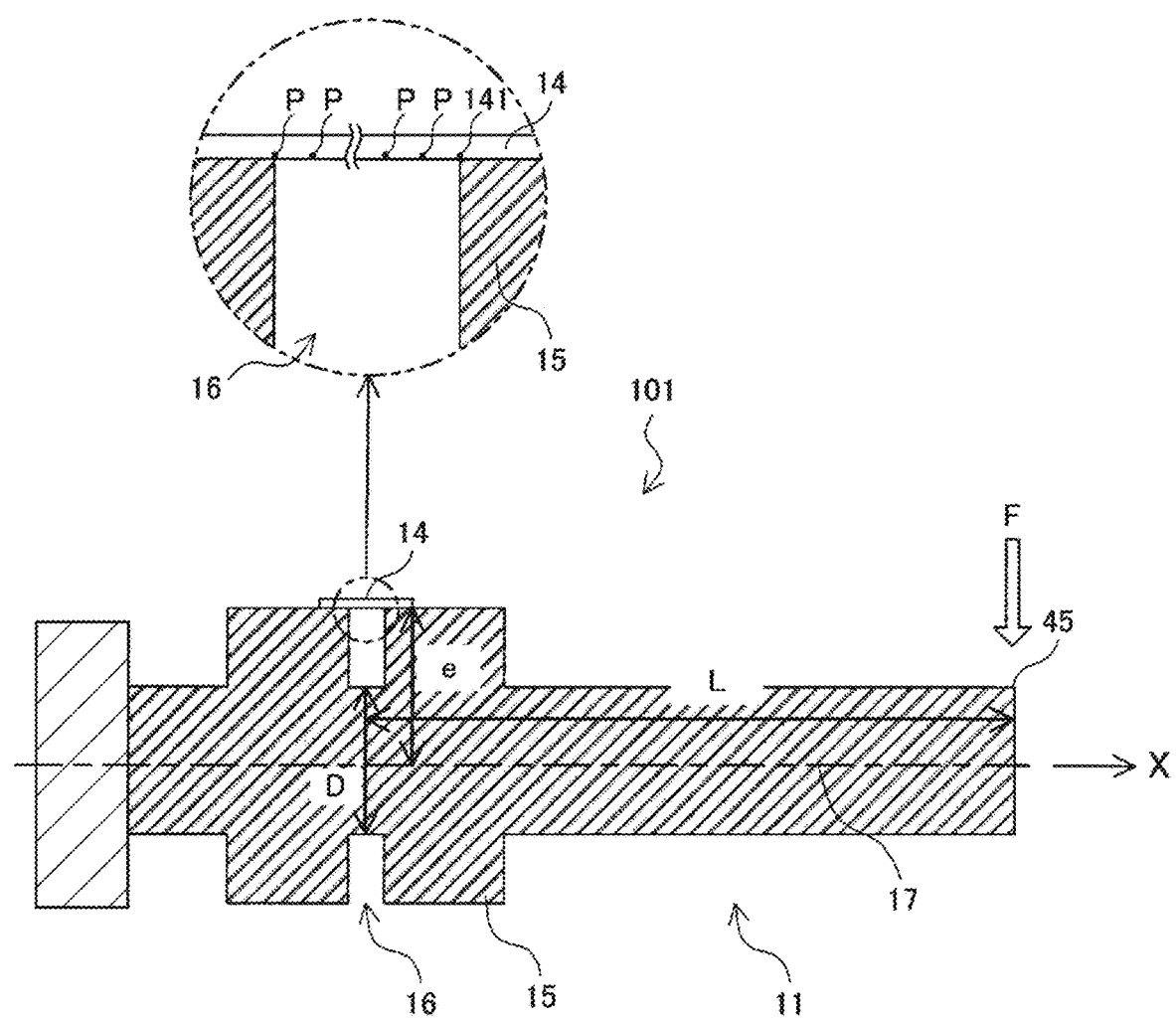
FIG. 7 is a diagram illustrating a function of a recessed portion in a cutting tool according to the first embodiment of the present disclosure.

FIG. 7 is a diagram illustrating a function of a recessed portion in a cutting tool according to the first embodiment of the present disclosure. Specifically, FIG. 7 is a schematic cross-sectional view of the cutting tool when cutting tool illustrated in FIG. 1 is regarded as a cantilever beam.

Referring to FIG. 7, cutting tool 101 may be a cantilever beam having the following coefficients and variables. In an example illustrated in FIG. 7, when viewed in a cross section including central axis 17 of shaft portion 11, recessed portion 16 has a rectangular shape formed in a circumferential direction of increased-diameter portion 15. Further, the bottom surface of recessed portion 16 is a cylindrical surface. When a load, that is, a cutting force F [N], is applied to a tip portion 45 in longitudinal direction X of cutting tool 101, a strain ε1 [ε] generated on the bottom surface of recessed portion 16 and a strain ε2 [ε] generated in the vicinity of an opening of recessed portion 16 are expressed by the following Formulae (1) and (2), respectively. Both strain al and strain ε2 are unitless numbers. However, in this specification, a symbol [ε] is described after ε1 and ε2 in order to clearly indicate that ε1 and ε2 are strains.

[Formula 1]

$$\varepsilon_1 = \frac{M}{EZ} = \frac{32FL}{E\pi D^3} \quad (1)$$

[Formula 2]

$$\varepsilon_2 = \varepsilon_1 \times \frac{e}{D/2} a = \frac{64FLea}{E\pi D^4} \quad (2)$$

Here, E is a Young's modulus [MPa], Z is a section modulus [mm^3], M is a bending moment [Nmm], and e is a distance [mm] between a mounting position of strain sensor 14 and central axis 17 of cutting tool 101. D is a diameter of a portion of shaft portion 11 that is thinned by forming recessed portion 16, that is, a constricted portion which is a portion constricted in shaft portion 11. In other words, the constricted portion is a narrow portion in which a width of shaft portion 11 is locally narrowed. F is a load applied to tip portion 45 of cutting tool, that is, a cutting force [N], L is a distance [mm] between tip portion 45 of cutting tool and a center position in longitudinal direction X of recessed portion 16, and a is a coefficient indicating a degree of strain increase due to stress concentration. According to a simulation result, when a width of recessed portion 16 is 3 mm or greater, coefficient a is 1.5. Further, an operator "^" represents a power.

Figure 8:
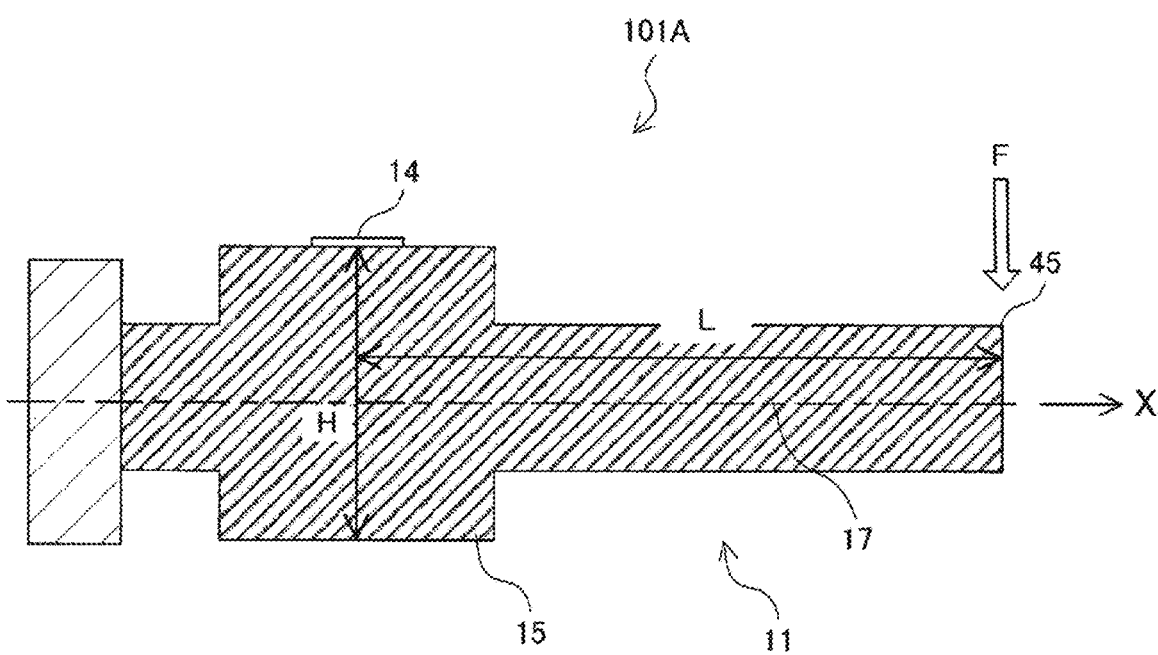
FIG. 8 is a diagram illustrating a function of a recessed portion in a cutting tool according to the first embodiment of the present disclosure.

FIG. 8 is a diagram illustrating a function of a recessed portion in a cutting tool according to the first embodiment of the present disclosure. Specifically, FIG. 8 is a schematic cross-sectional view of the cutting tool having increased-diameter portion 15 without recessed portion 16 when cutting tool is regarded as a cantilever beam.

Referring to FIG. 8, cutting tool 101A may be a cantilever beam in which increased-diameter portion 15 has a quadrangular prism shape. Specifically, a cross section of increased-diameter portion 15 perpendicular to longitudinal direction X of cutting tool 101 has a square shape. When a load F, that is, a cutting force, is applied to a tip portion of cutting tool 101A, a strain εorigin [ε] generated in a peripheral surface of increased-diameter portion 15 is expressed by the following Formula (3). Note that strain εorigin is a unitiess number. However, in this specification, [ε] is described after εorigin in order to clearly indicate that εorigin is a strain.

[Formula 3]

$$\varepsilon_{origin} = \frac{M}{EZ} = \frac{6FL}{EH^3} \quad (3)$$

Here, E is a Young's modulus [MPa], Z is a section modulus [mm^3], M is a bending moment [Nmm], e is a distance [mm] between a mounting position of strain sensor 14 and central axis 17 of cutting tool 101, 1H is a length [mm] of one side of the square-shaped cross section perpendicular to longitudinal direction X of cutting tool 101 in increased-diameter portion 15, F is a load applied to the tip portion of the cutting tool, that is, a cutting force [N], and L is a distance [mm] between the tip portion of the cutting tool and strain sensor 14 in longitudinal direction X of the cutting tool.

From the Formulae (2) and (3), strain ε2 [ε] is expressed by the following formula (4).

[Formula 4]

$$\varepsilon_2 = \frac{6FL}{EH^3} \times \frac{32H^3 ea}{3\pi D^4} = \frac{32H^3 ea}{3\pi D^4} \times \varepsilon_{origin} \quad (4)$$

That is, a magnification α of ε2 [ε] with respect to εorigin [ε] is expressed by the following Formula (5).

[Formula 5]

$$\alpha = \frac{32H^3 ea}{3\pi D^4} \quad (5)$$

Referring to Formula (5), it can be seen that forming recessed portion 16 in increased-diameter portion 15 increases the strain by a factor of a. In Formula (2), the larger the value of e/(D/2) is, the larger the value of ε2 [ε] becomes. Accordingly, it can be seen that the value of ε2 [ε] increases as a depth of recessed portion 16 increases.

Figure 9:
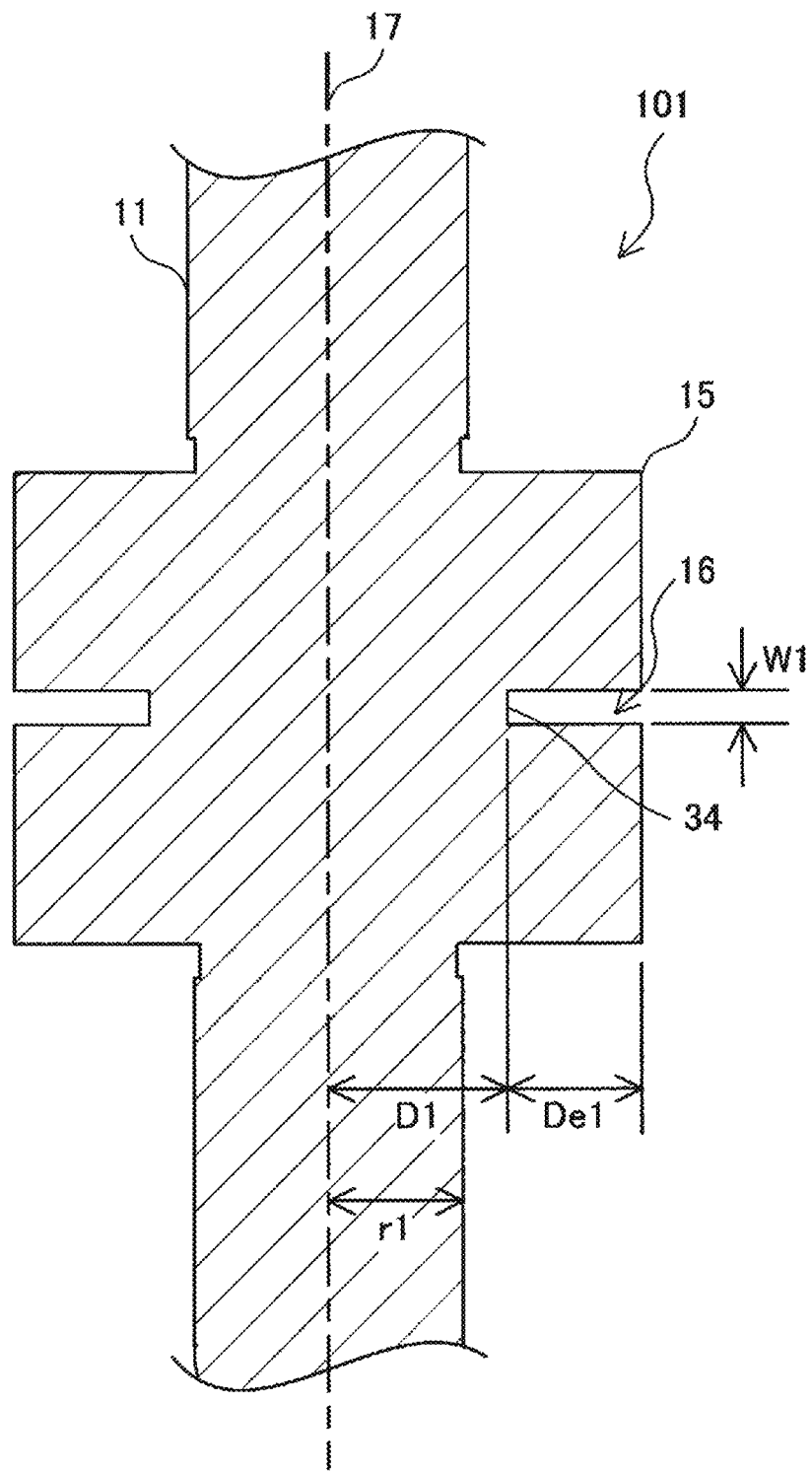
FIG. 9 is a diagram illustrating a configuration of a cutting tool according to the first embodiment of the present disclosure.

FIG. 9 is a diagram illustrating a configuration of a cutting tool according to the first embodiment of the present disclosure. Specifically, FIG. 9 is a partial cross-sectional view illustrating a part of a shaft portion cut along a plane including a central axis of the shaft portion.

Referring to FIG. 9, a width W1 of recessed portion 16 will be described. Width W1 of recessed portion 16 is a distance between two opening ends of recessed portion 16 in a direction of central axis 17. In an example illustrated in FIG. 9, width W1 of recessed portion 16 is constant over a circumferential direction of shaft portion 11. When width W1 of recessed portion 16 is not constant, width W) of recessed portion 16 is the longest one of distances between the two opening ends of recessed portion 16 in the direction of central axis 17. In addition, when recessed portion 16 is a cylindrical hole that opens in a circular shape on a peripheral surface of shaft portion 11 or a quadrangular tubular hole that opens in a quadrangular shape on a peripheral surface of shaft portion 11, width W1 of recessed portion 16 is the longest one of lengths across opening edges of recessed portion 16.

As width W1 of recessed portion 16 becomes smaller, the influence on a rigidity of a cutting edge becomes smaller, so that a displacement amount of the cutting edge during cutting operation can be kept small. On the other hand, recessed portion 16 is largely displaced in a closing direction due to a deformation caused by a cutting force, which increases a possibility that opposing wall surfaces forming recessed portion 16 come into contact with each other. In addition, a stress change in a stress distribution in recessed portion 16 and a periphery of recessed portion 16 increases, and an influence on a measurement value due to a deviation of the mounting position of strain sensor 14 increases.

In addition, as width W1 increases, a degree of stress concentration generated in recessed portion 16 increases, and a sensitivity of strain sensor 14 increases. In addition, for example, when strain sensor 14 is mounted so as to span recessed portion 16, that is, in a bridge-like shape, since a relatively wide area of strain sensor 14 is in a state of floating in the air, a stress distribution at the center position of strain sensor 14 becomes nearly uniform, and the influence on the measurement value due to the deviation of the mounting position of strain sensor 14 becomes small. On the other hand, since the influence on the rigidity of the cutting edge increases, the displacement amount of the cutting edge during cutting operation increases.

Width W1 is set appropriately in consideration of such advantages and disadvantages depending on the size of width W1 of recessed portion 16. Width W1 is, for example, 0.1 mm or greater and 10 mm or less, preferably 0.5 mm or greater and 4 mm or less, and more preferably 1 mm or greater and 3 mm or less. Width W1 may be less than 0.1 mm, or may be greater than 10 mm.

With such a configuration, the following effects can be achieved by the width of recessed portion 16. That is, by adopting such a width, the influence of the width of recessed portion 16 on the displacement of the cutting edge can be suppressed to be small, so that the displacement amount of the cutting edge during cutting can be kept small. Further, it is possible to reduce the possibility that the opposing wall surfaces of recessed portion 16 come into contact with each other during cutting. Further, in the case where strain sensor 14 is mounted so as to span recessed portion 16, that is, strain sensor 14 is mounted in a bridge-like shape, since a relatively wide area of strain sensor 14 is in a state of floating in the air, the stress distribution in the vicinity of the center of strain sensor 14 becomes nearly uniform, and the influence on the measurement value due to the deviation of the mounting position of strain sensor 14 can be reduced.

Next, a depth De1 of recessed portion 16 will be described. Depth De1 of recessed portion 16 is a distance in a radial direction of shaft portion 11 from the peripheral surface of increased-diameter portion 15 to bottom surface 34 of recessed portion 16. In an example illustrated in FIG. 9, depth De1 of recessed portion 16 is constant over the entire periphery in the circumferential direction of shaft portion 11. When recessed portion 16 is provided in a portion of shaft portion 11 other than increased-diameter portion 15, depth De1 of recessed portion 16 is a distance from the peripheral surface of shaft portion 15 to bottom surface 34 of recessed portion 16. In other words, depth De1 of recessed portion 16 is a distance in the radial direction of shaft portion 11 from a surface of shaft portion 11 where recessed portion 16 opens to bottom surface 34 of recessed portion 16. When bottom surface 34 of recessed portion 16 is curved, depth De1 of recessed portion 16 is the longest one of distances from the surface of shaft portion 11 where recessed portion 16 opens to bottom surface 34 of recessed portion 16.

As depth De1 of recessed portion 16 becomes smaller, the influence on a rigidity of the cutting edge becomes smaller, so that the displacement amount of the cutting edge during cutting operation can be kept small. On the other hand, the effect due to reducing a cross-sectional secondary moment, and the effect due to a large distance from central axis 17 to the position of strain sensor 14 compared to the distance from central axis 17 of cutting tool 101 to the peripheral surface of shaft portion 11 other than increased-diameter portion 15, become small. This reduces the effect of amplifying a strain amount. That is, the sensitivity of strain sensor 14 is lowered.

Further, as depth De1 of recessed portion 16 increases, the effect due to reducing the cross-sectional secondary moment, and the effect due to the large distance from central axis 17 of cutting tool 101 to the position of strain sensor 14 compared to the distance from central axis 17 to the peripheral surface of shaft portion 11 other than increased-diameter portion 15 increase. Furthermore, the degree of stress concentration generated in recessed portion 16 increases. As a result, the effect of amplifying a strain amount becomes larger. In other words, the sensitivity of strain sensor 14 increases. On the other hand, since the influence on the rigidity of the cutting edge increases, the displacement amount of the cutting edge during cutting operation increases.

Depth De1 is appropriately set in consideration of such advantages and disadvantages depending on the size of depth De1 of recessed portion 16. Depth De1 is, for example, 2 mm or greater and 40 mm or less, preferably 2 mm or greater and 20 mm or less, and more preferably 2.5 mm or greater and 10 mm or less. Depth De1 may be less than 2 mm, or may be greater than 40 mm.

With such a configuration, the following effects can be achieved by the depth of recessed portion 16. That is, by adopting such a depth, the influence of the depth of recessed portion 16 on the displacement of the cutting edge can be suppressed to be small, so that the displacement amount of the cutting edge during cutting can be kept small. In addition, since the effect of amplifying a strain amount is enhanced, the strain can be measured more accurately.

Further, when increased-diameter portion 15 is cut along plane 20 passing through central axis 17 of shaft portion 11, a shape of bottom surface 34 of recessed portion 16 on plane 20 is linear as illustrated in FIG. 9.

Further, a distance D1 from bottom surface 34 of recessed portion 16 to central axis 17 of shaft portion 11 is, for example, greater than or equal to a radius r1 of a portion of shaft portion 11 other than increased-diameter portion 15. When the shape of bottom surface 34 of recessed portion 16 is not a linear shape such as an arc shape, distance D1 is the shortest one of distances from bottom surface 34 of recessed portion 16 to central axis 17 of shaft portion 11.

With such a configuration, the influence of the depth of recessed portion 16 on the displacement of the cutting edge can be suppressed to be small, so that the displacement amount of the cutting edge during cutting can be kept small.

Figure 10:
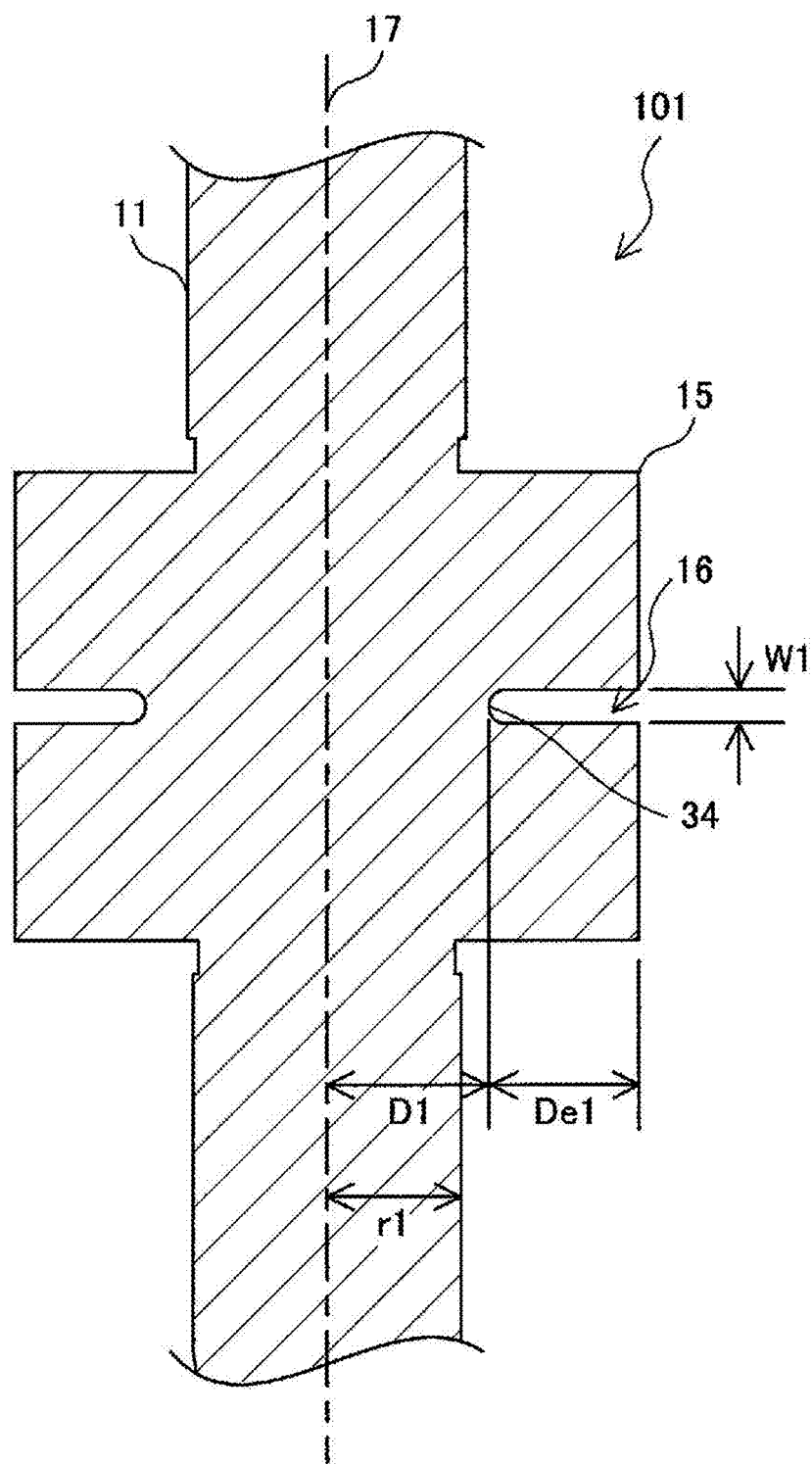
FIG. 10 is a diagram illustrating another example of a configuration of a cutting tool according to the first embodiment of the present disclosure.

FIG. 10 is a diagram illustrating another example of a configuration of a cutting tool according to the first embodiment of the present disclosure. Specifically, FIG. 10 is a partial cross-sectional view illustrating a part of shaft portion cut along a plane including a central axis of the cutting tool.

When increased-diameter portion 15 is cut along the plane passing through central axis 17 of shaft portion 11, a shape of bottom surface 34 of recessed portion 16 on plane 20 is not limited to a linear shape, and may be, for example, a rounded shape, specifically, an arc shape or the like as illustrated in FIG. 10.

With such a configuration, it is possible to suppress generation of excessive stress concentration near the bottom surface of recessed portion 16, and thus the durability of cutting tool 101 can be improved.

Figure 11:
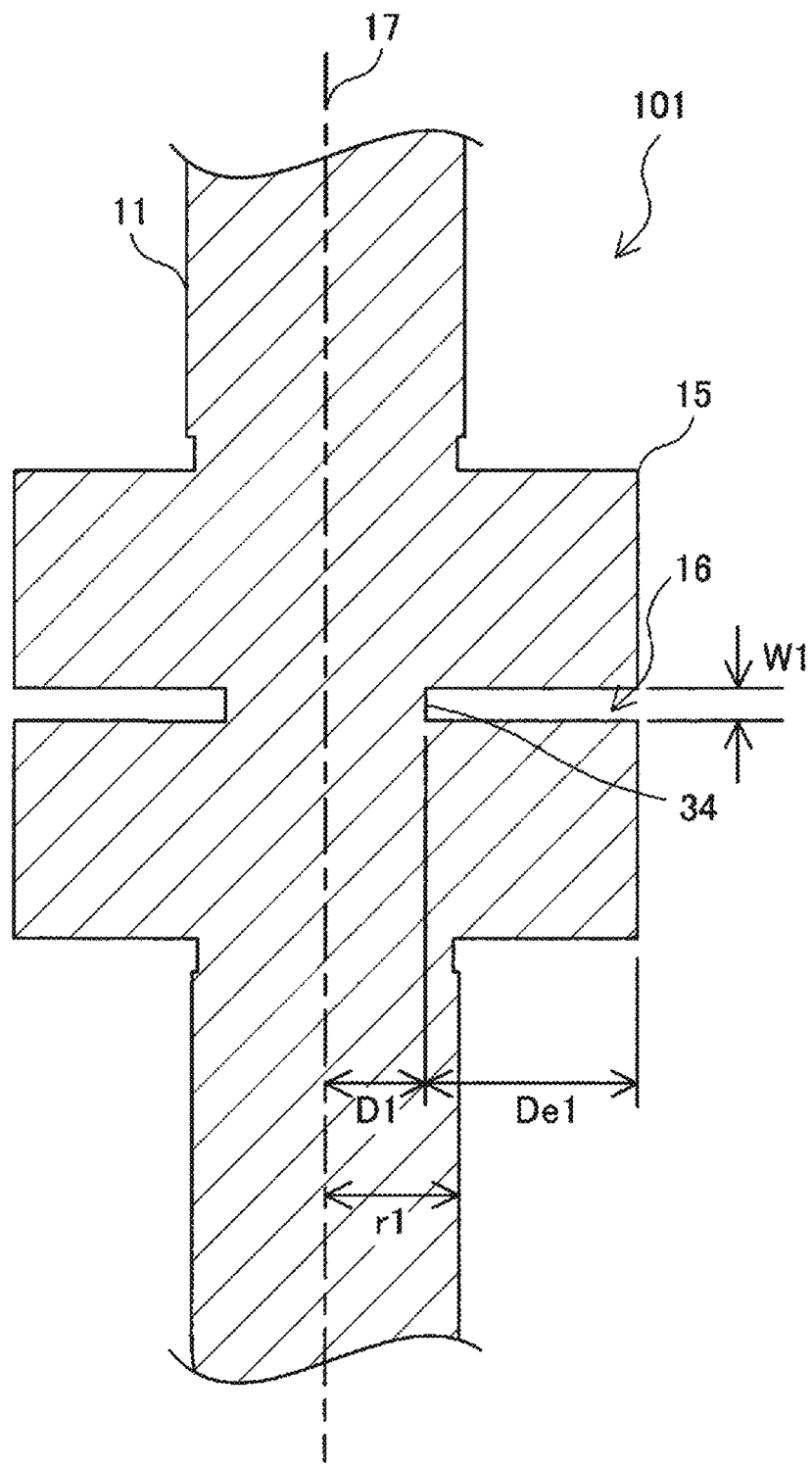
FIG. 11 is a diagram illustrating another example of a configuration of a cutting tool according to the first embodiment of the present disclosure.

FIG. 11 is a diagram illustrating another example of a configuration of a cutting tool according to the first embodiment of the present disclosure. Specifically, FIG. 11 is a partial cross-sectional view illustrating a part of shaft portion cut along a plane including a central axis of the cutting tool.

Referring to FIG. 11, distance D1 may be smaller than radius r1.

With such a configuration, an increase in strain locally generated during cutting is promoted, and thus the strain can be measured with a higher accuracy.

Figure 12:
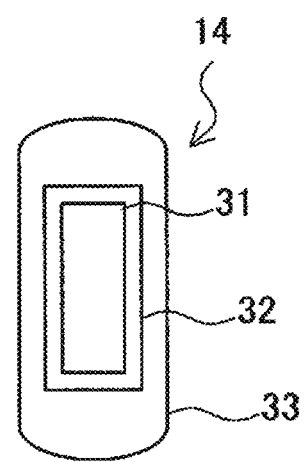
FIG. 12 is a diagram illustrating an example of a strain sensor in a cutting tool according to the first embodiment of the present disclosure.

FIG. 12 is a diagram illustrating an example of a strain sensor in a cutting tool according to the first embodiment of the present disclosure.

Referring to FIG. 12, strain sensor 14 includes, for example, a semiconductor chip 31, a support portion 32, and a mounting portion 33.

Semiconductor chip 31 is, for example, a single semiconductor integrated circuit in which a sensor element, a control circuit, an amplifier circuit, and an A/D (Analog to Digital) converter are integrated.

Support portion 32 is a plate-shaped metal base that supports semiconductor chip 31. Semiconductor chip 31 and support portion 32 are sealed with a synthetic resin.

Mounting portion 33 is a sheet-like member for mounting semiconductor chip 31 and support portion 32 to shaft portion 11, which is an object to be mounted, by adhesion.

Strain sensor 14 is mounted to shaft portion 11 using an adhesive or the like. Specifically, for example, a user can mount strain sensor 14 to a mounting position indicated by mark 21 in shaft portion 11.

With such a configuration, strain sensor 14 can be used to accurately measure a strain generated in shaft portion 11 during cutting.

Strain sensor 14 is mounted to increased-diameter portion 15, for example, so as to span recessed portion 16, that is, in a bridge-like shape. In this case, strain sensor 14 is mounted in a direction perpendicular to recessed portion 16, that is, in a longitudinal direction X of cutting tool 101. Preferably, strain sensor 14 is mounted at a position where the center of gravity of strain sensor 14 is opposite to recessed portion 16 in a radial direction of shaft portion 11. Note that strain sensor 14 may be mounted to increased-diameter portion 15 so as not to span recessed portion 16. In this case, strain sensor 14 is mounted, for example, near recessed portion 16 in increased-diameter portion 15. More specifically, strain sensor 14 is mounted at a position within 5 mm from recessed portion 16 in a direction of central axis 17.

When strain sensor 14 is mounted to increased-diameter portion 15 so as to span recessed portion 16, strain sensor 14 can measure a more amplified strain than when strain sensor 14 is mounted to increased-diameter portion 15 so as not to span recessed portion 16. Therefore, the accuracy of measurement can be further improved.

Strain sensor 14 can measure, for example, a tensile strain and a compressive strain generated in shaft portion 11 when cutting tool 101 is cutting a to-be-cut object.

As strain sensor 14, for example, a strain sensor manufactured by Glosel Co., Ltd. can be used.

Figure 13:
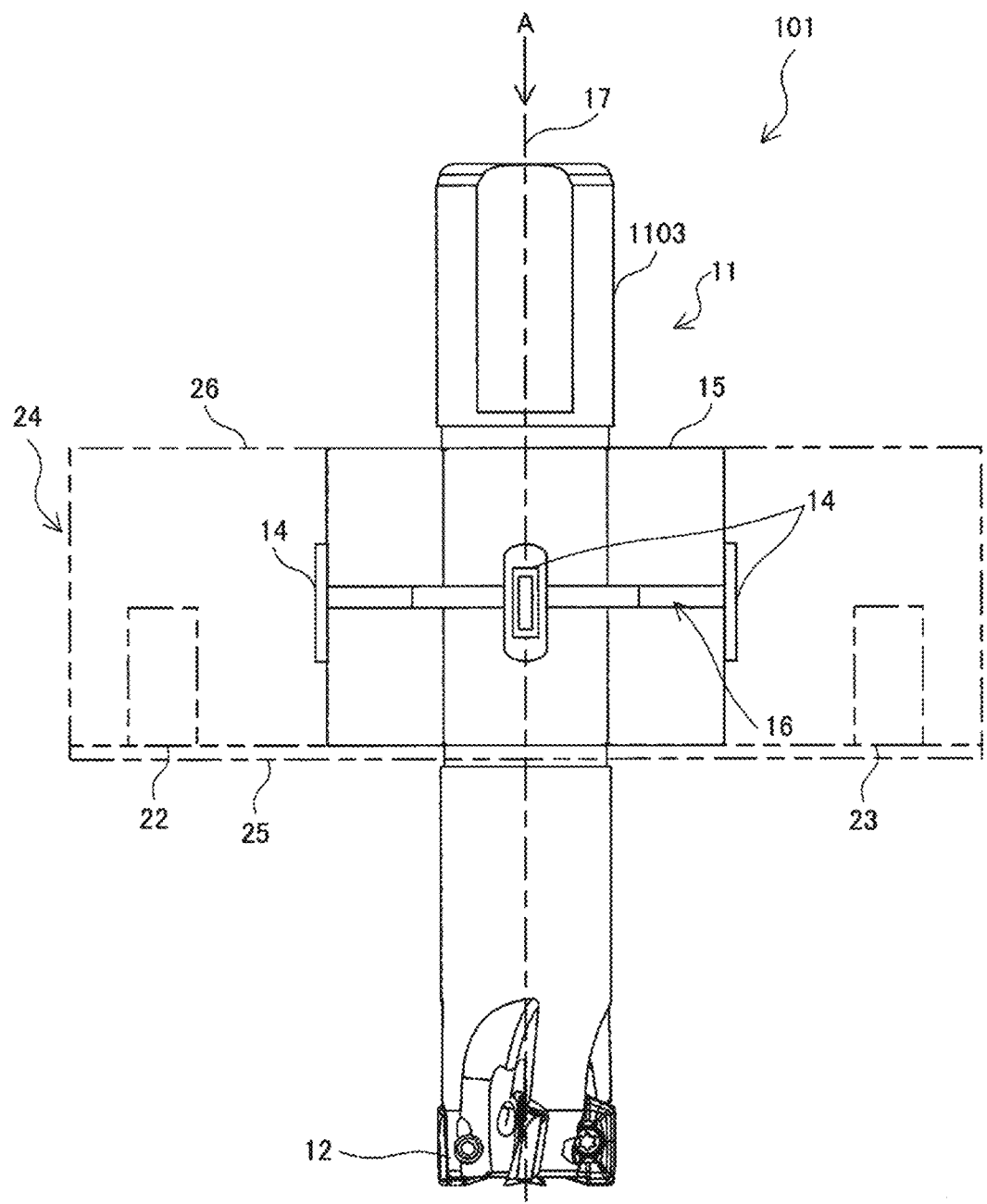
FIG. 13 is a diagram illustrating a configuration of a cutting tool according to the first embodiment of the present disclosure.

FIG. 13 is a diagram illustrating a configuration of a cutting tool according to the first embodiment of the present disclosure. Specifically, FIG. 13 is a diagram illustrating the cutting tool which further includes a battery, a radio communication device, and a housing in addition to the components illustrated in FIG. 2. In FIG. 13, the battery, the radio communication device, and the housing are indicated by two dot chain lines which are imaginary lines.

Referring to FIG. 13, cutting tool 101 further includes a battery 22, a radio communication device 23, and a housing 24 in addition to the configuration illustrated in FIG. 4.

Battery 22 is connected to strain sensor 14 and radio communication device 23 through a power line (not illustrated). Battery 22 supplies power to strain sensor 14 and radio communication device 23 through the power line. The power line is provided with a switch for switching on and off of the power supply.

Radio communication device 23 is connected to strain sensor 14 through a signal line (not illustrated). Strain sensor 14 outputs a measurement signal indicating a strain generated in shaft portion 11 to radio communication device 23 through the signal line.

Upon receiving the measurement signal from strain sensor 14, radio communication device 23 includes a measurement result indicated by the received measurement signal in a radio signal and transmits the radio signal to a management device (to be described later) such as an external personal computer. For example, the management device stores the received measurement result and analyzes the stored measurement result. The management device may perform not only the analysis of the measurement result but also other types of processing.

Housing 24 includes a bottom plate portion 25 and a side wall portion 26.

Housing 24 is fixed, for example, to a lower surface of increased-diameter portion 15. Housing 24 holds battery 22 and radio communication device 23 in a state in which increased-diameter portion 15, battery 22, radio communication device 23, the power line, and the signal line are housed, specifically, in a state in which, for example, increased-diameter portion 15 and battery 22 are covered from below and sides thereof.

Bottom plate portion 25 is formed, for example, in a disk shape. Multiple screw holes (not illustrated) are formed in bottom plate portion 25 at positions corresponding to increased-diameter portion 15. In addition, multiple screw holes are formed on a lower surface of increased-diameter portion 15.

In a state in which each of the screw holes of bottom plate portion 25 and a corresponding screw hole of the screw holes of increased-diameter portion 15 are aligned with each other, bottom plate portion 25 can be fixed to increased-diameter portion 15 by screwing a screw into each of the screw holes of bottom plate portion 25 and increased-diameter portion 15.

Side wall portion 26 is formed in a cylindrical shape, for example. Multiple screw holes (not illustrated) are formed in a lower end portion of side wall portion 26 at positions corresponding to a peripheral edge portion of bottom plate portion 25. Multiple screw holes are also formed in the peripheral edge portion of bottom plate portion 25.

In a state in which each of the screw holes of bottom plate portion 25 and a corresponding screw hole of the screw holes of side wall portion 26 are aligned with each other, side wall portion 26 can be fixed to bottom plate portion 25 by screwing a screw into each of the screw holes of bottom plate portion 25 and side wall portion 26.

Figure 14:
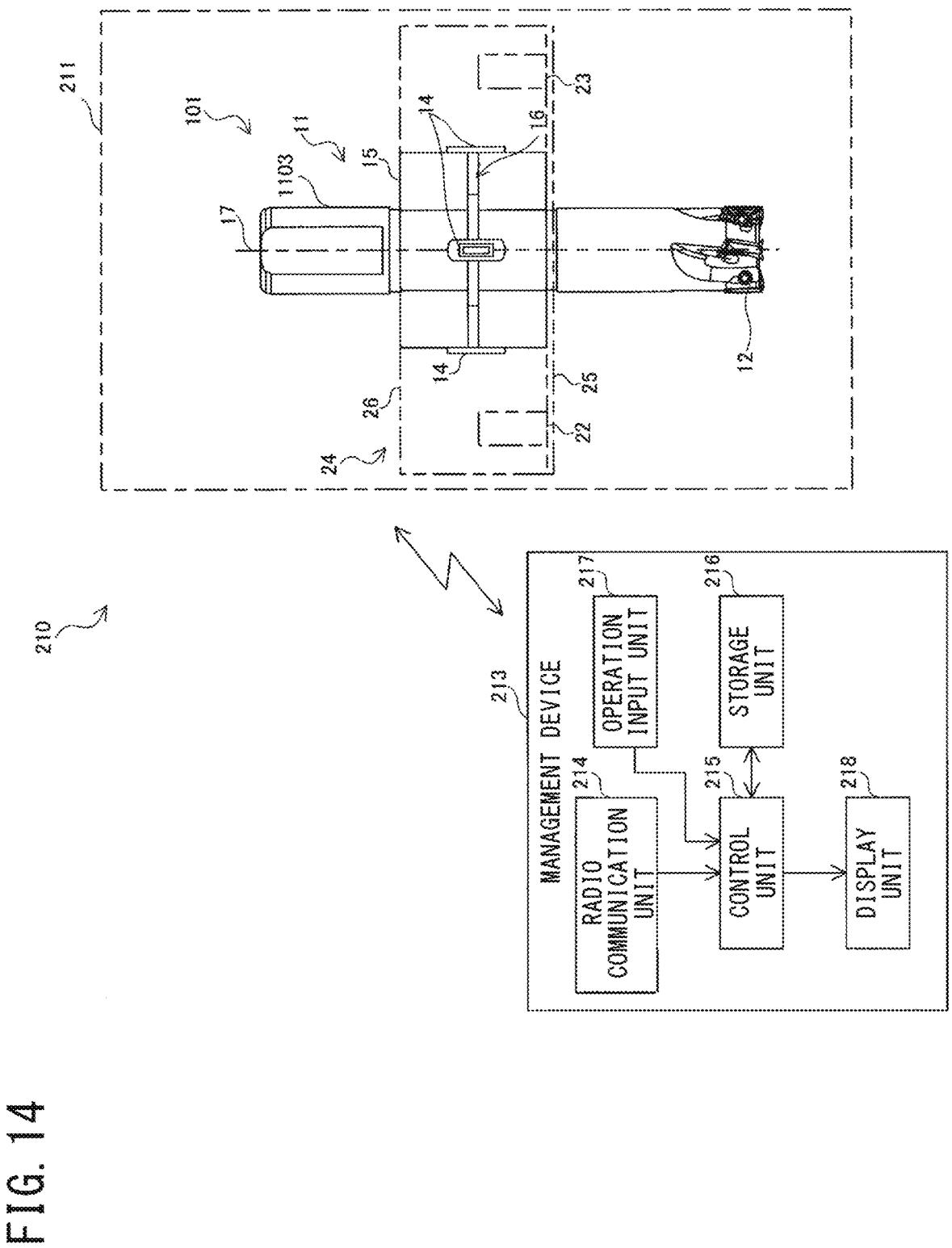
FIG. 14 is a diagram illustrating a configuration of a cutting system according to the first embodiment of the present disclosure.

FIG. 14 is a diagram illustrating a configuration of a cutting system according to the first embodiment of the present disclosure.

Referring to FIG. 14, a cutting system 210 includes a cutting device 211 such as a milling machine, and a management device 213.

Cutting device 211 includes cutting tool 101, a driving unit (not illustrated), and a control unit (not illustrated) for controlling the driving unit. The driving unit is, for example, a motor that drives cutting tool 101. The control unit controls, for example, the number of rotations of the driving unit.

Cutting tool 101 transmits a radio signal including sensor information indicating a measurement result of strain sensor 14.

Management device 213 receives the radio signal including sensor information from cutting tool 101, and processes the measurement result indicated by the received sensor information.

Specifically, management device 213 includes a radio communication unit 214, a control unit 215, a storage unit 216, an operation input unit 217, and a display unit 218.

Radio communication unit 214 performs radio communication with radio communication device 23 of cutting tool 101. Specifically, radio communication unit 214 receives a radio signal including sensor information from radio communication device 23 of cutting tool 101.

Operation input unit 217 includes a user interface such as a keyboard and a mouse. Operation input unit 217 accepts instructions and data input from a user.

Storage unit 216 includes, for example, a storage device such as a hard disk drive (HDD). In addition, for example, storage unit 216 includes an auxiliary storage device such as a compact disc read only memory (CD-ROM), a digital versatile disk read only memory (DVD-ROM), or a Blu-ray (registered trademark) disc read only memory (BD-ROM). Further, for example, storage unit 216 includes a semiconductor memory such as a random access memory (RAM) and a read only memory (ROM).

Storage unit 216 stores, for example, programs and data for operating control unit 215, a measurement result received by radio communication unit 214 from cutting tool 101, an analysis result of control unit 215.

Control unit 215 includes, for example, a central processing unit (CPU). Control unit 215 analyzes the measurement result of strain sensor 14. Specifically, control unit 215 analyzes the measurement result stored in storage unit 216. Control unit 215 controls each unit in management device 213.

Specifically, for example, control unit 215 estimates whether or not the blade portion is damaged and a life time of the blade portion on the basis of a position and a magnitude of a strain generated in shaft portion 11.

Display unit 218 is, for example, a display. Display unit 218 displays the analysis result of control unit 215. Display unit 218 may be provided outside management device 213.

Further, cutting system 210 may include a relay device between cutting device 211 and management device 213, for example, when a distance between cutting device 211 and management device 213 is too long to directly transmit and receive a radio signal between them. In this case, cutting device 211 transmits a radio signal to management device 213 through the relay device.

[Method of Use]

Referring to FIGS. 13 and 14, a method of using cutting tool 101 will be described.

First, shank 1103 of cutting tool 101 is fixed to a holder such as an arbor in a milling machine, for example.

Next, power is supplied from battery 22 to strain sensor 14 and radio communication device 23 by switching a switch provided in the power line from off to on.

Next, rotationally driving cutting tool 101 causes cutting tool 101 to start cutting an object to be cut.

When cutting is started, a cutting force that cutting tool 101 received from the object to be cut causes a stress and a resulting strain in the blade portion, blade mounting portion 12, and shaft portion 11.

Strain sensor 14 outputs a measurement signal indicating a strain generated in shaft portion 11 to radio communication device 23.

Next, radio communication device 23 includes sensor information indicating the measurement signal received from strain sensor 14 in a radio signal and transmits the radio signal to external management device 213.

In management device 213, radio communication unit 214 stores, in storage unit 216, the measurement result indicated by the sensor information included in the radio signal received from radio communication device 23. Storage unit 216 stores the measurement result that radio communication unit 214 receives from cutting tool 101. Control unit 215 analyzes the measurement result stored in storage unit 216 in accordance with an instruction input from a user through operation input unit 217. Display unit 218 displays the analysis result.

Note that recessed portion 16 may not have a rectangular shape as describe above. That is, when viewed in a cross section including central axis 17 of shaft portion 11, recessed portion 16 may not have a rectangular shape formed in the circumferential direction of increased-diameter portion 15. Specifically, for example, recessed portion 16 may be a cylindrical hole opened in a circular shape, a quadrangular tubular hole opened in a quadrangular shape, or the like.

Also, strain sensor 14 may be mounted to increased-diameter portion 15 in a direction inclined with respect to recessed portion 16, that is, in a direction inclined with respect to longitudinal direction X of cutting tool 101. Specifically, for example, strain sensor 14 may be mounted, to increased-diameter portion 15, in a direction inclined by an angle of 45° with respect to longitudinal direction X.

In addition, when multiple strain sensors 14 are provided, some strain sensors 14 may be mounted in a direction perpendicular to recessed portion 16, that is, in a direction along longitudinal direction X of cutting tool 101, and other strain sensors 14 may be mounted, to increased-diameter portion 15, in a direction inclined with respect to recessed portion 16.

Specifically, for example, when four strain sensors 14 are provided, two strain sensors 14 are mounted in the direction perpendicular to recessed portion 16, and the other two strain sensors 14 are mounted, to increased-diameter portion 15, in a direction inclined with respect to recessed portion 16.

Further, recessed portion 16 may not be formed in the circumferential direction of shaft portion 11. Recessed portion 16 may be formed in a direction inclined with respect to the circumferential direction of shaft portion 11. That is, recessed portion 16 may be formed so as to intersect with a plane in which central axis 17 of shaft portion 11 is a normal line.

Further, in a plane 18 in which central axis 17 of shaft portion 11 is a normal line, recessed portion 16 may have a shape that is not point-symmetrical with respect to intersection point 19 where central axis 17 and plane 18 intersect each other. Specifically, for example, recessed portion 16 in which at least one of a depth or a width is not uniform in the circumferential direction of shaft portion 11 may be formed in the circumferential direction of shaft portion 11.

Further, in plane 18 in which central axis 17 of shaft portion 11 is a normal line, shaft portion 11 may have at least one set of recessed portions provided at positions that are not point-symmetrical with respect to intersection point 19 where central axis 17 and plane 18 intersect each other. Specifically, for example, three recessed portions 16 may be provided in the peripheral surface of increased-diameter portion 15 at positions whose angles are 0°, 120°, and 240°, respectively, around intersection point 19 as the center.

Figure 15:
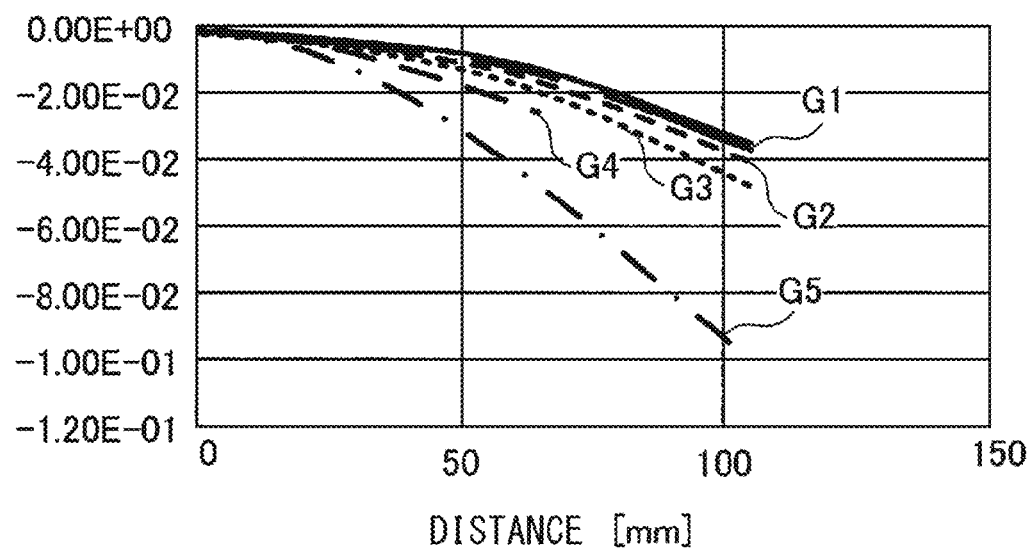
FIG. 15 is a graph illustrating a simulation result of a cutting tool according to the first embodiment of the present disclosure.

FIG. 15 is a graph illustrating a simulation result of the cutting tool according to the first embodiment of the present disclosure. Specifically, FIG. 15 illustrates a displacement of the entire cantilever beam when three Examples 1 to 3 of cutting tools according to the first embodiment and two Comparative Examples 1 and 2 are regarded as cantilever beams and the same load is applied to a tip portion of each of the cantilever beams. In FIG. 15, Examples 1 to 3 and Comparative Examples 1 and 2 correspond to graphs G1 to G5, respectively.

Conditions of three Examples 1 to 3 and Comparative Examples 1 and 2 are as follows. Comparative Example 1 is directed to a cutting tool in which increased-diameter portion 15 and recessed portion 16 are not formed. Specifically, shaft portion 11 is 65 mm in length and 25 mm in diameter. In Comparative Example 2, the total length is extended by 40 mm as compared with Comparative Example 1 as a length of an area where strain sensor 14 is to be mounted to shaft portion 11.

In Example 1, as compared with Comparative Example 1, the length is extended by 40 mm as a length of an area where strain sensor 14 is to be mounted to shaft portion 11, and the extended portion is increased-diameter portion 15 whose diameter is increased in a quadrangular prism shape. Increased-diameter portion 15 has a square cross section with one side having a length of 55 mm. In Example 1, recessed portion 16 having a width of 3 mm is formed in the circumferential direction of increased-diameter portion 15. A constricted portion of shaft portion 11, which is a portion thinned by formation of recessed portion 16, is 35 mm in diameter.

In Example 2, a constricted portion is 25 mm in diameter as compared with Example 1. In Example 3, a constricted portion is 20 mm in diameter as compared with Example 1.

Referring to FIG. 15, it can be seen that when the total length is extended by 40 mm as in Comparative Example 2, the rigidity is greatly reduced as compared with Comparative Example 1, and the displacement of the cutting edge increases. In addition, it can be seen that when increased-diameter portion 15 is provided as in Examples 1 to 3, the rigidity increases, and the displacement of the cutting edge is reduced as compared with Comparative Example 2.

Here, as an example, the present inventors obtained rigidities of cutting tools in Example 2 and Comparative Example 2 by calculation and compared them. Specifically, first, dimensions of the cutting tool of Example 2 were measured using a three dimensional scanner. Next, based on the measurement result, a three dimensional CAD (Computer Aided Design) model corresponding to the cutting tool of Example 2 was created. By removing the increased-diameter portion having recessed portion 16 from the created CAD model, a CAD model corresponding to the cutting tool of Comparative Example 2 was created. Each rigidity of these CAD models was calculated by a finite element method.

As a result, the rigidity of the CAD model corresponding to Example 2 was 2.54 times the rigidity of the CAD model corresponding to Comparative Example 2. Thus, the rigidity of a cutting tool provided with increased-diameter portion 15 having recessed portion 16 is preferably greater than or equal to 1.1 times, more preferably greater than or equal to 1.5 times, even more preferably greater than or equal to 2.0 times the rigidity of a cutting tool without increased-diameter portion 15.

Figure 16:
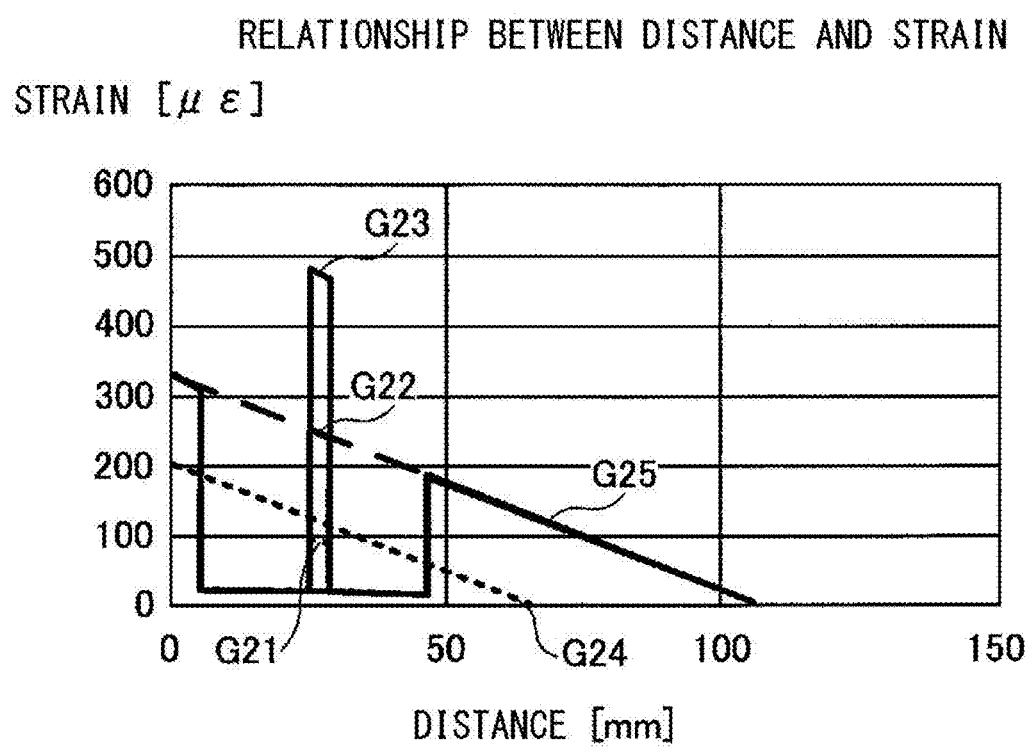
FIG. 16 is a graph illustrating a simulation result of a cutting tool according to the first embodiment of the present disclosure.

FIG. 16 is a graph illustrating a simulation result of a cutting tool according to the first embodiment of the present disclosure. Specifically, FIG. 16 illustrates a strain generated in shaft portion 11 when the same load is applied to a tip portion in each of Examples 1 to 3 and Comparative Examples 1 and 2. In FIG. 16, Examples 1 to 3 and Comparative Examples 1 and 2 correspond to graphs G21 to G25, respectively.

Referring to FIG. 16, it can be seen that when increased-diameter portion 15 is formed in shaft portion 11 as in Examples 1 to 3, a rigidity is increased and a strain is reduced. In addition, it can be seen that when recessed portion 16 is formed in increased-diameter portion 15 as in Examples 1 to 3, a rigidity of increased-diameter portion 15 locally decreases, and the strain increases. Further, it is understood that the magnitude of strain can be controlled by changing the diameter of the constricted portion as in Examples 1 to 3. For example, as in Examples 1 to 3, it is understood that the strain increases as the diameter of the constricted portion decreases, that is, as the depth of recessed portion 16 increases. For example, the constricted portion of Example 3 has a smaller diameter than the constricted portion of Example 1, and thus has a lower rigidity than the constricted portion of Example 1. Therefore, in the constricted portion of Example 3, the degree of amplification of strain is larger than that in the constricted portion of Example 1.

Figure 17:
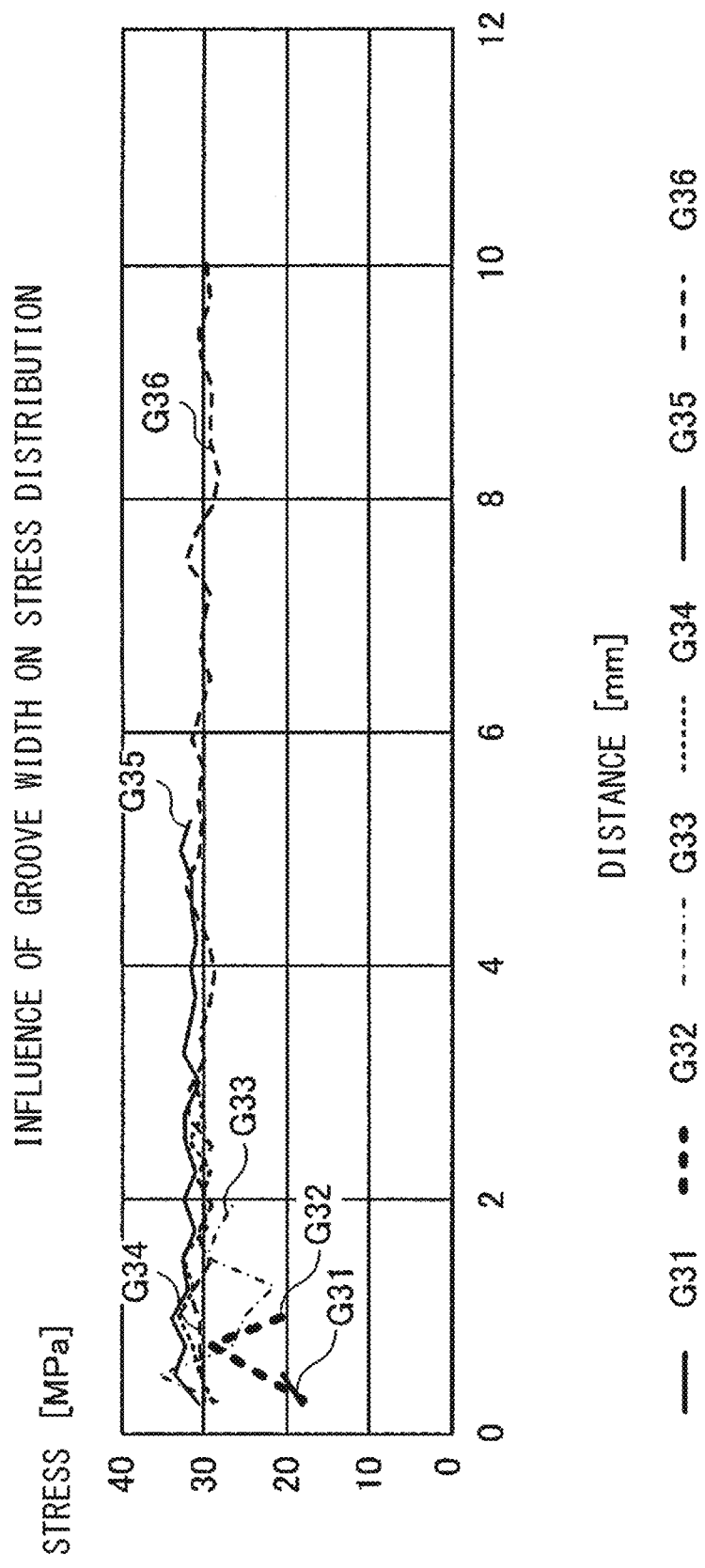
FIG. 17 is a graph illustrating a simulation result of a shape of a recessed portion of a cutting tool according to the first embodiment of the present disclosure.

FIG. 17 is a graph illustrating a simulation result of a shape of a recessed portion of a cutting tool according to the first embodiment of the present disclosure. Specifically, FIG. 17 illustrates a degree of influence of a width of recessed portion 16 on a stress distribution of strain sensor 14 when three Examples 4 to 9 of cutting tools according to the first embodiment are regarded as cantilever beams and the same load is applied to a tip portion of each of cantilever beams. Here, strain sensor 14 is mounted to increased-diameter portion 15 so as to span recessed portion 16.

A horizontal axis and a vertical axis in FIG. 17 respectively represent a distance, toward a base portion, from an end portion close to the tip portion of each of the cantilever beams to each of multiple sampling positions in a portion of strain sensor 14 spanning recessed portion 16, that is, in a portion of strain sensor 14 over recessed portion 16, and a stress generated at each of the multiple sampling positions. In FIG. 17, Examples 4 to 9 correspond to graphs G31 to G36, respectively.

FIG. 7 is an enlarged view of a recessed portion and a part of a strain sensor in a cutting tool according to the first embodiment of the present disclosure. Specifically. FIG. 7 illustrates an example of multiple sampling positions P in strain sensor 14.

Referring to FIG. 7, in the portion of strain sensor 14 that spans recessed portion 16, sampling positions P are provided, toward the base portion, at intervals of 0.25 mm from a starting point of sampling positions P which is a certain position closer to the base portion than to an end portion 141 close to the tip portion of the cantilever beam. That is, sampling positions P are provided at multiple positions including the above starting point. The starting point is, for example, a position 0.25 mm away from the end portion 141 toward the base portion.

Note that sampling positions P may be provided, toward the base portion, at intervals of 0.25 mm from end portion 141 as a starting point of sampling positions P. That is, sampling position P may be provided at end portion 141.

Conditions of six Examples 4 to 9 are as follows. In Examples 4 to 9, increased-diameter portions 15 are formed in a regular octagonal prism shape. Surfaces of the regular octagonal prism that face each other are spaced apart by 56 mm. In Examples 4 to 9, recessed portions 16 are formed in the circumferential direction of increased-diameter portions 15.

A diameter of the constricted portion, which is a portion thinned by forming recessed portion 16 in shaft portion 11, is 32 mm. A distance between each side surface of the regular octagonal prism and a bottom surface of recessed portion 16, that is, a depth of recessed portion 16, is 12 mm.

Widths of recessed portions 16 of Examples 4 to 9 are 0.5 mm, 1 mm, 2 mm, 3 mm, 6 mm, and 10 mm, respectively.

Referring to FIG. 17, when a width of recessed portion 16 is in the range of 0.5 mm to 1 mm, there is a large variation in stress due to the narrow width. On average, the stress is about 19 MPa to 28 MPa, and the stress increases as the width increases. However, in the width range of 3 mm or more, the stress is saturated at about 30 MPa. Thus, when the width is increased from 0.5 mm to 10 mm, an increase in stress is about 1.5 times.

Figure 18:
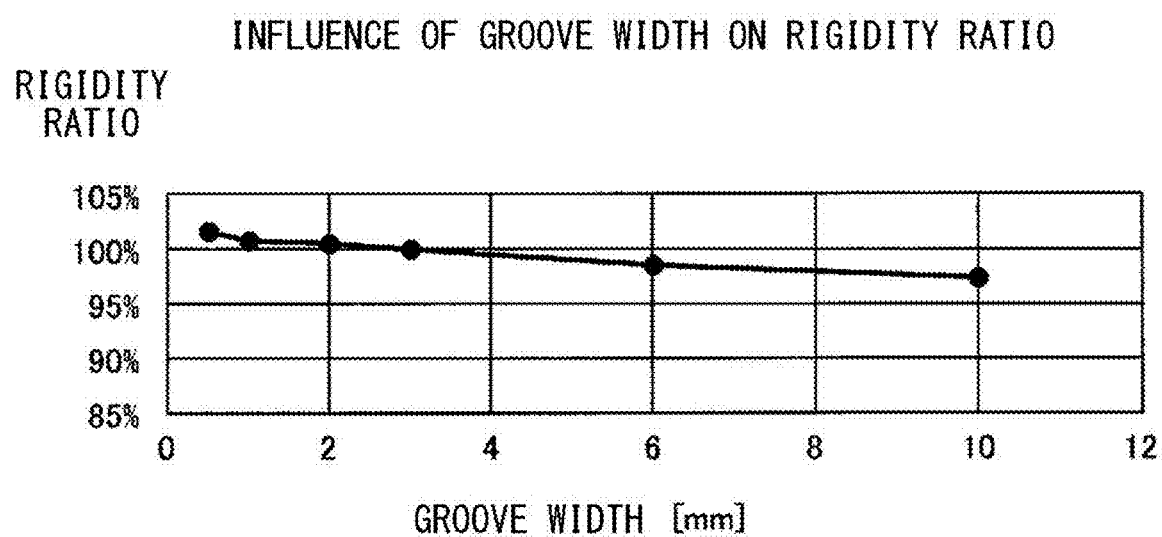
FIG. 18 is a graph illustrating a simulation result of a shape of a recessed portion of a cutting tool according to the first embodiment of the present disclosure.

FIG. 18 is a graph illustrating a simulation result of a shape of a recessed portion of a cutting tool according to the first embodiment of the present disclosure. Specifically, FIG. 18 illustrates a degree of influence of a width of the recessed portion on a rigidity ratio of a tip portion when six Examples 4 to 9 of cutting tools according to the first embodiment are regarded as cantilever beams and rigidities of the tip portions upon applying the same load to the respective tip portions are compared. In FIG. 18, a horizontal axis and a vertical axis represent a width of recessed portion and a rigidity ratio, respectively.

Referring to FIG. 18, when a width of recessed portion 16 is changed from 0.5 mm to 10 mm, a rigidity ratio decreases by about 5%.

Figure 19:
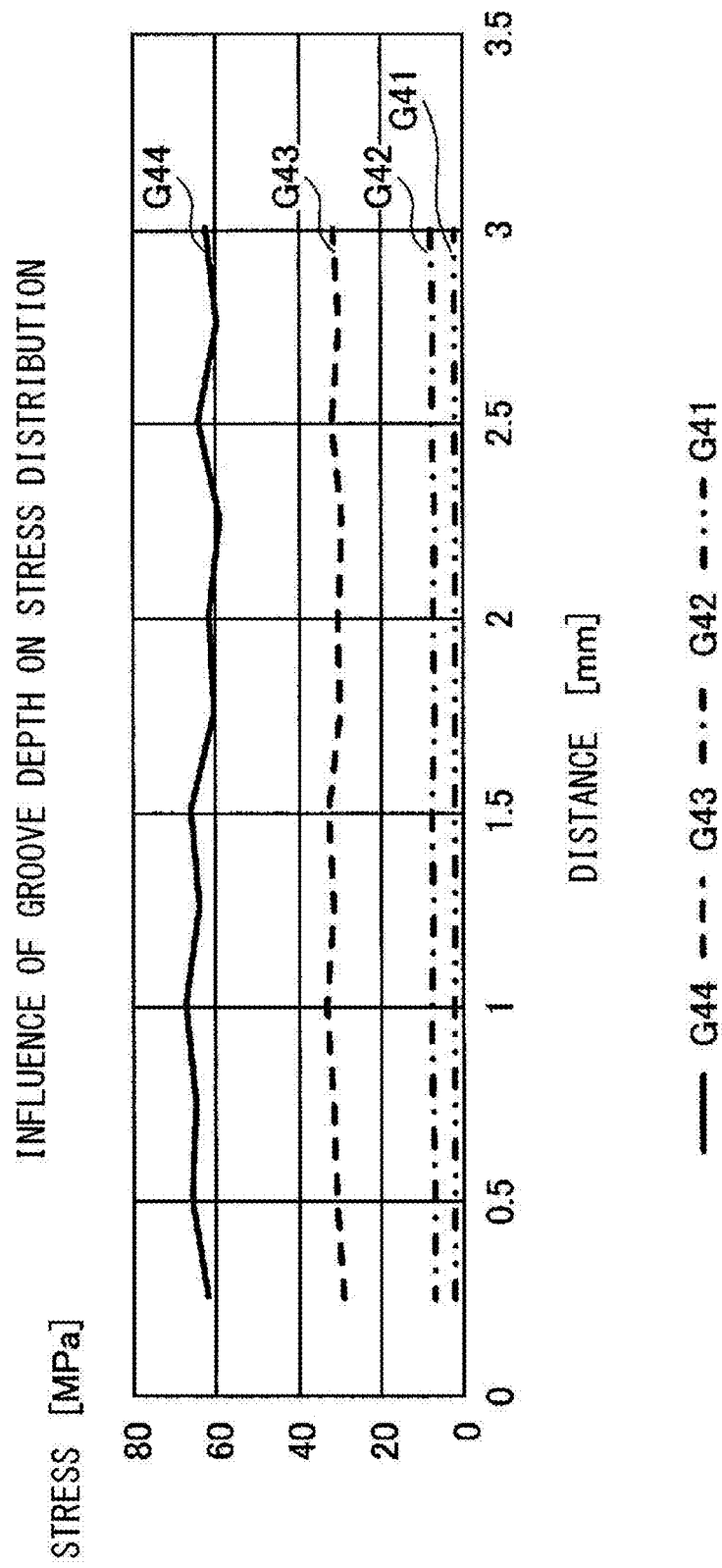
FIG. 19 is a graph illustrating a simulation result of a shape of a recessed portion of a cutting tool according to the first embodiment of the present disclosure.

FIG. 19 is a graph illustrating a simulation result of a shape of a recessed portion of a cutting tool according to the first embodiment of the present disclosure. Specifically, FIG. 19 illustrates a degree of influence of a depth of recessed portion 16 on a stress distribution of strain sensor 14 when four Examples 10 to 13 of cutting tools according to the first embodiment are regarded as cantilever beams and the same load is applied to each of the tip portions. Here, strain sensor 14 is mounted to increased-diameter portion 15 so as to span recessed portion 16.

A horizontal axis and a vertical axis in FIG. 19 respectively represent a distance toward a base portion from an end portion close to the tip portion of each of the cantilever beams to each of multiple sampling positions in a portion of strain sensor 14 spanning recessed portion 16, that is, in a portion of strain sensor 14 over recessed portion 16, and a stress generated at each of the multiple sampling positions. In FIG. 19. Examples 10 to 13 correspond to graphs G41 to G44, respectively.

As illustrated in FIG. 7, in the portion of strain sensor 14 that spans recessed portion 16, sampling positions P are provided, toward the base portion, at intervals of 0.25 mm from a starting point of sampling positions P which is a certain position closer to the base portion than to an end portion 141 close to the tip portion of the cantilever beam. That is, sampling positions P are provided at multiple positions including the above starting point. The starting point is, for example, a position 0.25 mm away from end portion 141 toward the base portion.

Note that sampling positions P may be provided, toward the base portion, at intervals of 0.25 mm from end portion 141 as a starting point of sampling positions P. That is, sampling position P may be provided at end portion 141.

Conditions of four Examples 10 to 13 areas follows. Depths of recessed portions 16 of Examples 10 to 13 are 0.5 mm, 5.5 mm, 12 mm, and 15.5 mm, respectively. In addition, widths of recessed portions 16 in Examples 10 to 13 are 3 mm. Diameters of bottoms of recessed portions 16 in Examples 10 to 13 are 55 mm, 45 mm, 32 mm, and 25 mm, respectively.

Referring to FIG. 19, when a depth of recessed portion 16 is 0.5 mm, a stress is about 2 MPa. In contrast, when a depth of recessed portion 16 is 15.5 mm, a stress is about 31 MPa.

In other words, when the depth of recessed portion 16 is changed from 0.5 mm to 15.5 mm, the stress is amplified about 15 times.

Figure 20:
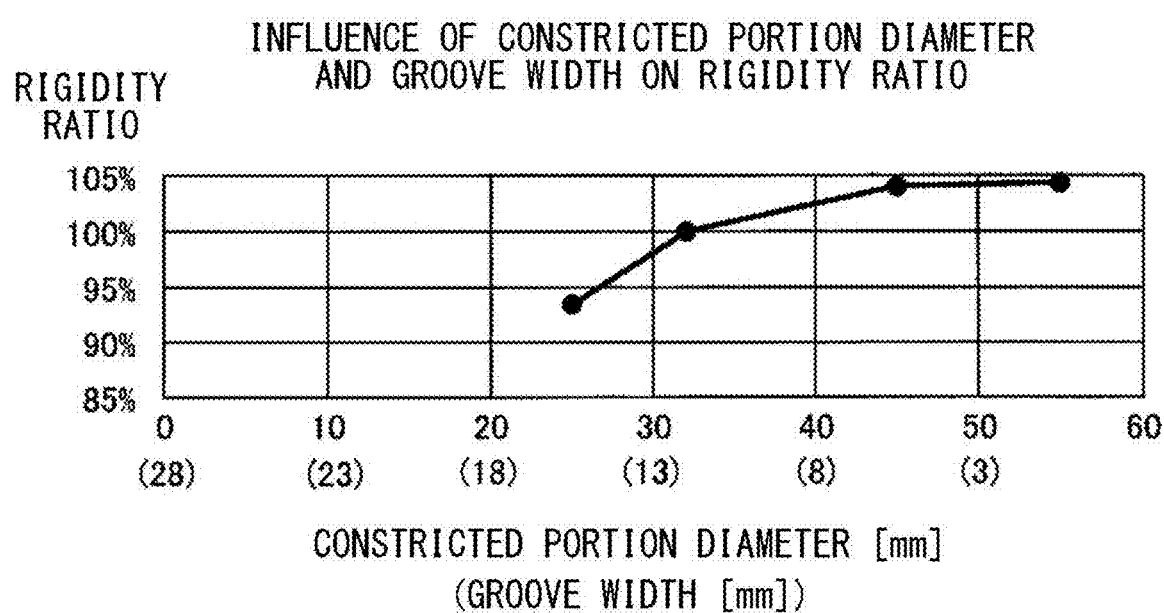
FIG. 20 is a graph illustrating a simulation result of a shape of a recessed portion of a cutting tool according to the first embodiment of the present disclosure.

FIG. 20 is a graph illustrating a simulation result of a shape of a recessed portion of cutting tool according to the first embodiment of the present disclosure. Specifically, FIG. 20 illustrates a degree of influence of a depth of recessed portion on a rigidity ratio of a tip portion when four Examples 10 to 13 of cutting tools according to the first embodiment are regarded as cantilever beams and rigidities of the tip portions obtained upon applying the same load to the respective tip portions are compared. In FIG. 20, a vertical axis represents a rigidity ratio. A horizontal axis represents a diameter of bottom of the recessed portion and a depth of the recessed portion.

Referring to FIG. 20, increasing a depth of recessed portion 16 from 0.5 mm to 15.5 mm reduces a rigidity ratio by only about 4%.

From the above results, when a width and a depth of recessed portion 16 are compared, it can be seen that an increase rate of stress with respect to a change amount of rigidity ratio is higher for the depth of recessed portion 16 than for the width of recessed portion 16. In other words, it can be seen that increasing a depth of recessed portion 16 is more effective than increasing a width of recessed portion 16 to amplify a stress by reducing a rigidity of shaft portion 11 while suppressing a reduction in a rigidity at the tip portion of the cantilever beam.

Note that cutting tool 101 may not include strain sensor 14, and shaft portion 11 may have a configuration in which strain sensor 14 is detachable.

Modification 1

Figure 21:
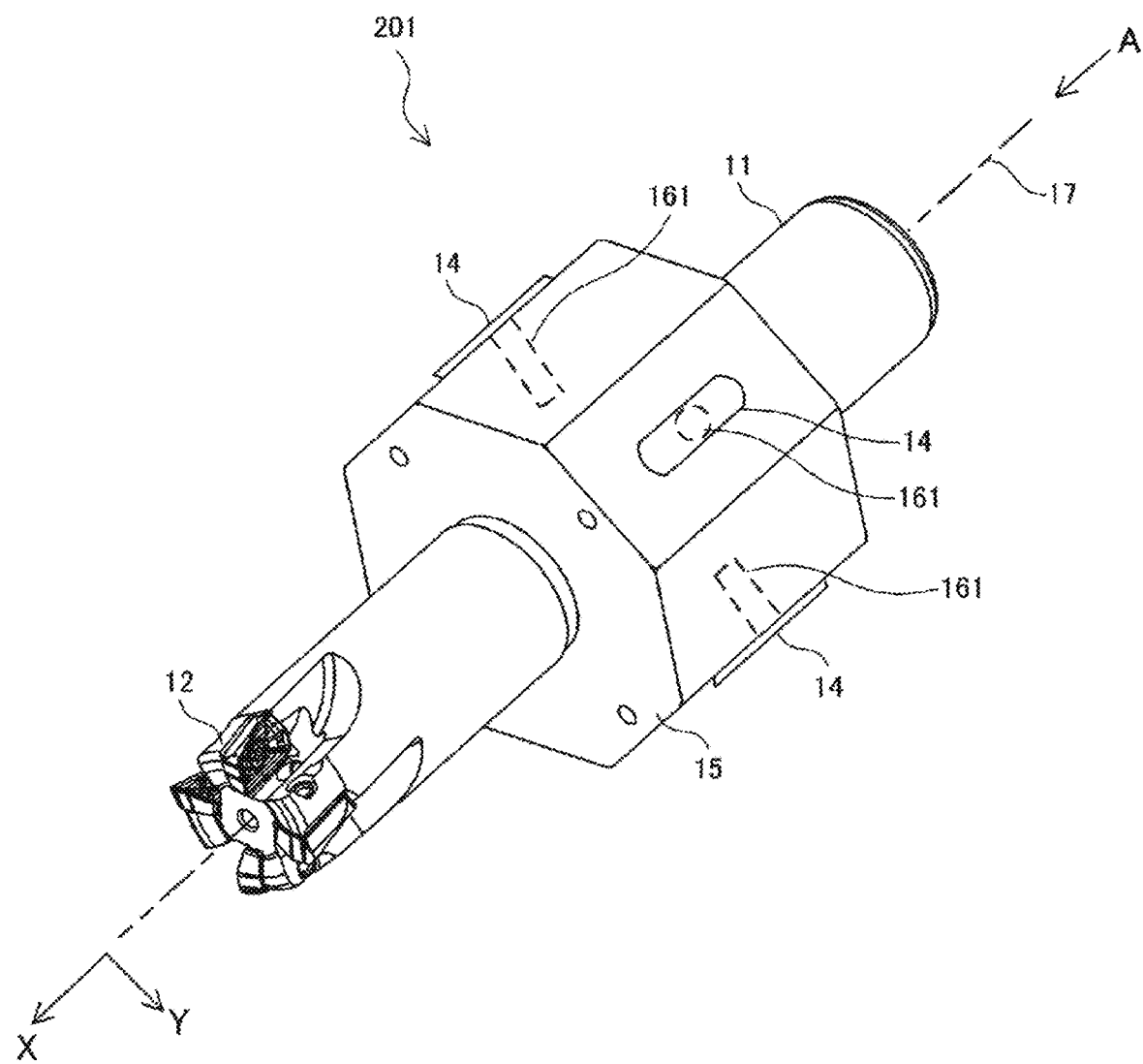
FIG. 21 is a perspective view illustrating a first modification of a cutting tool according to the first embodiment of the present disclosure.

FIG. 21 is a perspective view illustrating a first modification of a cutting tool according to the first embodiment of the present disclosure;

Referring to FIG. 21, a cutting tool 201 according to a first modification includes multiple recessed portions 161 instead of recessed portion 16 illustrated in FIG. 1.

In an example illustrated in FIG. 21, recessed portions 161 are hole portions that open in a circular shape. Recessed portions 161 are formed so as to be recessed toward central axis 17 of shaft portion 11. Recessed portions 161 may be hole portions that opens in a shape other than a circular shape. For example, recessed portions 161 may be hole portions that open in a quadrangular shape.

In the example illustrated in FIG. 21, multiple recessed portions 161 are formed at intervals in a circumferential direction of shaft portion 11. Specifically, the number of recessed portions 161 is four. Of four recessed portions 161, two recessed portions 161 are provided at positions opposite to each other with respect to central axis 17 of shaft portion 11. The other two recessed portions 161 are provided at positions opposite to each other with respect to central axis 17 of shaft portion 11. Further, recessed portions 161 are arranged at regular intervals in the circumferential direction of shaft portion 11. The number of recessed portions 161 is not limited to four, and may be, for example, one, two, three, or five or greater.

Figure 22:
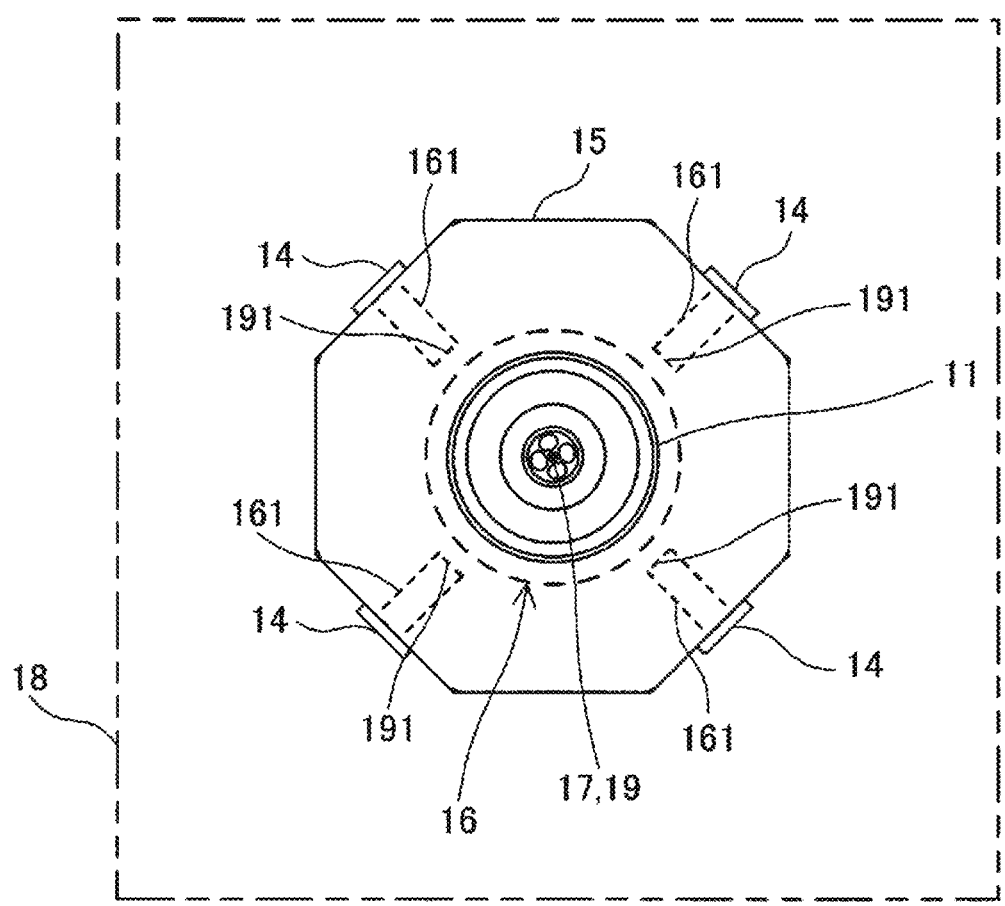
FIG. 22 is an arrow view illustrating a first modification of a cutting tool according to the first embodiment of the present disclosure.

FIG. 22 is an arrow view illustrating the first modification of a cutting tool according to the first embodiment of the present disclosure. Specifically, FIG. 22 is an arrow view seen from direction A in FIG. 21.

Referring to FIG. 22, in plane 18 in which central axis 17 of shaft portion 11 is a normal line, increased-diameter portion 15 has at least one set of recessed portions 161 provided at positions that are point-symmetrical with respect to intersection point 19 where central axis 17 and plane 18 intersect each other. In an example illustrated in FIG. 22, increased-diameter portion 15 has two sets of recessed portions 161.

Specifically, the at least one set of recessed portions 161 provided at the positions have identical widths and identical depths.

Further, when increased-diameter portion 15 is cut along plane 18, a size and a shape of the cross section of each of recessed portions 161 are the same. When increased-diameter portion 15 is cut along plane 18, a shape of a bottom surface 191 of each of recessed portions 161 on plane 18 is linear.

Figure 23:
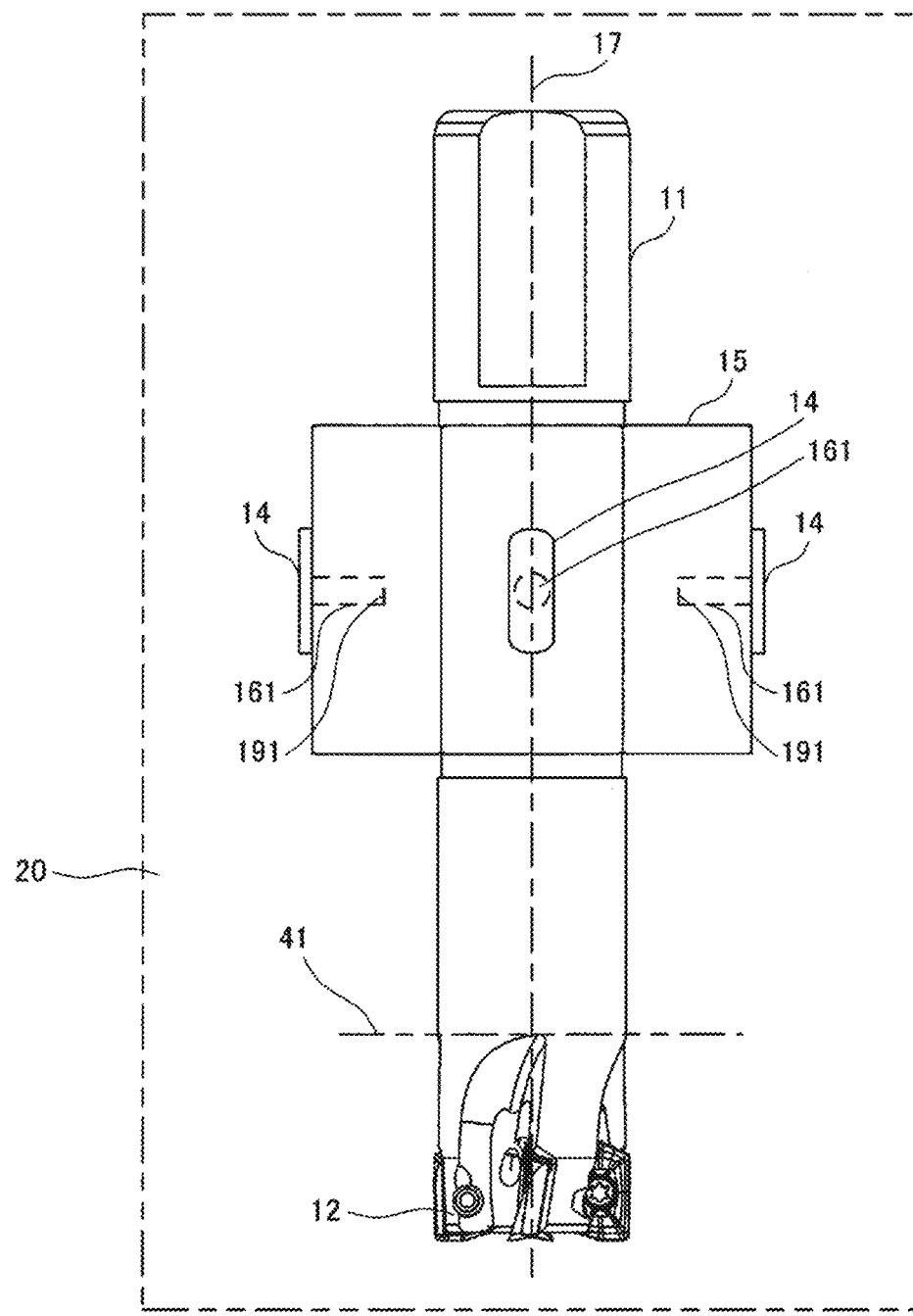
FIG. 23 is a side view illustrating a first modification of a cutting tool according to the first embodiment of the present disclosure.

FIG. 23 is a side view illustrating the first modification of a cutting tool according to the first embodiment of the present disclosure.

Referring to FIG. 23, a size and a shape of a cross section of each of recessed portions 161 when increased-diameter portion 15 is cut along plane 20 passing through central axis 17 of shaft portion 11 are the same.

When increased-diameter portion 15 is cut along plane 20, a shape of bottom surface 191 of each of recessed portions 161 on plane 20 is linear.

Figure 24:
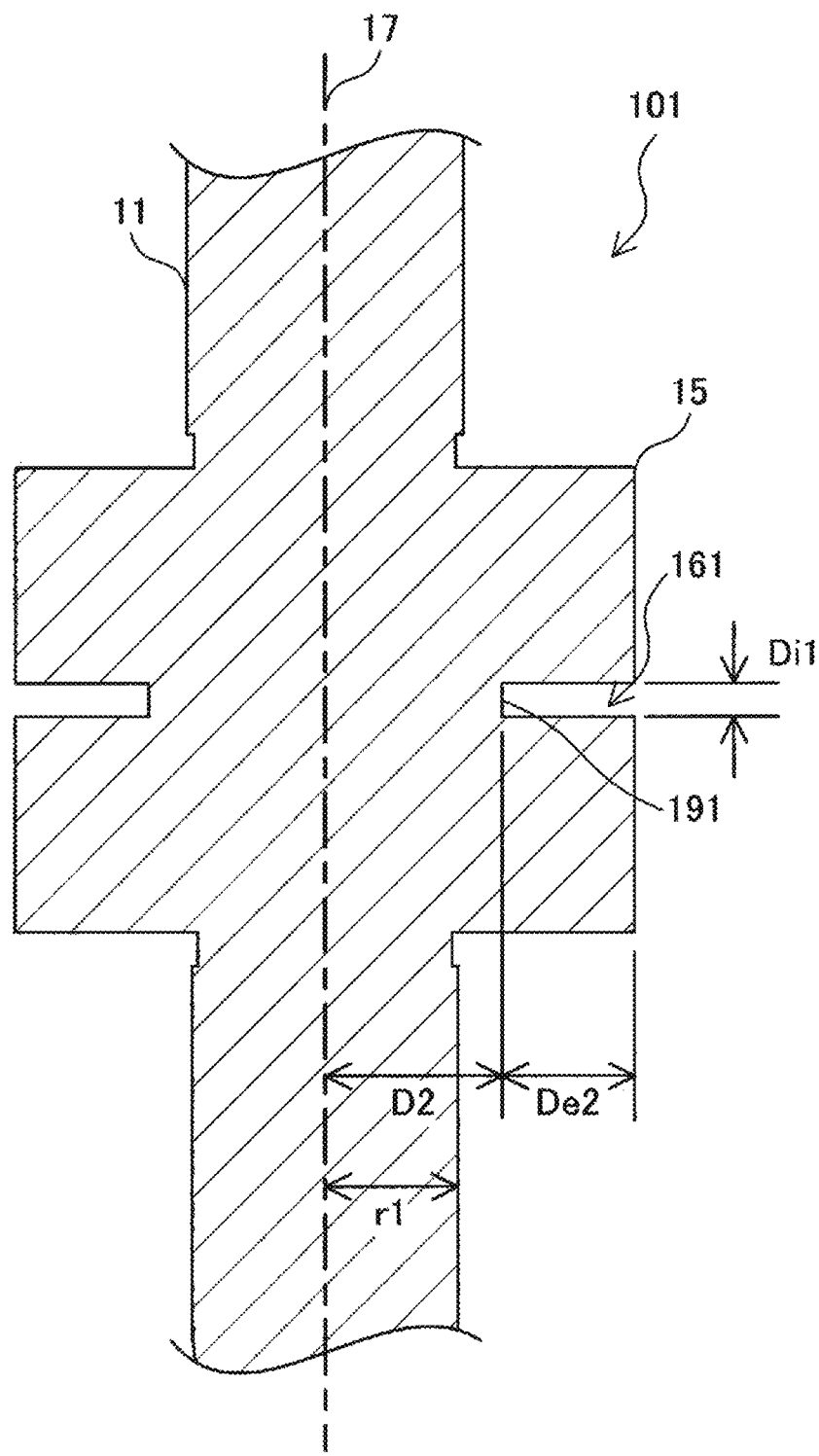
FIG. 24 is a partial cross-sectional view illustrating a configuration of a cutting tool according to the first modification of the first embodiment of the present disclosure.

FIG. 24 is a view illustrating a configuration of a cutting tool according to the first modification of the first embodiment of the present disclosure. Specifically, FIG. 24 is a partial cross-sectional view illustrating a part of shaft portion cut along a plane including a central axis of a cutting tool.

Referring to FIG. 24, a depth De2 of each of recessed portions 161 is set, for example, to a value within the same range as depth De1 of recessed portion 16 in FIG. 5.

A length of each of recessed portions 161 in a direction perpendicular to a depth direction, specifically, a radius Di1, is set to a value within the same range as width W1 of recessed portion 16 in FIG. 9, for example.

Further, a distance D2 from bottom surface 191 of each of recessed portions 161 to central axis 17 of shaft portion 111 is, for example, greater than or equal to radius r1 of a portion of shaft portion 11 other than increased-diameter portion 15.

Figure 25:
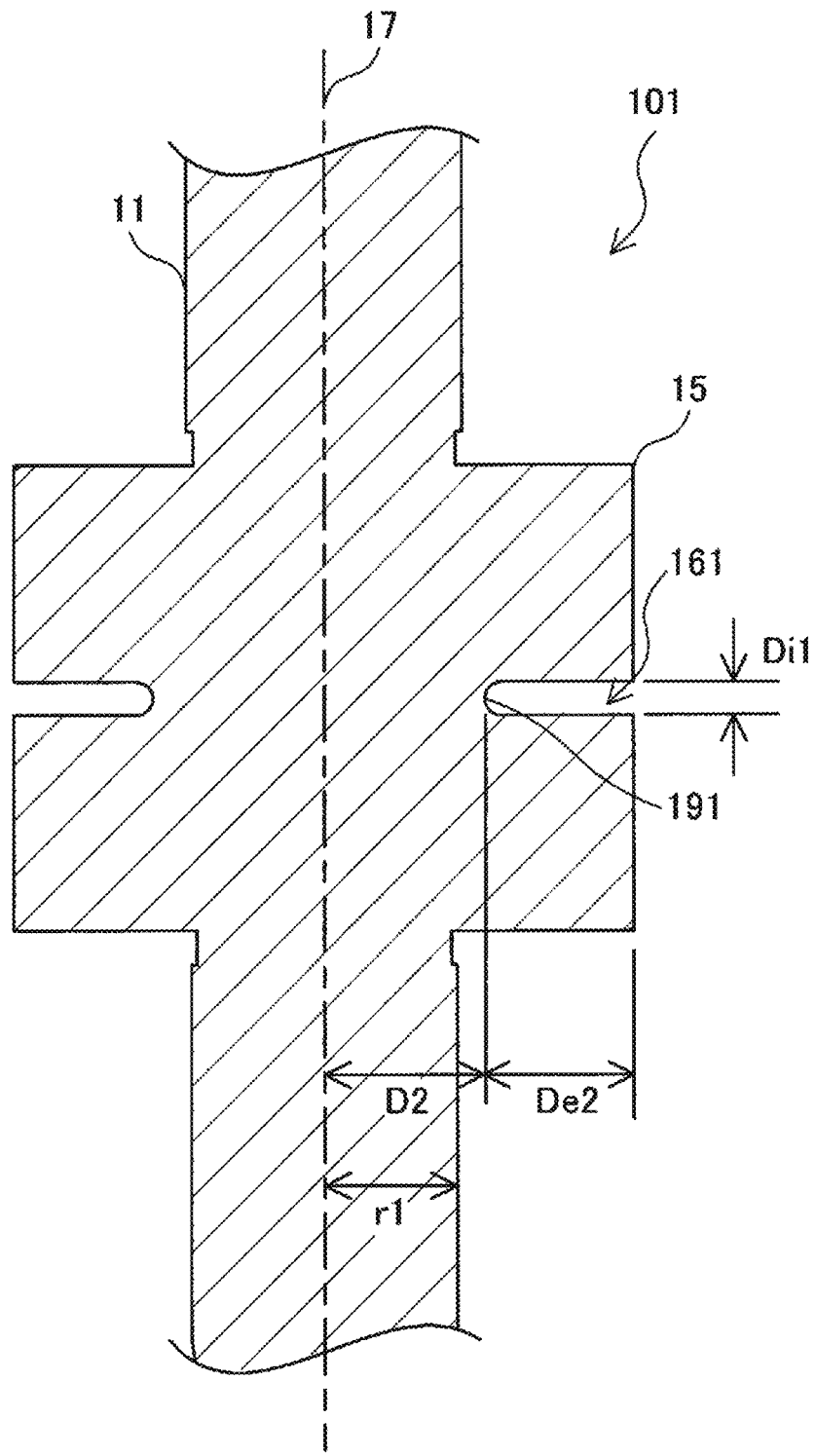
FIG. 25 is a partial cross-sectional view illustrating another example of a cutting tool according to the first modification of the first embodiment of the present disclosure.

FIG. 25 is a view illustrating another example of a cutting tool according to the first modification of the first embodiment of the present disclosure. Specifically. FIG. 25 is a partial cross-sectional view illustrating a part of a shaft portion cut along a plane including a central axis of the cutting tool.

When increased-diameter portion 15 is cut along plane 20 that passes through central axis 17 of shaft portion 11, a shape of bottom surface 191 of each of recessed portions 161 on plane 20 is not limited to a linear shape, and may be, for example, an arc shape as illustrated in FIG. 25.

Figure 26:
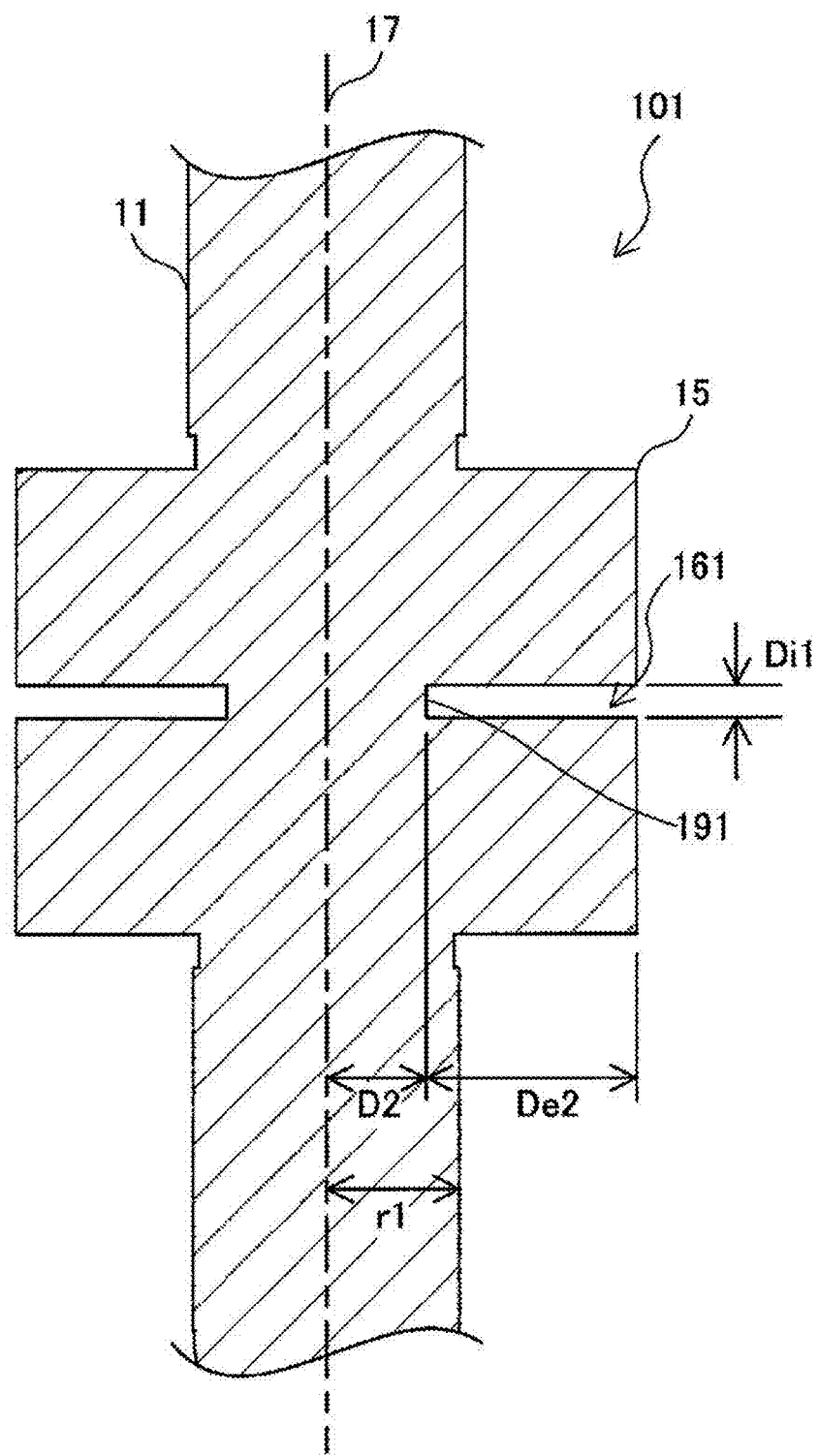
FIG. 26 is a partial cross-sectional view illustrating another example of a cutting tool according to the first modification of the first embodiment of the present disclosure.

FIG. 26 is a view illustrating another example of a cutting tool according to the first modification of the first embodiment of the present disclosure. Specifically, FIG. 26 is a partial cross-sectional view illustrating a part of a shaft portion cut along a plane including a central axis of a cutting tool.

Referring to FIG. 26, distance D2 may be less than radius r1.

The number of sets of recessed portions 161 included in increased-diameter portion 15 is not limited to two, and may be one, three, or greater, for example.

The other configuration is the same as that of cutting tool 101 described above, and thus detailed descriptions thereof will not be repeated here.

With the configuration in which recessed portion 161 is formed so as to be recessed toward central axis 17 of shaft portion 11, it is possible to further reduce a rigidity of shaft portion 11 by forming recessed portion 16 in a peripheral surface of shaft portion 11 where a large strain tends to appear, specifically, for example, in the peripheral surface of increased-diameter portion 15. Therefore, a strain of cutting tool 101 caused by cutting can be measured with a higher accuracy.

The configuration in which increased-diameter portion 15 has at least one set of recessed portions 161 provided at a point-symmetrical with respect to intersection point 19 where central axis 17 and plane 18 intersect each other makes it possible to suppress generation of an anisotropic strain, so that, for example, when multiple strain sensors 14 are mounted on the peripheral surface of shaft portion 11, the state of cutting tool 101 can be more accurately reflected in a measurement value of strain sensors 14.

Second Modification

Figure 27:
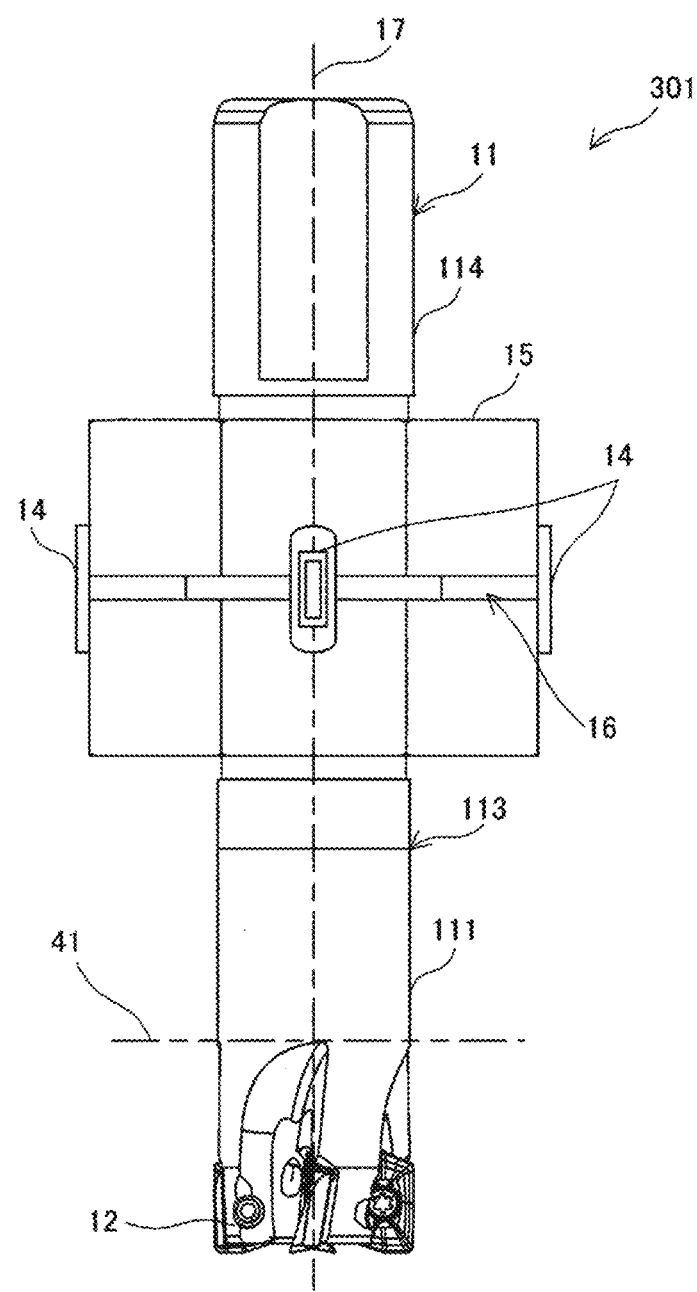
FIG. 27 is aside view illustrating a second modification of a cutting tool according to the first embodiment of the present disclosure.
Figure 28:
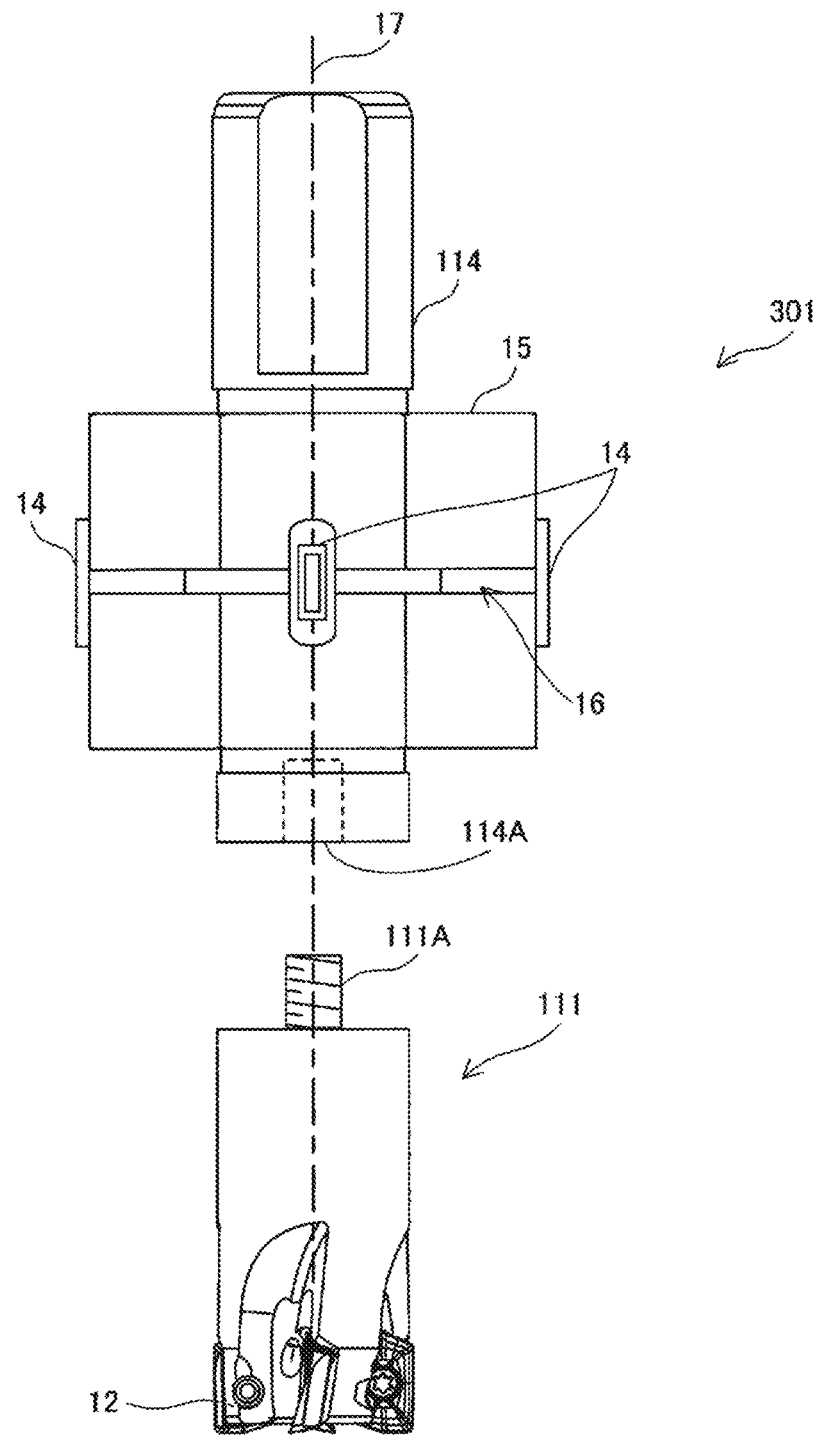
FIG. 28 is a side view illustrating a second modification of a cutting tool according to the first embodiment of the present disclosure in a divided state.

FIG. 27 is a side view illustrating a second modification of a cutting tool according to the first embodiment of the present disclosure. FIG. 28 is a side view illustrating a second modification of a cutting tool according to the first embodiment of the present disclosure in a divided state.

Referring to FIGS. 27 and 28, shaft portion 11 of a cutting tool 301 according to the second modification is configured to be dividable in longitudinal direction X of shaft portion 11.

Specifically, for example, shaft portion 11 is configured to be dividable into a blade-side portion 111 that is a portion close to blade mounting portion 12 and an opposite blade-side portion 114 that is a portion on the opposite side of shaft portion 11 from blade mounting portion 12, at a position closer to blade mounting portion 12 than to increased-diameter portion 15.

A male screw portion 111A is provided at an end portion on the opposite side of blade-side portion 111 from blade mounting portion 12. Further, a female screw portion 114A is provided at an end portion of opposite blade-side portion 114 close to blade mounting portion 12. By screwing male screw portion 111A and female screw portion 114A together, blade-side portion 111 and opposite blade-side portion 114 are connected to each other. Further, blade-side portion 111 and opposite blade-side portion 114 are separated from each other by releasing the screwed engagement between male screw portion 111A and female screw portion 114A.

Note that a female screw portion may be provided at the end portion on the opposite side of blade-side portion 11 from blade mounting portion 12, and a male screw portion may be provided at the end portion of opposite blade-side portion 114 close to blade mounting portion 12.

Further, for example, shaft portion 11 may be configured to be dividable into a portion close to blade mounting portion 12 and a portion on the opposite side of shaft portion 11 from blade mounting portion 12, at a position opposite from blade mounting portion 12 with respect to increased-diameter portion 15.

The other configuration is the same as that of cutting tool 101 described above, and thus detailed descriptions thereof will not be repeated here.

Third Modification

Figure 29:
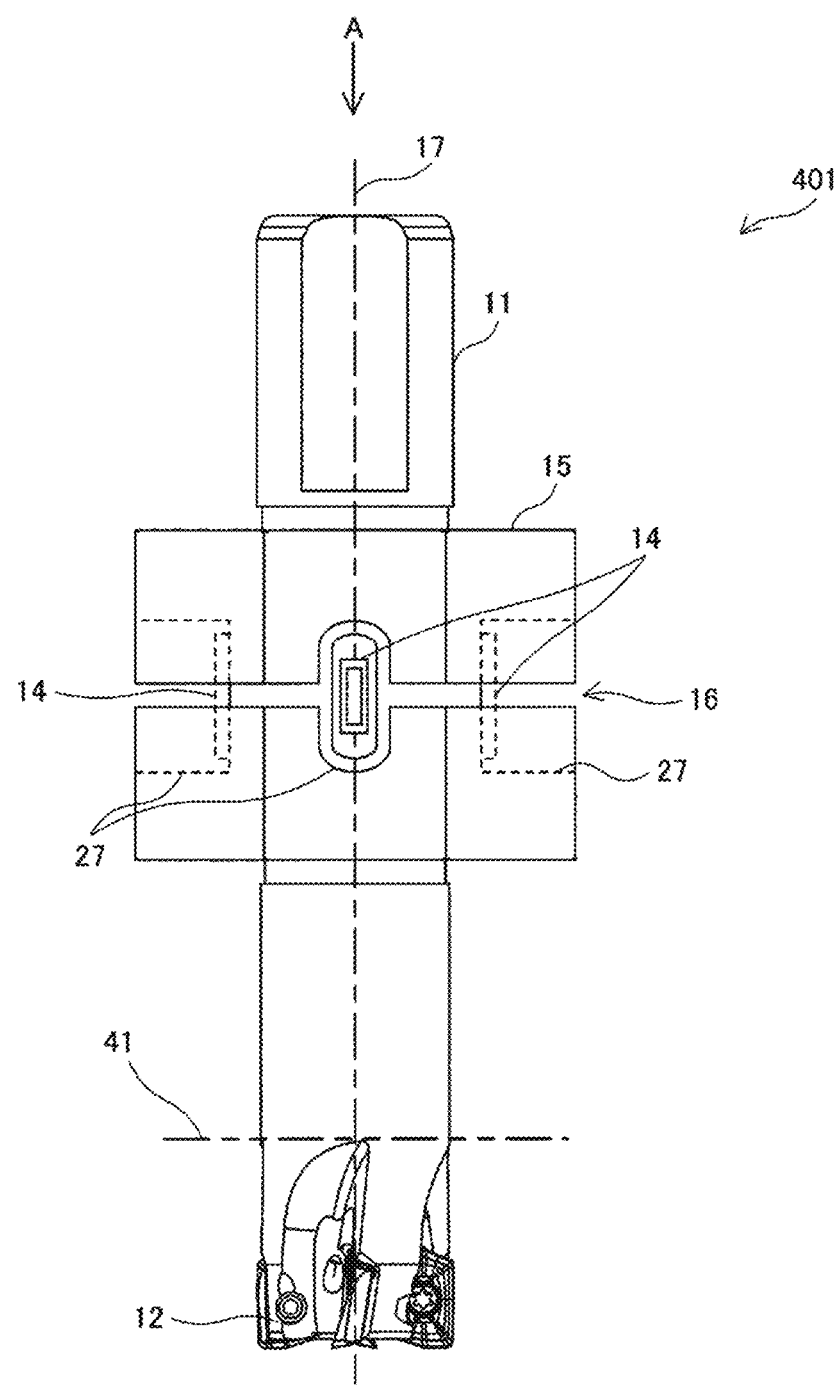
FIG. 29 is a side view illustrating a third modification of a cutting tool according to the first embodiment of the present disclosure.

FIG. 29 is a side view illustrating a third modification of a cutting tool according to the first embodiment of the present disclosure.

Referring to FIG. 29, increased-diameter portion 15 of a cutting tool 401 according to the third modification has a recessed portion 27 at a position where strain sensor 14 is to be mounted. Hereinafter, recessed portion 27 is also referred to as a mounting recessed portion 27. In an example illustrated in FIG. 29, mounting recessed portion 27 is formed at a position perpendicular to recessed portion 16 in increased-diameter portion 15.

Mounting recessed portion 27 is formed so as to be recessed toward central axis 17 of shaft portion 11. An opening and a bottom surface of mounting recessed portion 27 are each larger than strain sensor 14. Specifically, the opening and the bottom surface of mounting recessed portion 27 each have a shape of uniformly enlarged strain sensor 14 for example. A depth of mounting recessed portion 27 is for example the same as the depth of recessed portion 16.

Figure 30:
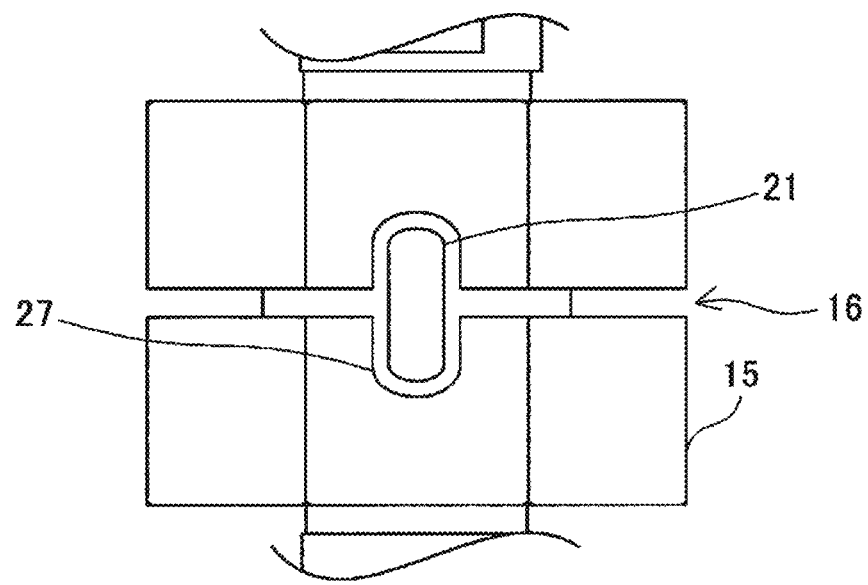
FIG. 30 is an enlarged side view illustrating a vicinity of an increased-diameter portion in FIG. 29.

FIG. 30 is an enlarged side view illustrating a vicinity of an increased-diameter portion in FIG. 29. For convenience, a strain sensor is not illustrated in FIG. 30.

Referring to FIG. 30, mark 21 is provided on the bottom surface of mounting recessed portion 27. A user can mount strain sensor 14 to a mounting position indicated by mark 21.

The other configuration is the same as that of cutting tool 101 described above, and thus detailed descriptions thereof will not be repeated here.

Next, another embodiment of the present disclosure will be described with reference to the drawings. In the drawings, like or corresponding elements are denoted by like reference numerals, and descriptions thereof will not be repeated.

Second Embodiment

A second embodiment according to the present disclosure relates to a cutting tool in which the shape of the recessed portion is changed as compared with cutting tool 101 according to the first embodiment. Other than the contents described below, the cutting tool of the present embodiment is the same as cutting tool 101 according to the first embodiment.

Figure 31:
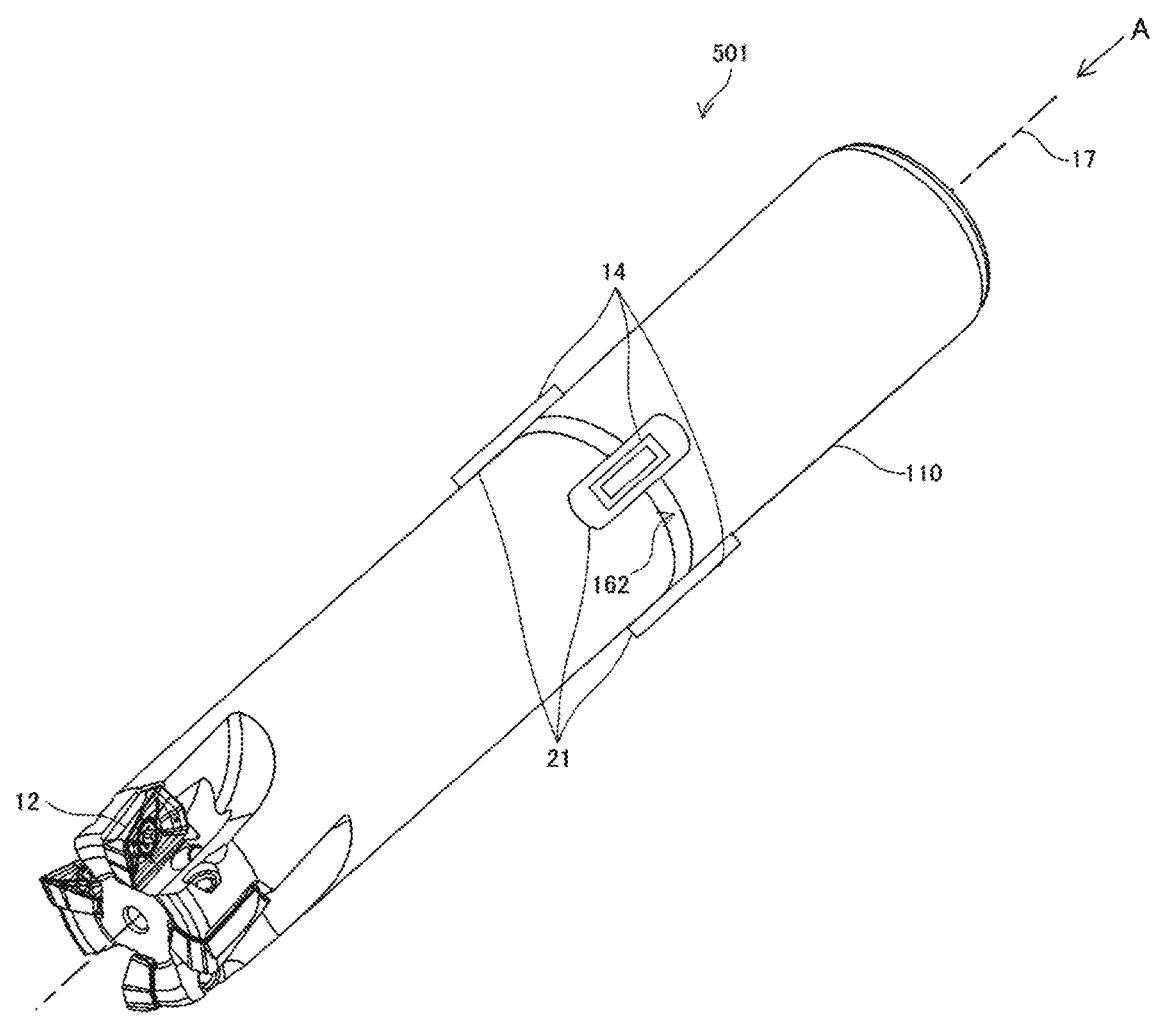
FIG. 31 is a perspective view illustrating a configuration of a cutting tool according to a second embodiment of the present disclosure.
Figure 32:
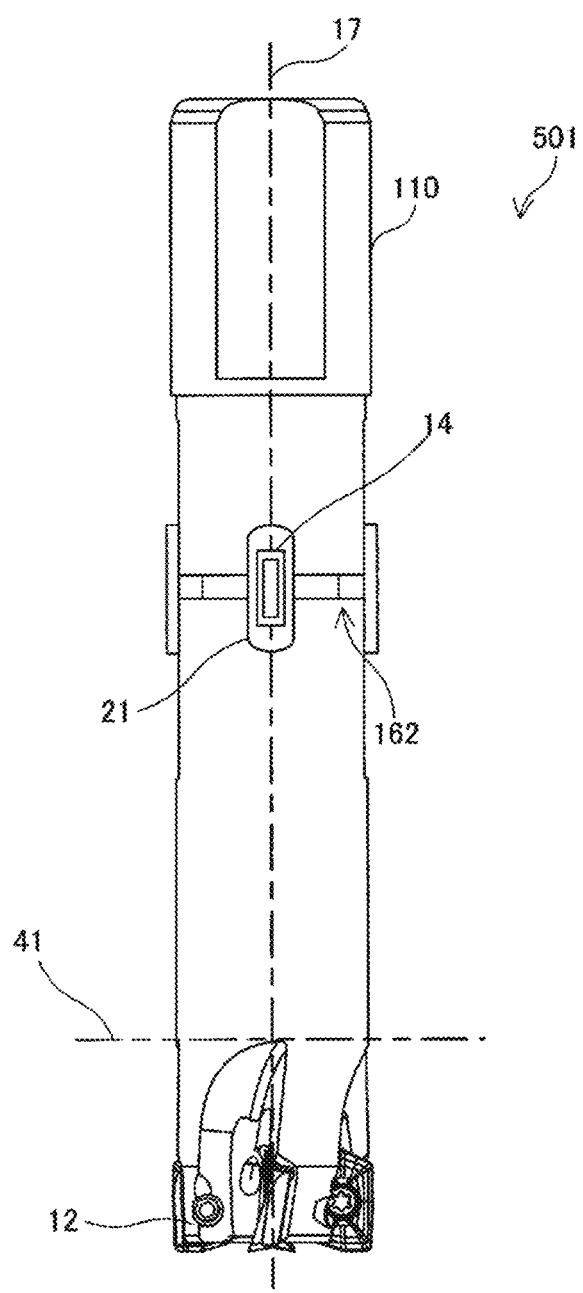
FIG. 32 is a side view illustrating a configuration of a cutting tool according to the second embodiment of the present disclosure.
Figure 33:
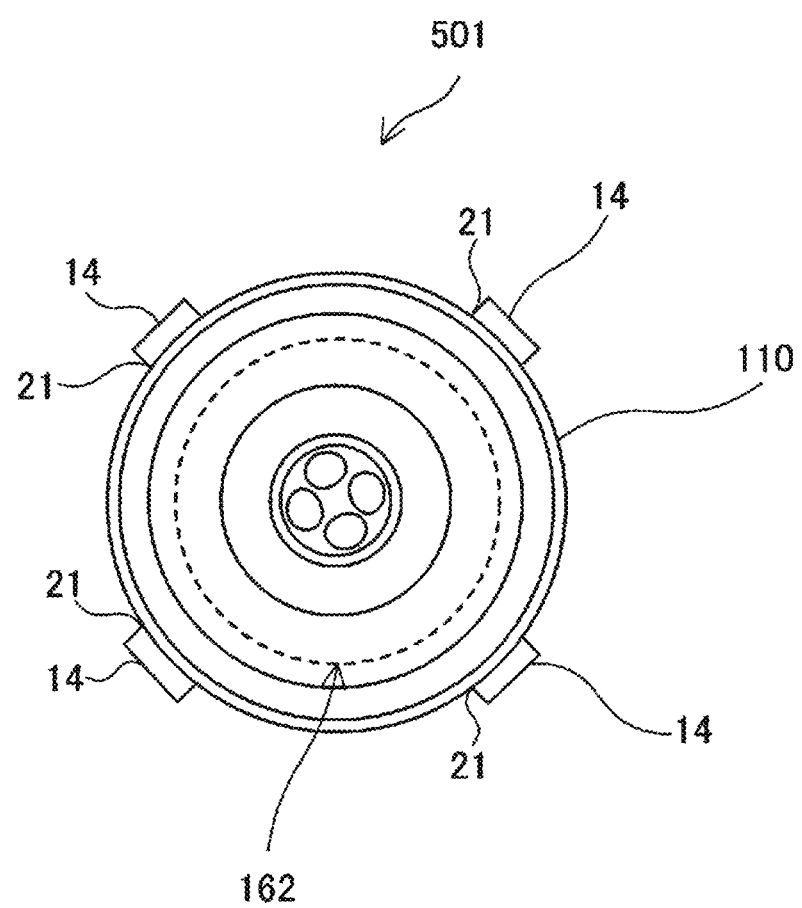
FIG. 33 is an arrow view illustrating a configuration of a cutting tool according to the second embodiment of the present disclosure.

FIG. 31 is a perspective view illustrating a configuration of a cutting tool according to a second embodiment of the present disclosure. FIG. 32 is a side view illustrating a configuration of a cutting tool according to the second embodiment of the present disclosure. FIG. 33 is a diagram illustrating a configuration of a cutting tool according to the second embodiment of the present disclosure. Specifically, FIG. 33 is an arrow view seen from direction A in FIG. 21.

Referring to FIGS. 31 to 33, as compared with cutting tool 101 illustrated in FIG. 1, cutting tool 501 includes shaft portion 110 instead of shaft portion 11. Further, an increased-diameter portion is not formed in shaft portion 1110. In addition, instead of recessed portion 16 illustrated in FIG. 1, recessed portion 162 is formed in a peripheral surface of shaft portion 110. A sensor mounting portion 21 to which strain sensor 14 can be mounted is provided near recessed portion 162.

In an example illustrated in FIG. 32, a boundary between shaft portion 110 and blade mounting portion 12 is indicated by a two-dot chain line 41.

Recessed portion 162 is formed such that when cutting is performed by cutting tool 501 in a state in which strain sensor 14 is mounted to sensor mounting portion 21 of shaft portion 110, a strain generated in at least one of recessed portion 162 or a periphery of recessed portion 162 can be detected by strain sensor 14.

In an example illustrated in FIGS. 31 to 33, recessed portion 162 is formed in a circumferential direction of shaft portion 110.

Recessed portion 162 is formed continuously over the entire periphery in a circumferential direction of shaft portion 110. In FIG. 33, recessed portion 162 is indicated by a dashed line. Note that recessed portion 162 may be formed intermittently in the circumferential direction of shaft portion 110. That is, multiple recessed portions 162 may be formed in a discontinuous state from each other.

As long as shaft portion 110 has a certain degree of rigidity, even when increased-diameter portion is not formed in shaft portion 110, a high rigidity can be ensured, and thus the influence of the formation of recessed portion 162 on a rigidity reduction can be reduced. This makes it possible to reduce a displacement of shaft portion 110 caused by a cutting force while enabling strain sensor 14 to measure a strain.

FIGS. 34 to 37 are side views illustrating other examples of a configuration of a cutting tool according to the second embodiment of the present disclosure.

In an example illustrated in FIG. 31, recessed portion 162 is formed in an end mill, which is a type of milling tool, but is not limited thereto. For example, referring to FIG. 34, recessed portion 162 may be formed in a body portion 125, which is an example of a shaft portion in a drill 502 as a type of milling tool.

Figure 34:
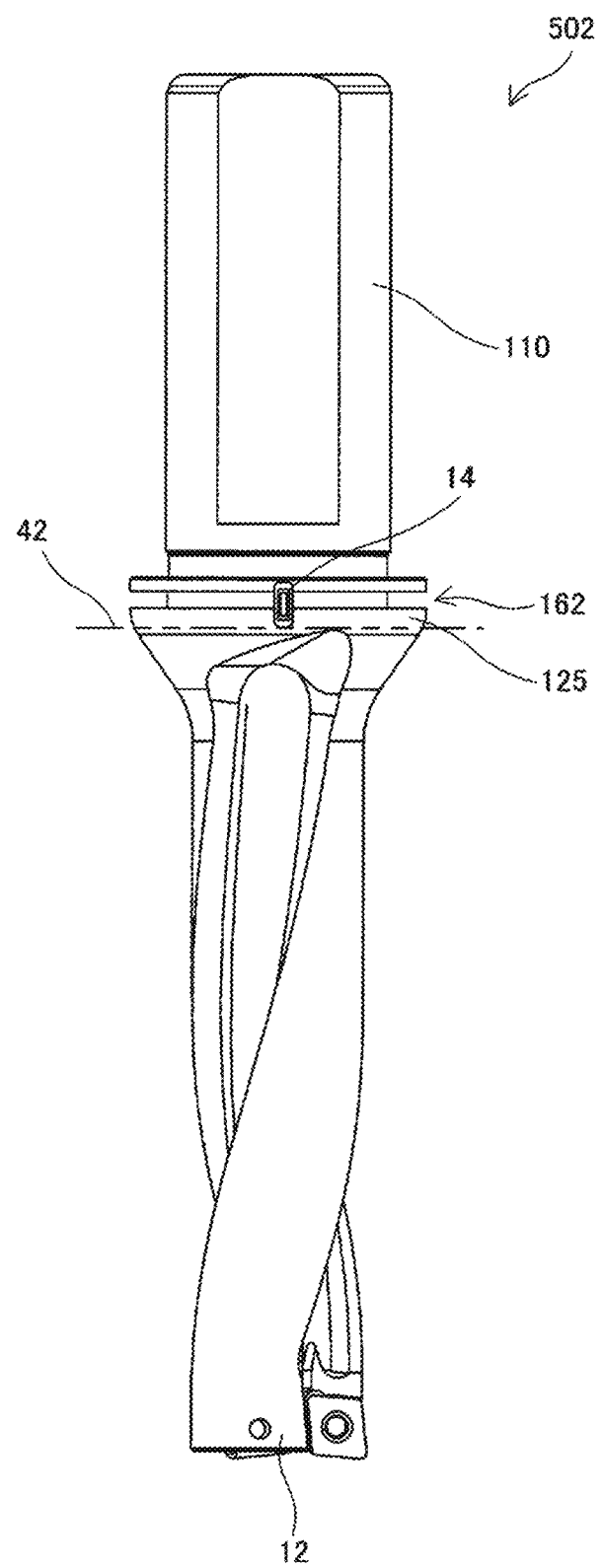
FIG. 34 is a side view illustrating another example of a configuration of a cutting tool according to the second embodiment of the present disclosure.

In an example illustrated in FIG. 34, shaft portion 110, body portion 125, and blade mounting portion 12 are integrally formed side by side in this order. A boundary between body portion 125 and blade mounting portion 12 is indicated by a two-dot chain line 42.

Figure 35:
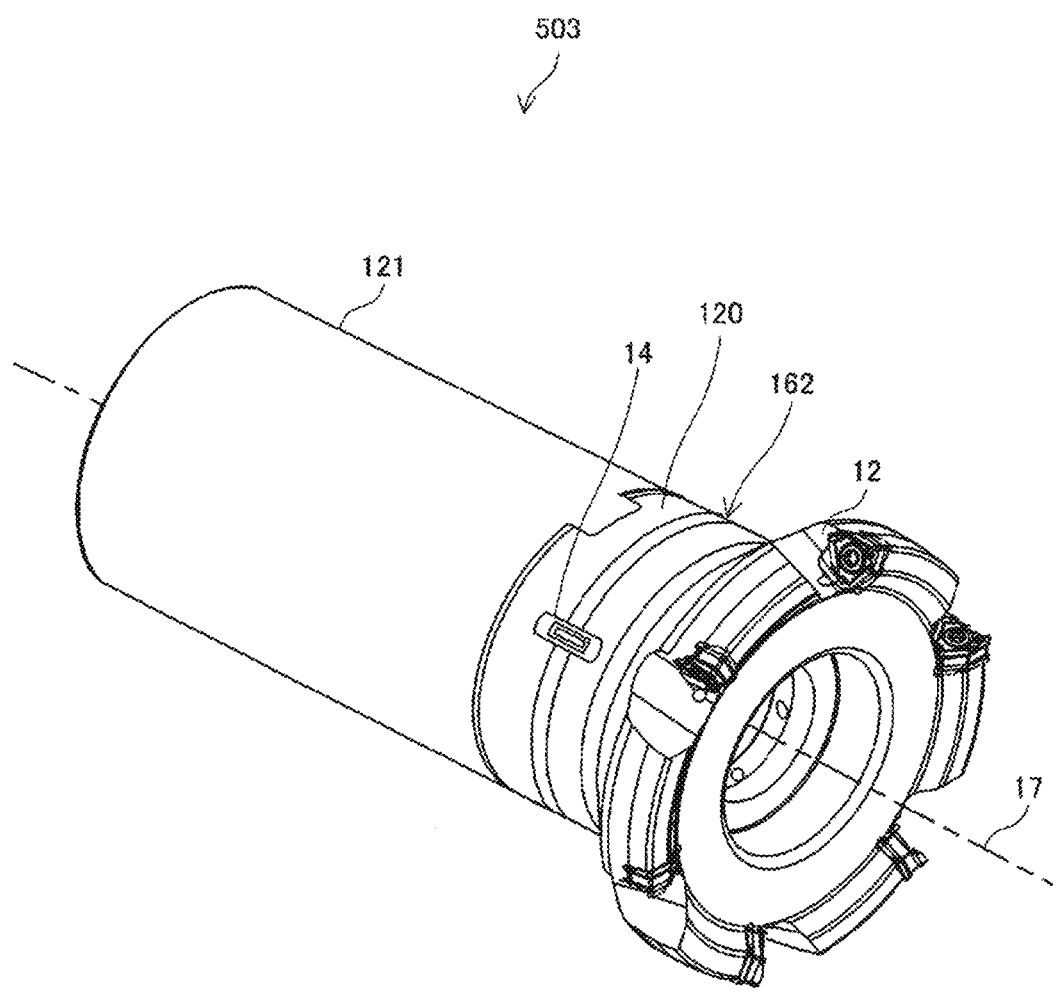
FIG. 35 is a perspective view illustrating another example of a configuration of a cutting tool according to the second embodiment of the present disclosure.
Figure 36:
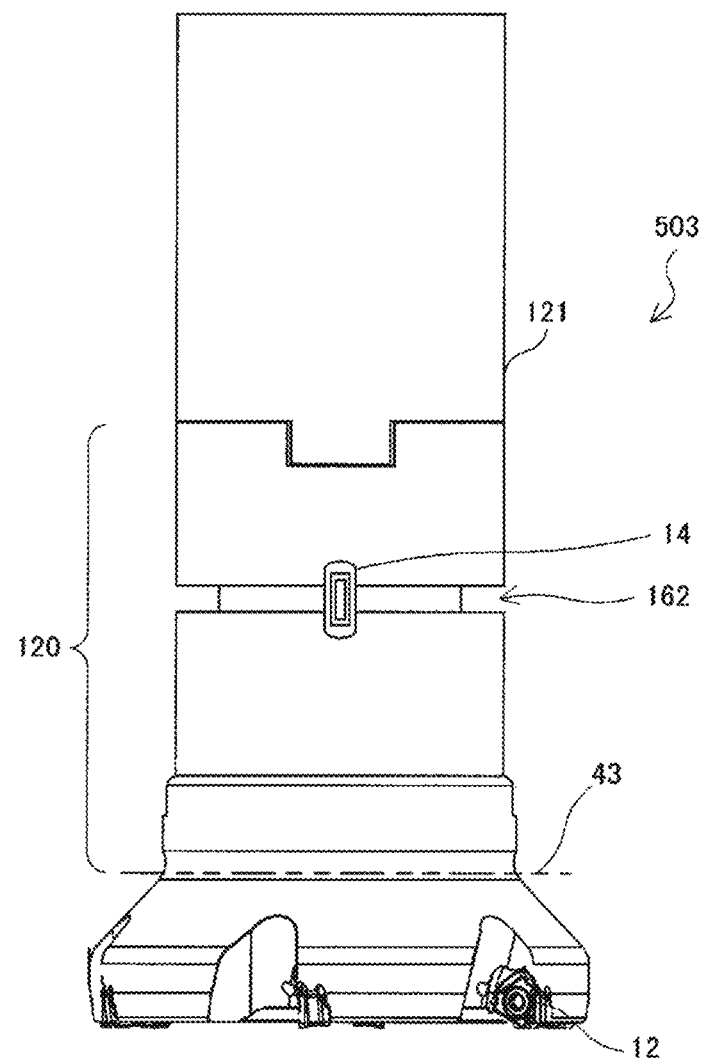
FIG. 36 is a side view illustrating another example of a configuration of a cutting tool according to the second embodiment of the present disclosure.

Referring to FIGS. 35 and 36, recessed portion 162 may be formed in a boss portion 120, which is an example of a shaft portion in a milling cutter 503 as a type of milling tool.

In an example illustrated in FIGS. 35 and 36, boss portion 120 and blade mounting portion 12 are integrally formed. In FIG. 36, a boundary between boss portion 120 and blade mounting portion 12 is indicated by a two-dot chain line 43.

In the example illustrated in FIGS. 35 and 36, shaft portion 121 is connected to an end portion on the opposite side of boss portion 120 from blade mounting portion 12. Note that shaft portion 121 may not be connected to boss portion 120.

Figure 37:
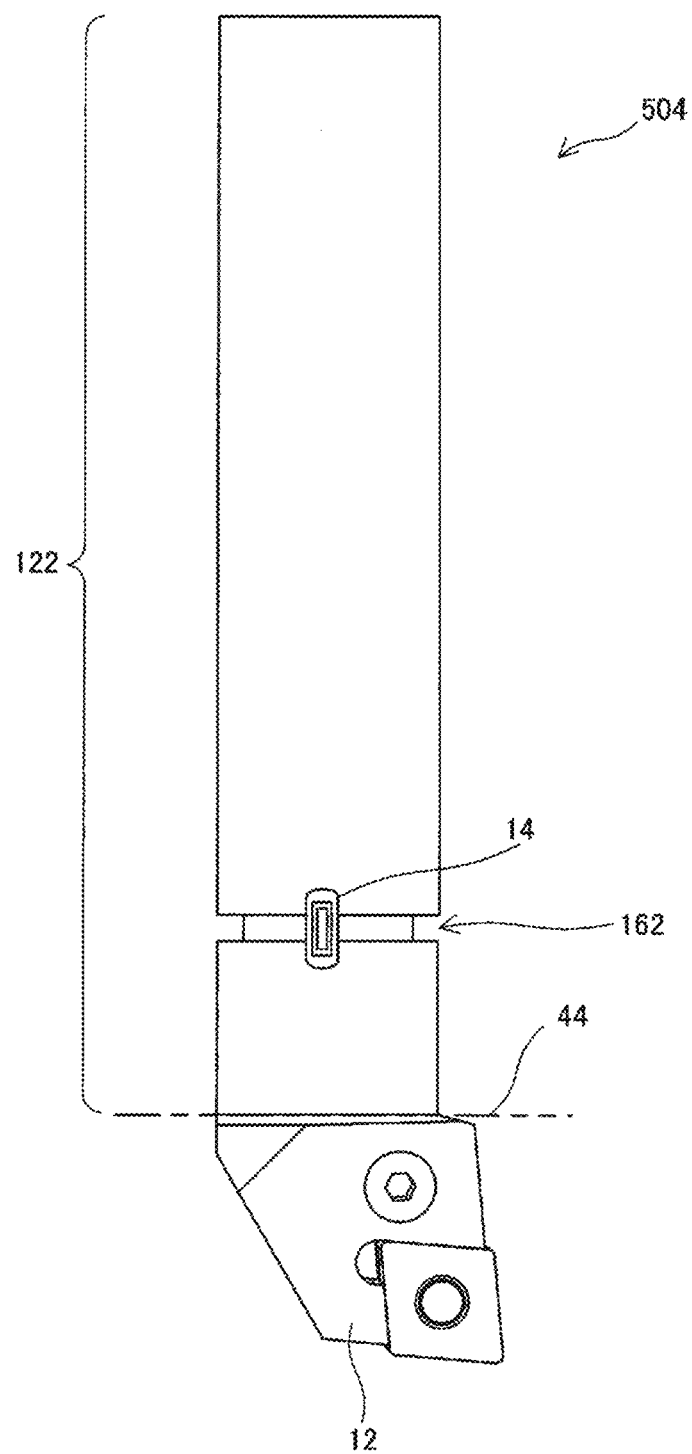
FIG. 37 is a side view illustrating another example of a configuration of a cutting tool according to the second embodiment of the present disclosure.

Referring to FIG. 37, recessed portion 162 may be formed in a shaft portion 122 of a turning tool 504 as a type of milling tool.

In an example illustrated in FIG. 37, shaft portion 122 and blade mounting portion 12 are integrally formed. A boundary between shaft portion 122 and blade mounting portion 12 is indicated by a two-dot chain line 44.

Modification 1

Figure 38:
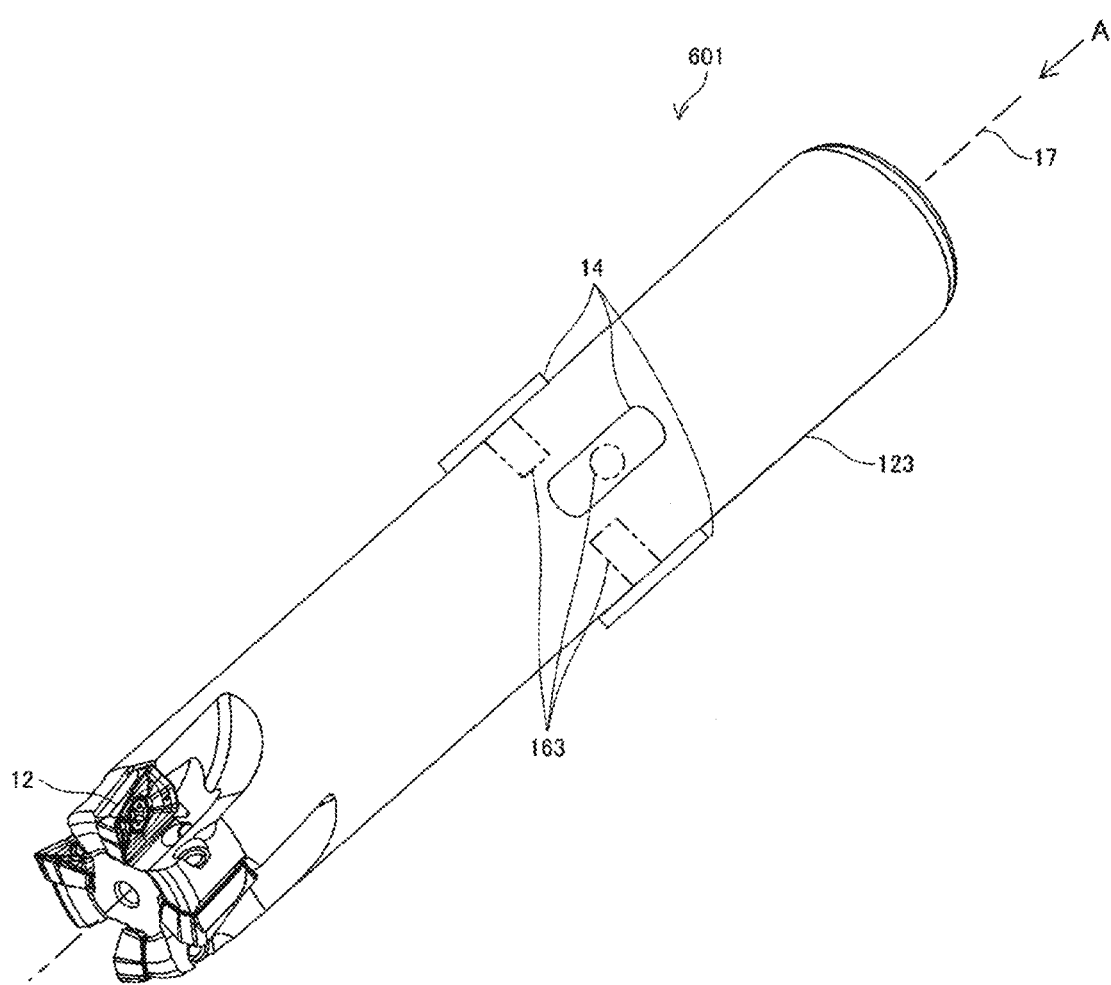
FIG. 38 is a perspective view illustrating a first modification of a cutting tool according to the second embodiment of the present disclosure.
Figure 39:
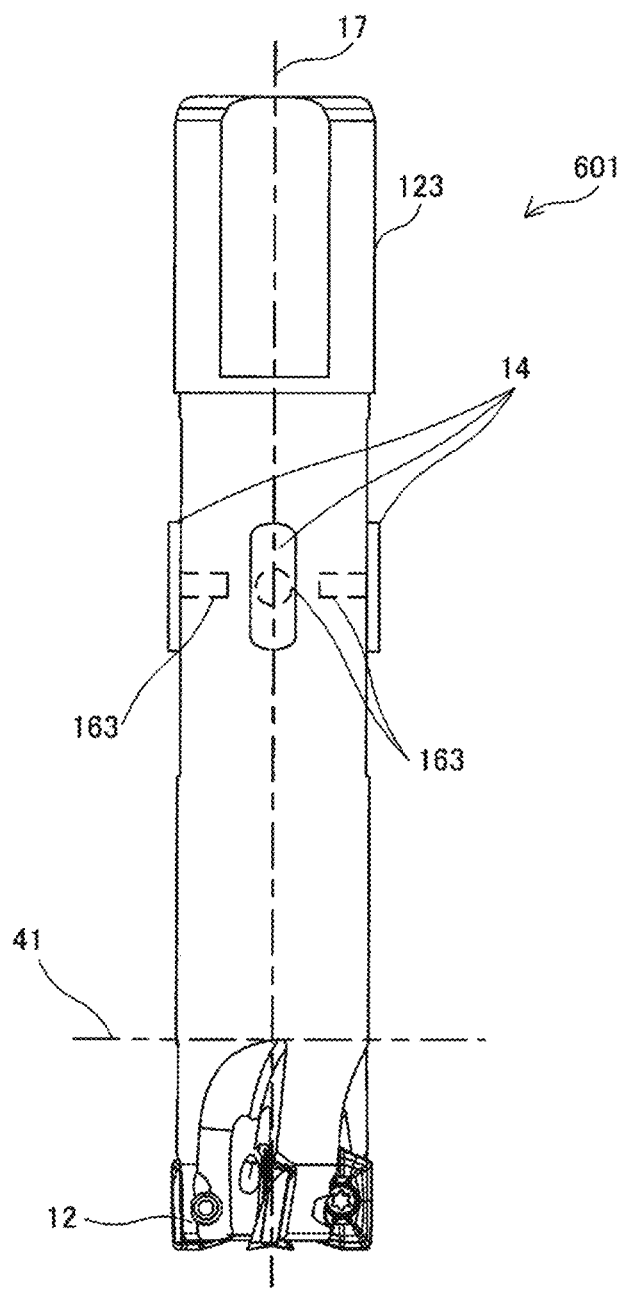
FIG. 39 is aside view illustrating a first modification of a cutting tool according to the second embodiment of the present disclosure.

FIG. 38 is a perspective view illustrating a first modification of a cutting tool according to the second embodiment of the present disclosure. FIG. 39 is a side view illustrating the first modification of a cutting tool according to the second embodiment of the present disclosure.

Referring to FIGS. 38 and 39, a cutting tool 601 according to the first modification includes multiple recessed portions 163 instead of recessed portions 162 illustrated in FIG. 32.

In an example illustrated in FIGS. 38 and 39, recessed portions 163 are hole portions that open in a circular shape. Recessed portions 163 are formed to be recessed toward central axis 17 of a shaft portion 123. Recessed portions 163 may be hole portions that open in a shape other than a circular shape. For example, recessed portions 163 may be hole portions that open in a quadrangular shape.

In the example illustrated in FIGS. 38 and 39, multiple recessed portions 163 are formed at intervals in a circumferential direction of shaft portion 123. Specifically, the number of recessed portions 163 is four. Of the four recessed portions 163, two recessed portions 163 are provided at positions opposite to each other with respect to central axis 17 of shaft portion 123.

The other two recessed portions 163 are provided at positions opposite to each other with respect to central axis 17 of shaft portion 123. Further, recessed portions 163 are each provided at positions arranged at equal intervals in the circumferential direction of shaft portion 123. The number of recessed portions 163 is not limited to four, and may be, for example, two, three, or five or greater.

Figure 40:
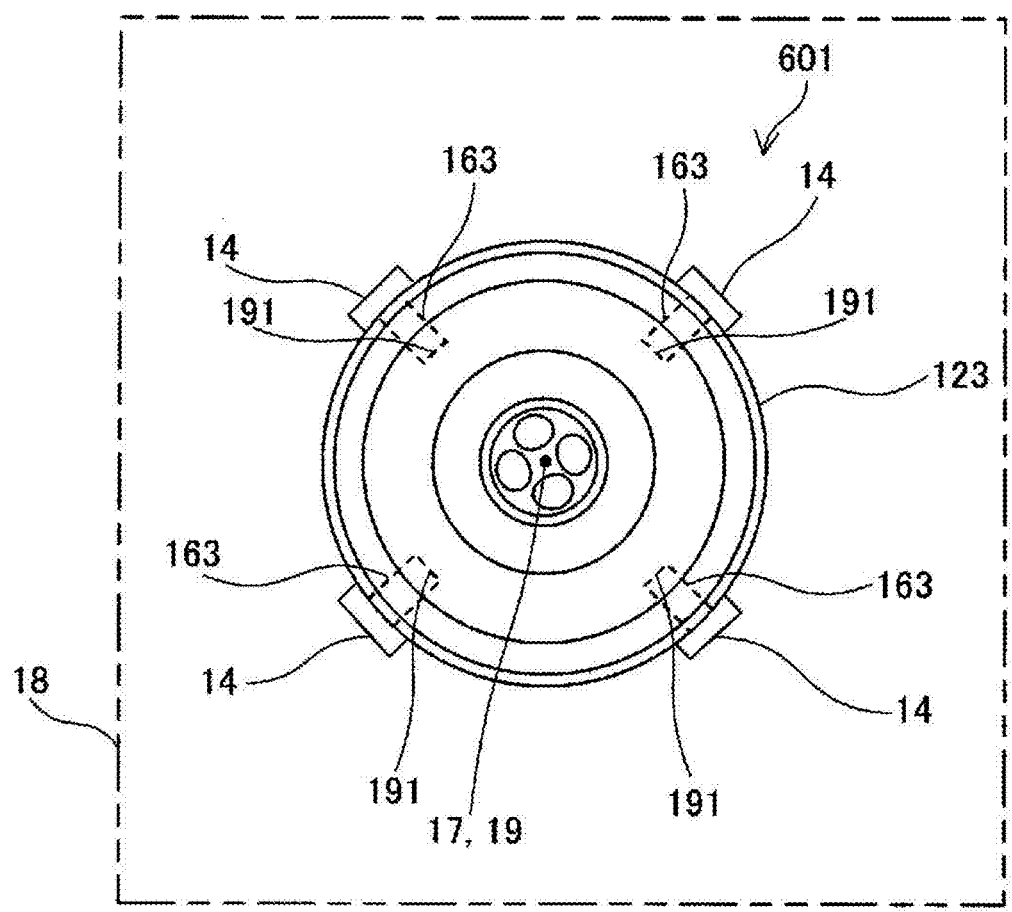
FIG. 40 is an arrow view illustrating a first modification of a cutting tool according to the second embodiment of the present disclosure.

FIG. 40 is a diagram illustrating the first modification of a cutting tool according to the second embodiment of the present disclosure. Specifically, FIG. 40 is an arrow view seen from direction A in FIG. 38.

Referring to FIG. 40, in plane 18 in which central axis 17 of shaft portion 123 is a normal line, shaft portion 123 has at least one set of recessed portions 163 provided at positions that are point-symmetrical with respect to intersection point 19 where central axis 17 and plane 18 intersect each other. In an example illustrated in FIG. 40, shaft portion 123 has two sets of recessed portions 163.

When shaft portion 123 is cut along plane 18, a size and a shape of the cross section of each of recessed portions 163 are the same. When shaft portion 123 is cut along plane 18, a shape of bottom surface 191 of each of recessed portions 163 on plane 18 is linear.

The number of sets of recessed portions 163 included in shaft portion 123 is not limited to two, and may be one, three, or greater, for example.

The other configuration is the same as that of cutting tool 501 described above, and thus detailed descriptions thereof will not be repeated here.

In this manner, with the configuration in which recessed portions 162 formed in shaft portion 110 is formed such that a strain generated in at least one of recessed portions 162 or peripheries of recessed portions 162 can be detected by strain sensor 14, for example, it is possible to locally reduce a rigidity of shaft portion 110 when a certain degree of rigidity of the entire shaft portion 110 is ensured. As a result, a strain generated during cutting increases locally.

Therefore, in the cutting tools according to the second embodiment of the present disclosure, strain sensor 14 is mounted to a portion where a rigidity is locally decreased, and thus it is possible to accurately measure a strain of cutting tool 501 caused by cutting while securing a rigidity of cutting tool 501.

Next, another embodiment according to the present disclosure will be described with reference to the drawings. In the drawings, like or corresponding elements are denoted by like reference numerals, and descriptions thereof will not be repeated.

Third Embodiment

A third embodiment according to the present disclosure relates to a cutting tool unit in which increased-diameter portion is not provided in a cutting tool and increased-diameter module is provided instead of increased-diameter portion, as compared with cutting tool 101 according to the first embodiment. Other than the contents described below, the cutting tool of the present embodiment is the same as cutting tool 101 according to the first embodiment.

Figure 41:
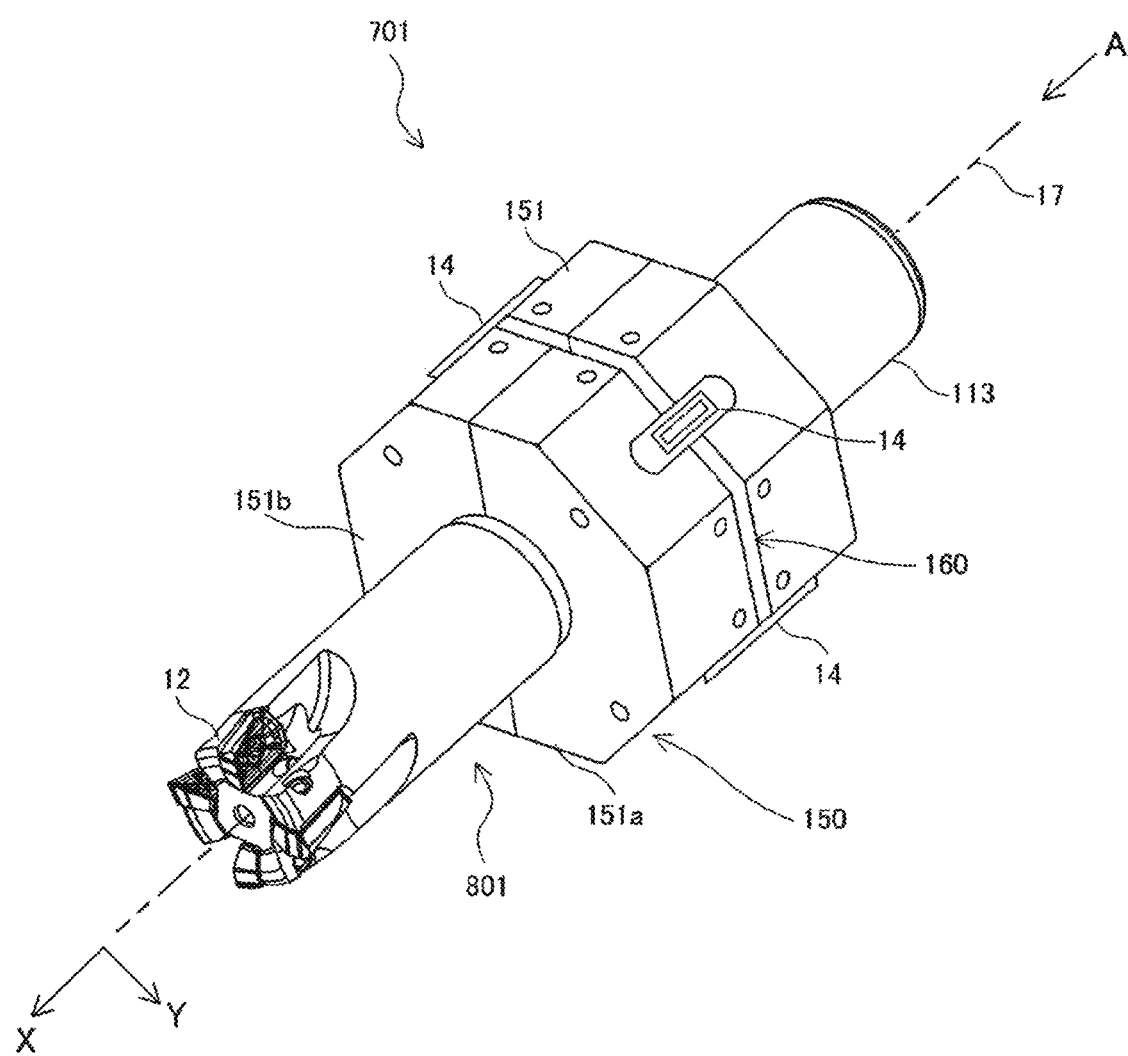
FIG. 41 is a perspective view illustrating a configuration of a cutting tool unit according to a third embodiment of the present disclosure.

FIG. 41 is a perspective view illustrating a configuration of a cutting tool unit according to the third embodiment of the present disclosure.

Referring to FIG. 41, a cutting tool unit 701 includes a cutting tool 801 and an increased-diameter module 150.

Cutting tool 801 includes a shaft portion 113, which is a shaft portion, and blade mounting portion 12 or a blade portion provided at an end portion of shaft portion 113.

Shaft portion 113 does not include increased-diameter portion 15 illustrated in FIG. 1. Recessed portion 162 illustrated in FIG. 31 is not formed in shaft portion 113.

Increased-diameter module 150 is configured to be mountable to shaft portion 113. That is, as compared with cutting tool 101 illustrated in FIG. 1, cutting tool unit 701 includes increased-diameter module 150 instead of increased-diameter portion 15.

Specifically, increased-diameter module 150 includes body 151, a coupling mechanism (not illustrated), and strain sensor 14.

Body 151 is formed in a cylindrical shape. Further, body 151 has a cylindrical shape allowing insertion of shaft portion 113, and is mountable to shaft portion 113 so that an inner peripheral surface of body 151 covers a peripheral surface of shaft portion 113. Further, recessed portion 160 is formed in a peripheral surface of body 151.

Recessed portion 160 has, for example, the same shape and the same dimensions as recessed portion 16 illustrated in FIG. 1.

Figure 42:
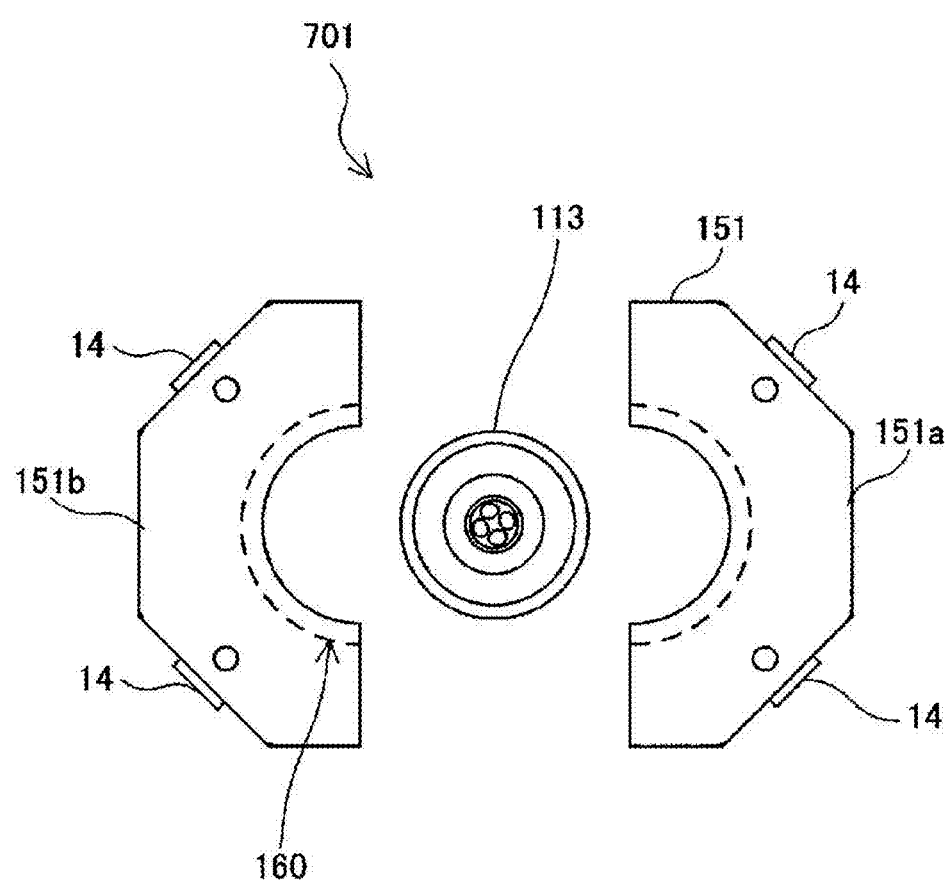
FIG. 42 is an arrow view illustrating a configuration of a cutting tool unit according to the third embodiment of the present disclosure.

FIG. 42 is a diagram illustrating a configuration of a cutting tool unit according to the third embodiment of the present disclosure. Specifically, FIG. 42 is arrow views of an increased-diameter module and a cutting tool in a state in which the increased-diameter module is removed, as viewed from direction A in FIG. 41.

Referring to FIG. 42, body 151 is configured to be dividable into multiple portions in a circumferential direction. In an example illustrated in FIG. 42, body 151 is configured to be dividable into two portions, that is, two arc-shaped portions 151a and 151b each having a substantially semi-circular shape when viewed from direction A.

Arc-shaped portion 151a and arc-shaped portion 151b are coupled to each other by a coupling mechanism (not illustrated). Specifically, for example, arc-shaped portion 151a and arc-shaped portion 151b are coupled with bolts and nuts. Arc-shaped portion 151a and arc-shaped portion 151b have dimensions such that they are tightly fixed to the peripheral surface of shaft portion 113 in a state where arc-shaped portion 151a and arc-shaped portion 151b are coupled to each other.

Strain sensor 14 is mounted to body 151 at a position similar to that of strain sensor 14 illustrated in FIG. 1.

Cutting tool unit 701 can mount and detach increased-diameter module 150 to and from shaft portion 113 by performing coupling and decoupling by the coupling mechanism described above. After increased-diameter module 150 is mounted to shaft portion 113, cutting tool unit 701 can be used in a manner similar to cutting tool 101 illustrated in FIG. 1.

Cutting tool 801 may be another type of cutting tool other than an end mill. For example, cutting tool 801 may be a drill which is a type of milling tool. Further, cutting tool 801 may be a byte which is a type of turning tool.

In this manner, a rigidity of increased-diameter module 150 is locally reduced due to the configuration in which a cylindrical body 151 mountable to the peripheral surface of shaft portion 113 is provided and recessed portion 160 is formed in body 151. Therefore, by performing cutting in a state where increased-diameter module 150 is mounted to shaft portion 113, a strain generated in increased-diameter module 150 during cutting is increased locally.

In addition, the rigidity of increased-diameter module 150 is locally reduced due to the configuration in which increased-diameter module 150 includes the cylindrical body 151 mountable to the peripheral surface of shaft portion 113 and recessed portion 160 formed in body 151. Therefore, by performing cutting in a state where increased-diameter module 150 is mounted to shaft portion 113, a strain generated in increased-diameter module 150 during cutting is increased locally.

Therefore, in the cutting tool unit according to the third embodiment of the present disclosure, by mounting strain sensor 14 to a portion where a rigidity is locally reduced, it is possible to accurately measure a strain caused by cutting, for example, a strain caused by a cutting force, while securing a rigidity necessary for cutting.

The other configuration is the same as that of cutting tool 101 described above, and thus detailed descriptions thereof will not be repeated here.

In addition to the configuration illustrated in FIG. 41, cutting tool unit 701 may further include battery 22, radio communication device 23, and housing 24 as illustrated in FIG. 13. Housing 24 is fixed to increased-diameter module 150 by a fixing member such as a screw, for example.

Further, a cutting system including cutting tool unit 701 may be constructed. Specifically, for example, as compared with cutting system 210 illustrated in FIG. 14, the cutting system according to the third embodiment of the present disclosure includes cutting tool unit 701 illustrated in FIG. 41 instead of cutting tool 101 illustrated in FIG. 4.

Next, another embodiment according to the present disclosure will be described with reference to the drawings. In the drawings, like or corresponding elements are denoted by like reference numerals, and descriptions thereof will not be repeated.

Fourth Embodiment

A fourth embodiment according to the present disclosure relates to a cutting tool unit in which a recessed portion is not formed in a milling cutter and which further includes a mounting module, as compared with milling cutter 503 which is a cutting tool according to another example of the second embodiment. Other than the contents described below, the cutting tool unit of the present embodiment is the same as milling cutter 503 according to another example of the second embodiment.

Figure 43:
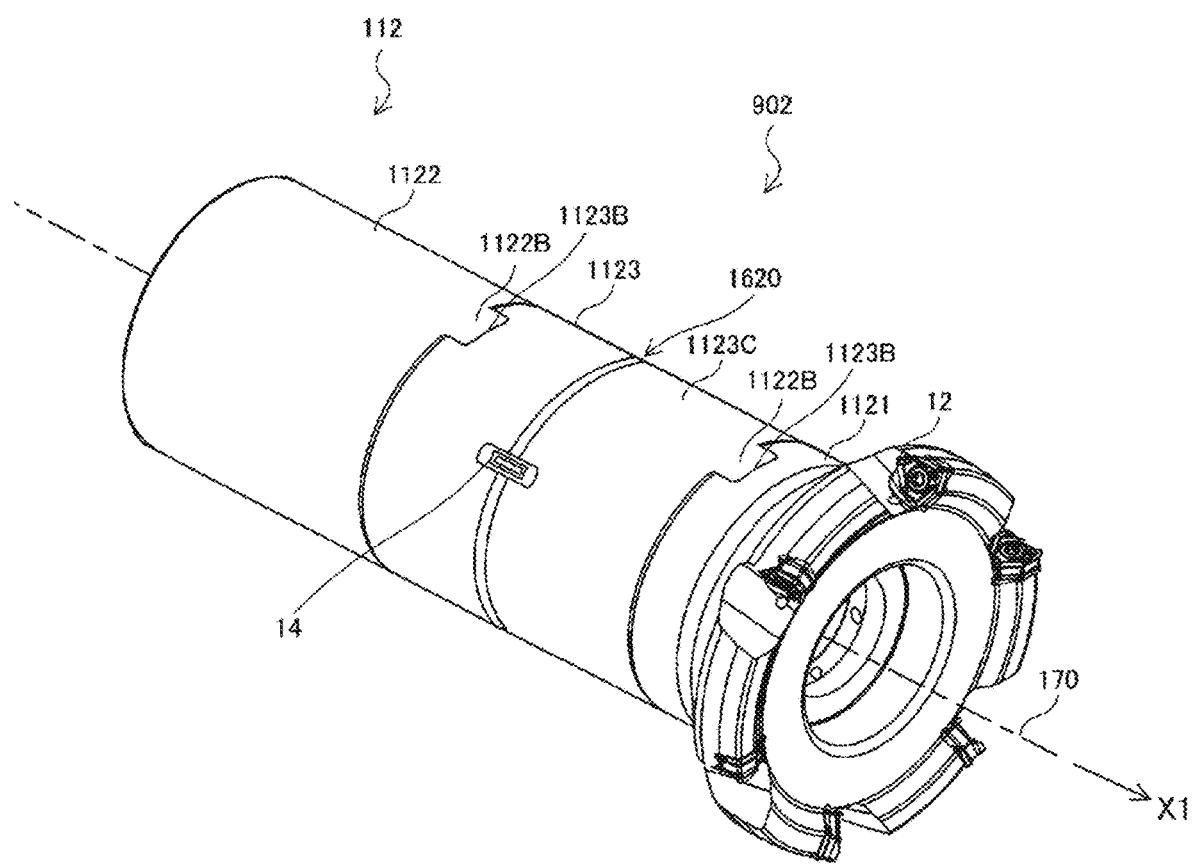
FIG. 43 is a perspective view illustrating a configuration of a cutting tool unit according to a fourth embodiment of the present disclosure.
Figure 44:
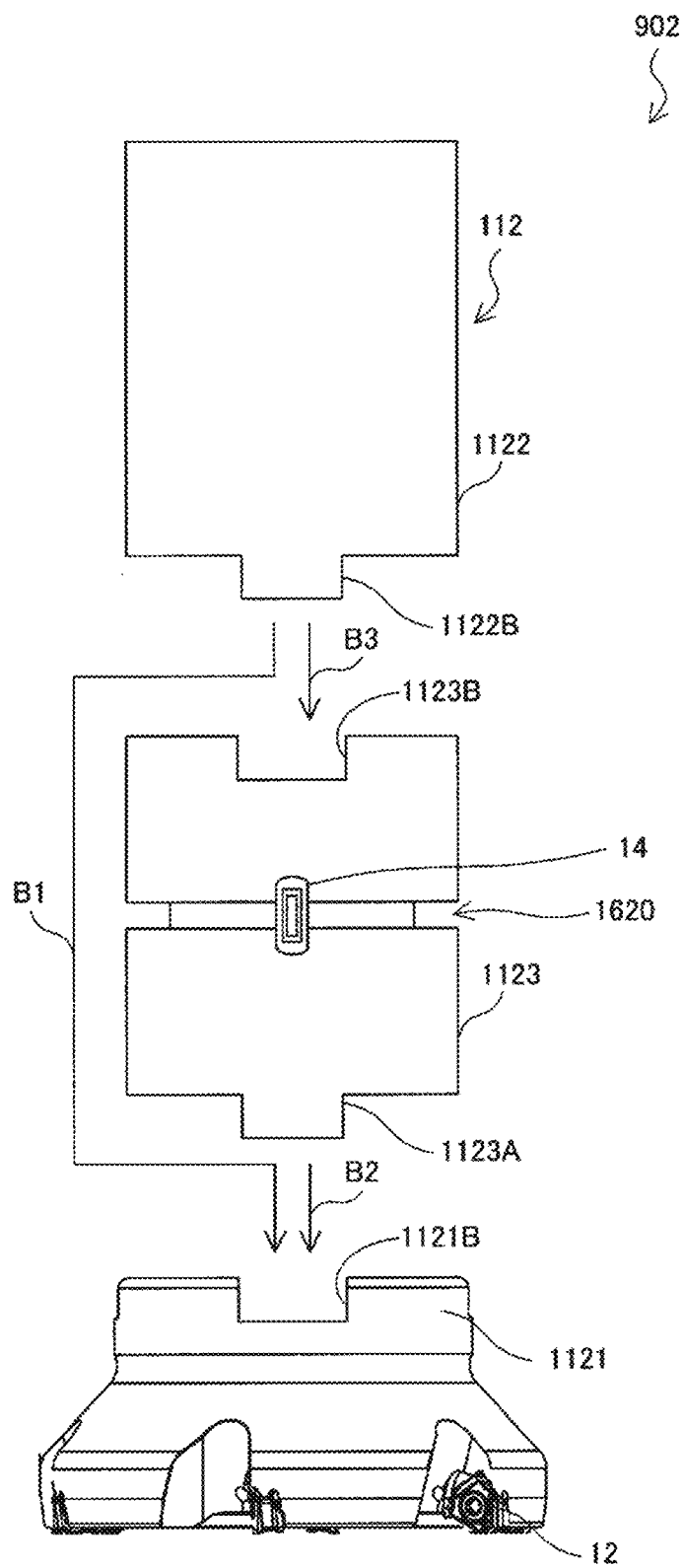
FIG. 44 is a side view illustrating a cutting tool unit according to the fourth embodiment of the present disclosure in a divided state.
Figure 45:
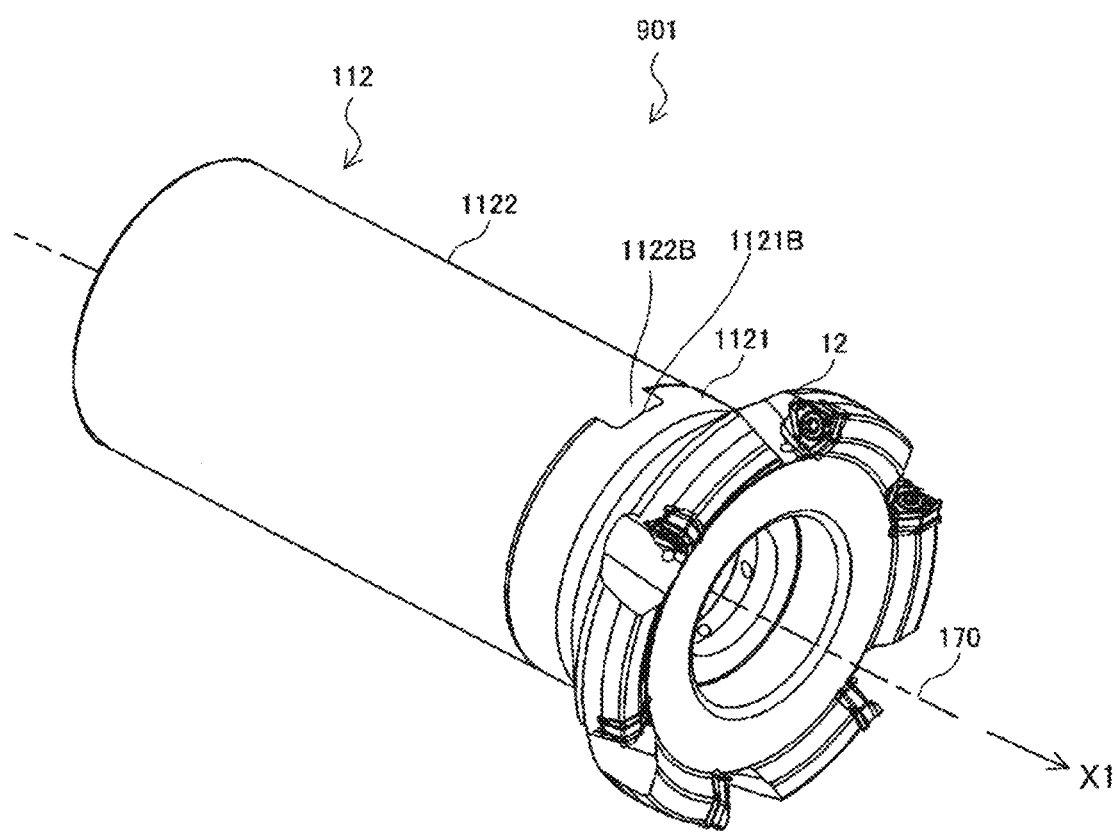
FIG. 45 is a perspective view illustrating a cutting tool according to the fourth embodiment of the present disclosure.

FIG. 43 is a perspective view illustrating a configuration of a cutting tool unit according to the fourth embodiment of the present disclosure. FIG. 44 is a side view illustrating a cutting tool unit according to the fourth embodiment of the present disclosure in a divided state. FIG. 45 is a perspective view illustrating a cutting tool according to the fourth embodiment of the present disclosure.

Referring to FIGS. 43 to 45, a cutting tool unit 902 includes a cutting tool 901 and a mounting module 1123.

Cutting tool 901 includes a shaft portion 112, and blade mounting portion 12 or a blade portion (not illustrated) which is provided at an end portion of shaft portion 112. In an example illustrated in FIG. 45, cutting tool 901 is a milling cutter.

Shaft portion 112 is configured to be dividable in an axial direction of shaft portion 112, specifically, in a direction X1 along a rotational axis 170. Specifically, shaft portion 112 is configured to be dividable into a blade-side portion 1121 which is a portion close to blade mounting portion 12, and an opposite blade-side portion 1122 which is a portion on the opposite side of shaft portion 112 from blade mounting portion 12. In an example illustrated in FIGS. 43 to 45, blade-side portion 1121 is a boss portion, and opposite blade-side portion 1122 is a shaft portion.

Specifically, recessed portion 1121B that is recessed toward blade mounting portion 12 is formed in an end portion on the opposite side of blade-side portion 1121 from blade mounting portion 12. In addition, a protrusion portion 1122B that protrudes toward blade mounting portion 12 is formed in an end portion of opposite blade-side portion 1122 close to blade mounting portion 12.

As indicated by an arrow B1, blade-side portion 1121 and opposite blade-side portion 1122 are connected by engagement between recessed portion 1121B and protrusion portion 1122B. That is, cutting tool 901 is configured. On the other hand, when the screwed engagement between recessed portion 1121B and protrusion portion 1122B is released, shaft portion 112 is divided into blade-side portion 1121 and opposite blade-side portion 1122.

Mounting module 1123 is a member mountable to shaft portion 112. Specifically, mounting module 1123 includes body 1123C, and protrusion portion 1123A and recessed portion 1123B which are mounting portions for mounting body 1123C to shaft portion 112.

Body 1123C is a columnar member that is mountable to blade-side portion 1121 in an axial direction of blade-side portion 1121, specifically, along a rotational axis 170. Specifically, protrusion portion 1123A that protrudes toward blade mounting portion 12 is formed in an end portion of mounting module 1123 close to blade mounting portion 12. Further, recessed portion 1123B that is recessed toward blade mounting portion 12 is formed in an end portion on the opposite side of mounting module 1123 from blade mounting portion 12.

As indicated by an arrow B2, blade-side portion 1121 and mounting module 1123 are connected by engagement of recessed portion 1121B and protrusion portion 1123A. As indicated by an arrow B3, mounting module 1123 and opposite blade-side portion 1122 are connected by engagement of recessed portion 1123B and protrusion portion 1122B. That is, cutting tool unit 902 is configured.

On the other hand, cutting tool unit 902 is divided into blade-side portion 1121, mounting module 1123, and opposite blade-side portion 1122 by releasing the engagement between recessed portion 1121B and protrusion portion 1123A, and the engagement between recessed portion 1123B and protrusion portion 1122B.

Recessed portion 1620 is formed in a peripheral surface of mounting module 1123. Recessed portion 1620 is formed so that when cutting is performed by cutting tool unit 902 in a state where mounting module 1123 is mounted to shaft portion 112 and strain sensor 14 is mounted to mounting module 1123, a strain generated in recessed portion 1620 or in a periphery of recessed portion 1620 can be detected by strain sensor 14.

In an example illustrated in FIGS. 43 and 44, recessed portion 1620 is formed in the circumferential direction of mounting module 1123.

Recessed portion 1620 is formed continuously over the entire periphery in the circumferential direction of mounting module 1123. Recessed portion 1620 may be formed intermittently in the circumferential direction of mounting module 1123. That is, multiple recessed portions 1620 may be formed in a discontinuous state from each other.

In addition, a protrusion portion may be formed in an end portion on the opposite side of blade-side portion 1121 from blade mounting portion 12, and a recessed portion may be formed in an end portion of mounting module 1123 close to blade mounting portion 12. In addition, a protrusion portion may be formed in an end portion on the opposite side of mounting module 1123 from blade mounting portion 12, and a recessed portion may be formed in an end portion of opposite blade-side portion 1122 close to blade mounting portion 12.

The other configuration is the same as that of milling cutter 503 described above, and thus detailed descriptions thereof will not be repeated here.

Cutting tool 901 may be another type of cutting tool other than a milling cutter. For example, cutting tool 901 may be a drill which is a type of milling tool. Furthermore, cutting tool 901 may be a tool bit which is a type of turning tool.

In this manner, with the configuration in which mounting module 1123 includes a columnar body 1123C mountable to shaft portion 112 and recessed portion 1620 is formed in the peripheral surface of body 1123C, a rigidity of mounting module 1123 is locally reduced. Therefore, when cutting is performed in a state where mounting module 1123 is mounted to shaft portion 112, a strain generated in mounting module 1123 during cutting is locally increased.

In addition, with the configuration in which mounting module 1123 includes a columnar body 1123C mountable to shaft portion 112 and mounting module 1123 in which recessed portion 1620 is formed in the peripheral surface of body 1123C, a rigidity of mounting module 1123 is locally reduced. Therefore, when cutting is performed in a state where mounting module 1123 is mounted to shaft portion 112, a strain generated in mounting module 1123 during cutting is locally increased.

Therefore, in the cutting tool unit according to the fourth embodiment of the present disclosure, strain sensor 14 is mounted to a portion of mounting module 1123 where a rigidity is locally reduced, it is possible to accurately measure a strain caused by cutting, for example, a strain caused by a cutting force, while securing a rigidity necessary for cutting.

In addition to the configuration illustrated in FIG. 43, cutting tool unit 902 may further include battery 22, radio communication device 23, and housing 24 as illustrated in FIG. 13. Housing 24 is fixed to mounting module 1123 by a fixing member such as a screw or a bolt.

Further, a cutting system including cutting tool unit 902 may be constructed. Specifically, for example, as compared with cutting system 210 illustrated in FIG. 14, the cutting system according to the fourth embodiment of the present disclosure includes cutting tool unit 902 illustrated in FIG. 43 instead of cutting tool 101 illustrated in FIG. 4.

Next, another embodiment according to the present disclosure will be described with reference to the drawings. In the drawings, like or corresponding elements are denoted by like reference numerals, and descriptions thereof will not be repeated.

Fifth Embodiment

A fifth embodiment according to the present disclosure relates to a cutting tool in which a hollow portion is formed instead of the recessed portion in cutting tool 101 according to the first embodiment. Other than the contents described below, the cutting tool is the same as cutting tool 101 according to the first embodiment.

Figure 46:
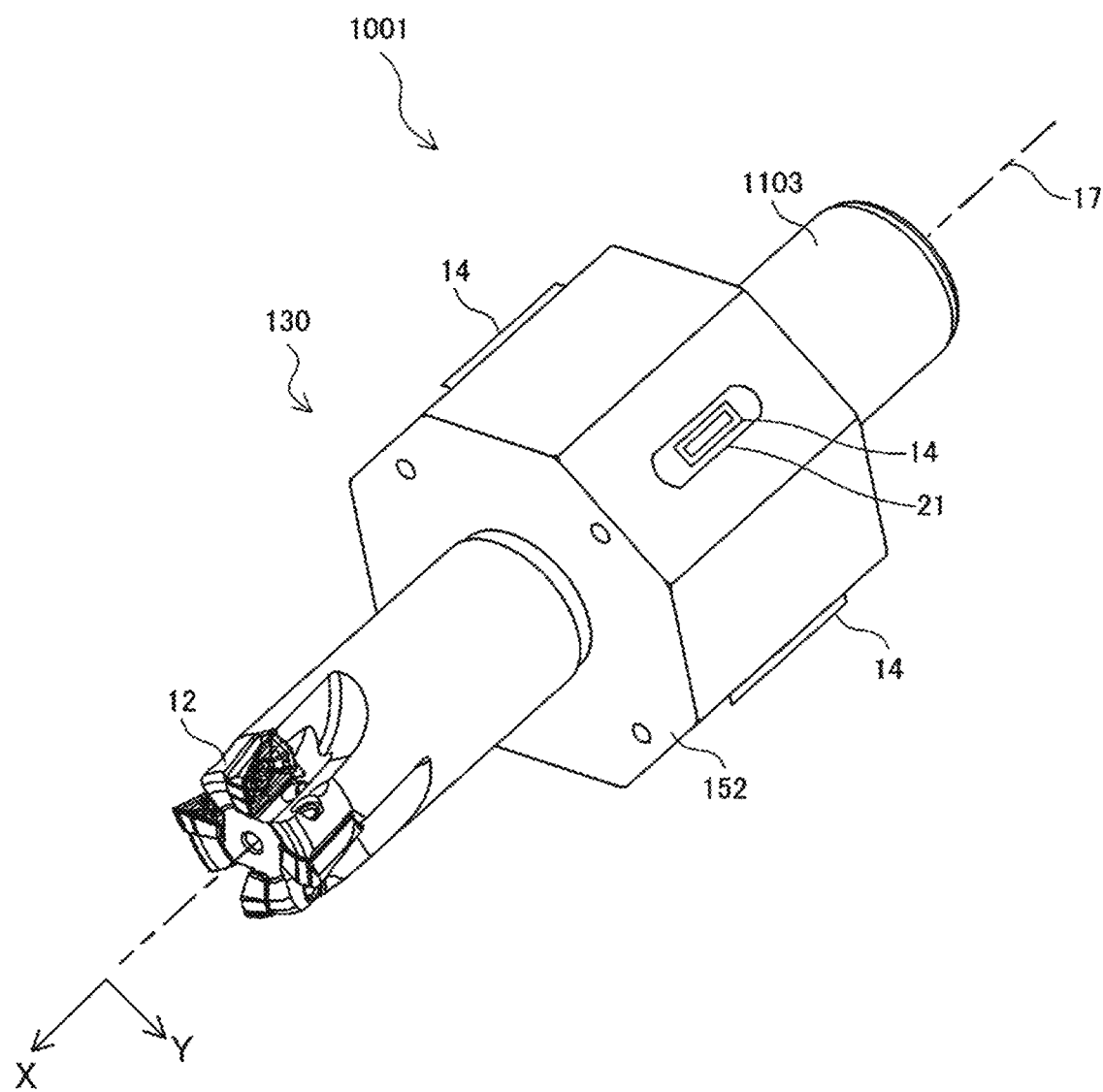
FIG. 46 is a perspective view illustrating a configuration of a cutting tool according to a fifth embodiment of the present disclosure.

FIG. 46 is a perspective view illustrating a configuration of a cutting tool according to the fifth embodiment of the present disclosure.

Referring to FIG. 46, a cutting tool 1001 includes a shaft portion 130, blade mounting portion 12, a blade portion (not illustrated), and strain sensor 14.

Shaft portion 130 includes an increased-diameter portion 152 that has a diameter larger than the other portion of shaft portion 130. Increased-diameter portion 152 has, for example, an octagonal prism shape. A recessed portion is not formed in a peripheral surface of increased-diameter portion 152, and eight surfaces forming the peripheral surface are substantially flat.

Mark (sensor mounting portion) 21 indicating a position where strain sensor 14 is to be mounted is provided on a peripheral surface of increased-diameter portion 152. More specifically, each of the eight surfaces forming the peripheral surface of increased-diameter portion 152 is provided with sensor mounting portion 21. Sensor mounting portion 21 is, for example, a contour line indicating a region where strain sensor 14 is to be mounted. Each strain sensor 14 is arranged point-symmetrically with respect to central axis 17.

Figure 47:
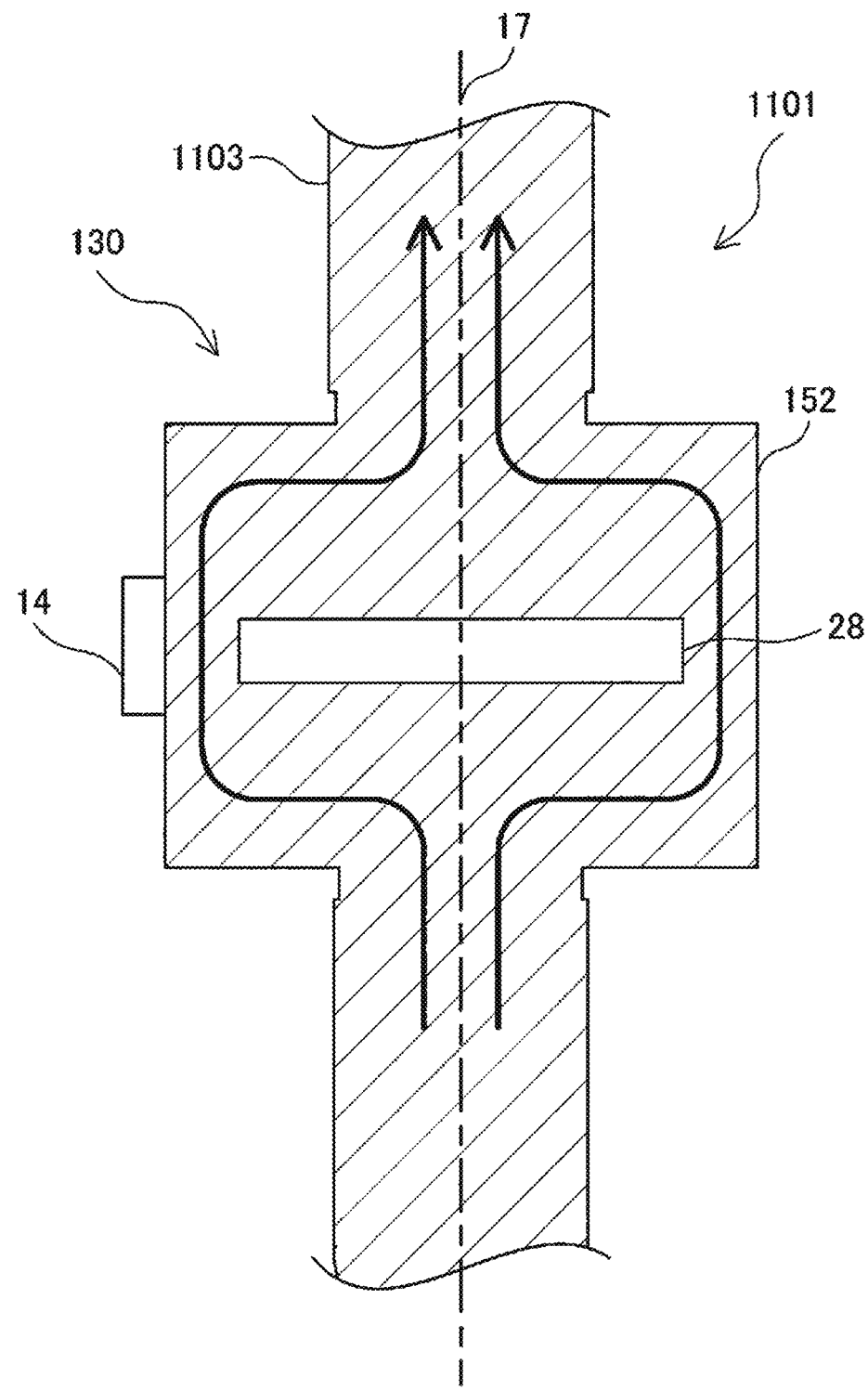
FIG. 47 is a cross-sectional view of the cutting tool in FIG. 46 taken along a plane including the central axis of a shaft portion.

FIG. 47 is a cross-sectional view of the cutting tool in FIG. 46 taken along a plane including the central axis of the shaft portion.

Referring to FIG. 47, increased-diameter portion 152 includes a hollow portion 28 formed inside increased-diameter portion 152. Hollow portion 28 is a sealed space having a substantially columnar shape, formed inside increased-diameter portion 152. However, hollow portion 28 may be a sealed space having a substantially polygonal prism shape, formed inside increased-diameter portion 152, and the shape of hollow portion 28 is not particularly limited to this polygonal prism shape.

A central axis of hollow portion 28 coincides with central axis 17 of shaft portion 130. In a direction of central axis 17, a length of hollow portion 28 is shorter than a length of increased-diameter portion 152. Hollow portion 28 is formed in a central part of increased-diameter portion 152 in the direction of central axis 17. The central part of increased-diameter portion 152 corresponds to the first section. That is, the first section of increased-diameter portion 152 includes hollow portion 28 formed inside the first section. The first section is a part of increased-diameter portion 152 in which hollow portion 28 is formed on the inside of increased-diameter portion 152 in a radial direction, and is a part of increased-diameter portion 152 from one end face to the other end face of hollow portion 28.

In increased-diameter portion 152, of parts adjacent to the first section, a pan close to shank 1103 is a second section, and a part close to blade mounting portion 12 is a third section.

Strain sensor 14 is mounted on the peripheral surface of increased-diameter portion 152 so as to span the first section. When hollow portion 28 is projected onto the peripheral surface of increased-diameter portion 152 in a direction perpendicular to central axis 17, that is, in the radial direction of increased-diameter portion 152, strain sensor 14 overlaps with the projected hollow portion 28. In the first section, strain sensor 14 and hollow portion 28 intersect a plane having central axis 17 as a normal line.

Strain sensor 14 may span the first section in a direction inclined with respect to central axis 17, or may be mounted to increased-diameter portion 152 so as not to span the first section. However, strain sensor 14 is provided near the first section in the peripheral surface of increased-diameter portion 152. More specifically, when hollow portion 28 is projected onto the peripheral surface of increased-diameter portion 152 in the radial direction of increased-diameter portion 152, strain sensor 14 is mounted to a position within 5 mm from the projected hollow portion 28 in a direction of central axis 17.

Hollow portion 28 reduces a cross-sectional secondary moment of the first section in increased-diameter portion 152 and causes the first section to have lower a rigidity than the second section and the third section. By locally reducing a cross-sectional secondary moment of increased-diameter portion 152, a strain generated in increased-diameter portion 152 can be locally increased. Therefore, strain sensor 14 can measure a strain having a value larger than a value measured when strain sensor 14 is mounted to shaft portion 130 at a position other than the first section of increased-diameter portion 152.

Hollow portion 28 also increases a distance from central axis 17 of shaft portion 130 to the position where strain sensor 14 is mounted while locally reducing the rigidity of the increased-diameter portion. Since a strain at a position far from central axis 17 is larger than a strain at a position close to central axis 17, strain sensor 14 can measure a strain having a larger value.

Further, heat generated by cutting process is conducted from the blade portion to shaft portion 130. When the shaft portion is solid, the processing heat is mainly transferred through a portion near the central axis of the shat portion. Therefore, a temperature of the portion near the central axis of the shaft portion is different from a temperature of the peripheral surface of the shaft portion to which the strain sensor is mounted. Therefore, even when the temperature of the peripheral surface of the shaft portion is measured in the peripheral surface of the shaft portion to which the strain sensor is mounted, it is difficult to accurately grasp a thermal strain generated in the shaft portion.

On the other hand, in cutting tool 1001 according to the fifth embodiment, since hollow portion 28 is formed inside increased-diameter portion 152, the processing heat is conducted so as to avoid hollow portion 28 as indicated by an arrow in FIG. 47, and passes through a vicinity of the peripheral surface of increased-diameter portion 152. Therefore, by measuring the temperature of the peripheral surface of shaft portion 130, the thermal strain generated in shaft portion 130 can be grasped, and the strain can be measured more accurately. Cutting tool 1001 can be manufactured by, for example, a metal three dimensional printer.

Figure 48:
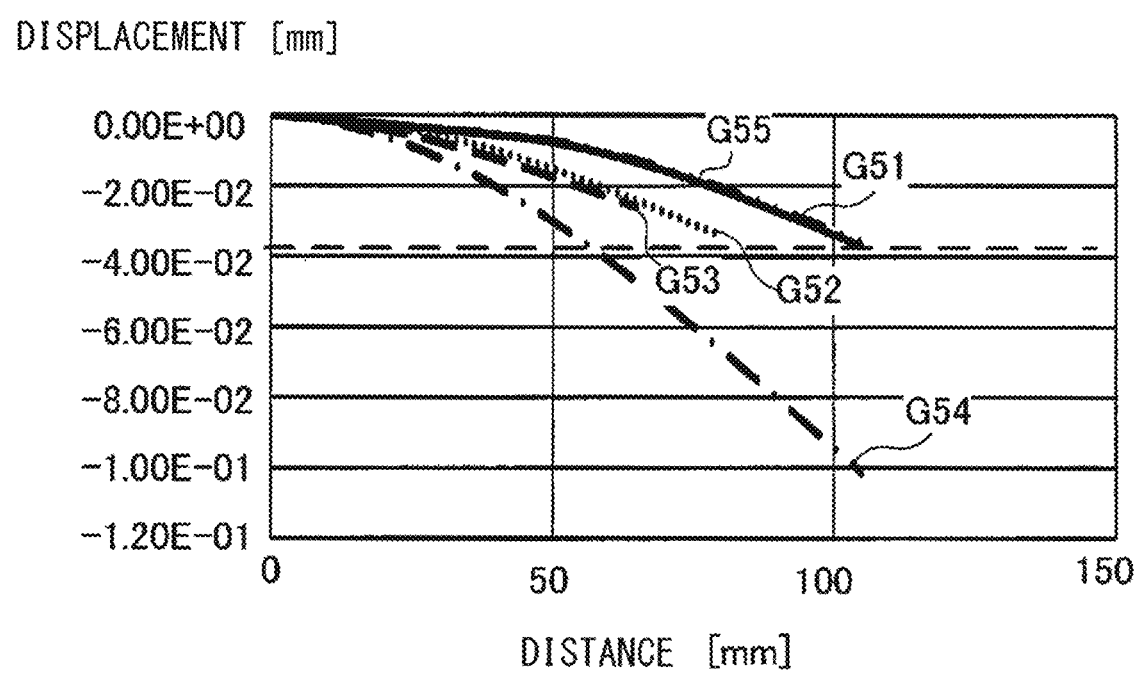
FIG. 48 is a graph illustrating a simulation result of a cutting tool according to the fifth embodiment of the present disclosure.

FIG. 48 is a graph illustrating a simulation result of a cutting tool according to the fifth embodiment of the present disclosure. Specifically, FIG. 48 illustrates a displacement of the entire cantilever beam when Example 14 of cutting tool 1001 according to the fifth embodiment. Example 1 of cutting tool 101 according to the first embodiment, and three Comparative Examples 1 to 3 are regarded as cantilever beams and the same load is applied to a tip portion of each of the cantilever beams. In addition, in all of Examples 1 and 14, and Comparative Examples 1 to 3, in order to simplify a calculation, each cutting tool has a shaft portion having a quadrangular prism shape, including an increased-diameter portion. In FIG. 48, Examples 1 and 14, and Comparative Examples 1 to 3 correspond to graphs G51 to G55, respectively. Since the difference between the displacements of Example 1 and Comparative Example 3 is small, graphs G51 and G55 overlap each other in the drawing.

Conditions of Example 1, and Comparative Examples 1 and 2 are the same as those of the first embodiment.

Conditions of Example 14 and Comparative Example 3 areas follows. In Comparative Example 3, as compared with Comparative Example 1, the length is extended by 40 mm as a length of an area where strain sensor 14 is to be mounted, and the extended portion is an increased-diameter portion whose diameter is increased in a quadrangular prism shape. The increased-diameter portion has a square cross section with one side having a length of 55 mm. A recessed portion and a hollow portion are not formed in the increased-diameter portion.

In Example 14, as compared with Comparative Example 1, the length is extended by 15 mm as a length of an area where strain sensor 14 is to be mounted, and the extended portion is an increased-diameter portion 152 whose diameter is increased in a quadrangular prism shape. Increased-diameter portion 152 has a square cross section with one side having a length of 30 mm. Further, in Example 14, hollow portion 28 having a columnar shape is formed inside increased-diameter portion 152 instead of a recessed portion. Hollow portion 28 has a length of 3 mm in the direction of central axis 17 and a diameter of 25 mm.

Referring to FIG. 48, it can be seen that in Example 14, even when hollow portion 28 is formed in increased-diameter portion 152, a displacement of the cutting edge is suppressed to be small, approximately −0.04 mm, which is substantially equal to that of Example 1.

Figure 49:
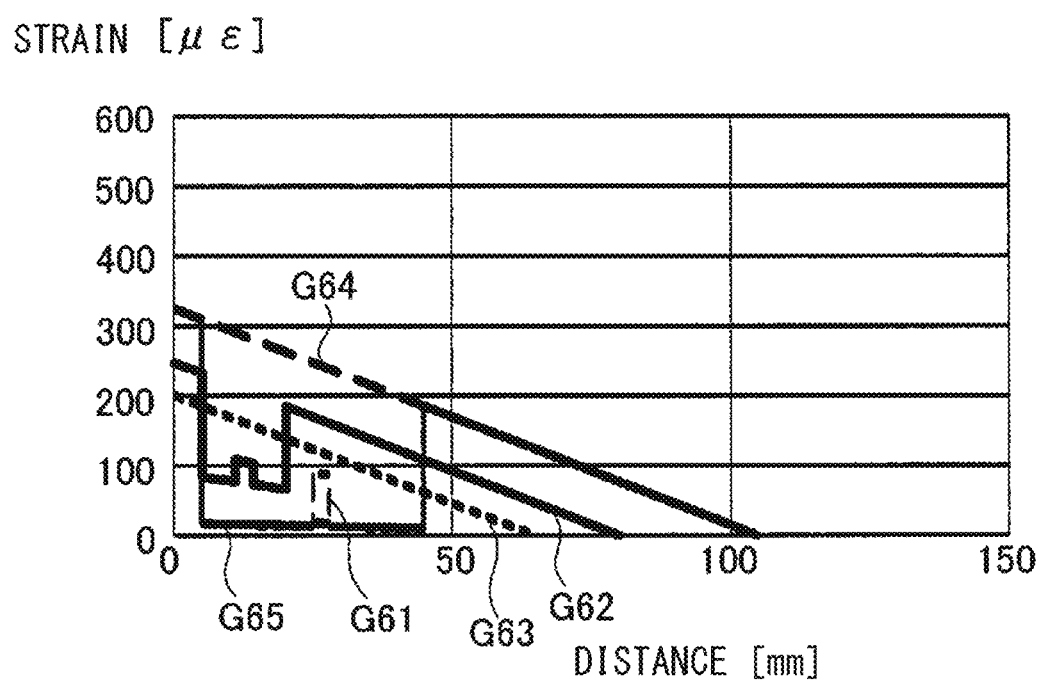
FIG. 49 is a graph illustrating a simulation result of a cutting tool according to the fifth embodiment of the present disclosure.

FIG. 49 is a graph illustrating a simulation result of a cutting tool according to the fifth embodiment of the present disclosure. Specifically. FIG. 49 illustrates a strain generated in a shaft portion when the same load is applied to a tip portion in each of Examples 1 and 14, and Comparative Examples 1 to 3. In FIG. 49, Examples 1 and 14, and Comparative Examples 1 to 3 correspond to graphs G61 to G65, respectively.

Referring to FIG. 49, when hollow portion 28 is formed as in Example 14, a numerical variation in strain is larger than that in Embodiment 1. Since the effect of amplifying a strain depends not on an absolute value of strain but on a ratio of change in strain, it can be seen that the effect of amplifying a strain in Example 14 is larger than that in Example 1. It can also be seen that the strain of Example 14 is greater than the strain of Example 1.

Figure 50:
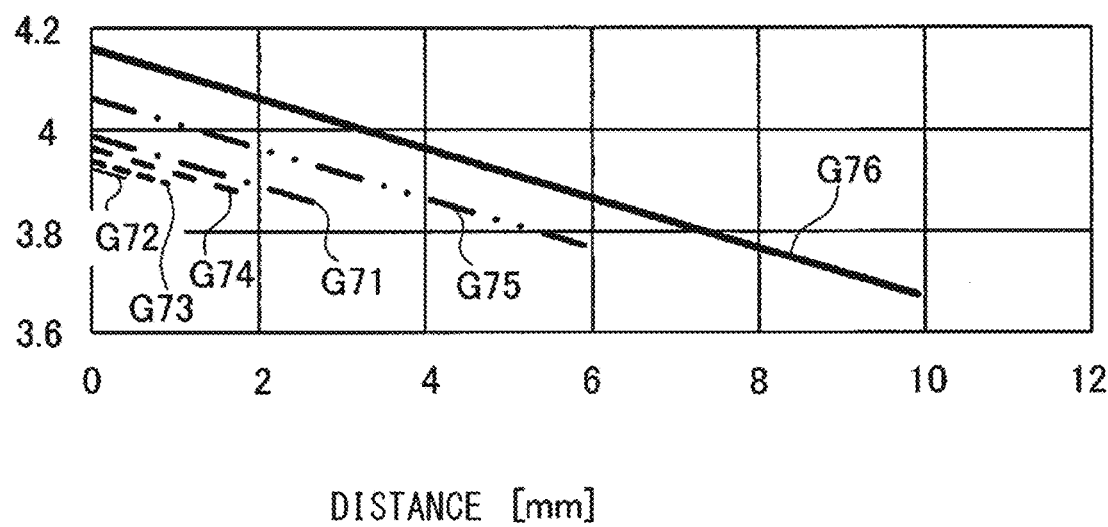
FIG. 50 is a graph illustrating a simulation result of a shape of a hollow portion of a cutting tool according to the fifth embodiment of the present disclosure.

FIG. 50 is a graph illustrating a simulation result of a shape of a hollow portion of a cutting tool according to the fifth embodiment of the present disclosure. Specifically, FIG. 50 illustrates a degree of influence of a length of hollow portion 28 in the direction of central axis 17 on a stress distribution of strain sensor 14 when Examples 15 to 20 of cutting tools according to the fifth embodiment are regarded as cantilever beams and the same load is applied to a tip portion of each of the cantilever beams. Here, strain sensor 14 is mounted to increased-diameter portion 152 so as to span the first section in which hollow portion 28 is formed.

A horizontal axis and a vertical axis in FIG. 50 respectively represent a distance toward a base portion from an end portion close to the tip portion of each of the cantilever beams to each of multiple sampling positions in a portion of strain sensor 14 spanning the first section, that is, in a portion of strain sensor 14 over the first section, and a stress generated at each of the multiple sampling positions. In FIG. 50, Examples 15 to 20 correspond to graphs G71 to G76, respectively. Conditions of Examples 15 to 20 areas follows.

In Example 15, as compared with Comparative Example 1 described above, the length is extended by 40 mm as a length of an area where strain sensor 14 is to be mounted, and the extended portion is increased-diameter portion 152 whose diameter is increased in a quadrangular prism shape. Increased-diameter portion 152 has a square cross section with one side having a length of 55 mm. In Example 15, hollow portion 28 having a columnar shape is formed inside increased-diameter portion 152 instead of a recessed portion. Hollow portion 28 has a length of 3 mm in the direction of central axis 17 and a diameter of 45 mm.

In Examples 16 to 20, each increased-diameter portion 152 has a regular square prism shape. Surfaces of the peripheral surface of increased-diameter portion 152 that face each other are spaced apart by 55 mm. In Examples 16 to 20, columnar hollow portion 28 is formed inside each increased-diameter portion 152. A diameter of each hollow portion 28 in Examples 16 to 20 is 45 mm as in Example 14.

In Example 16, a length of hollow portion 28 in the direction of central axis 17 is 0.5 mm. In Example 17, a length of hollow portion 28 in the direction of central axis 17 is 1.0 mm. In Example 18, a length of hollow portion 28 in the direction of central axis 17 is 2.0 mm. In Example 19, a length of hollow portion 28 in the direction of central axis 17 is 6.0 mm. In Example 20, a length of hollow portion 28 in the direction of central axis 17 is 10.0 mm. In Examples 15 to 20, other conditions are identical.

Referring to FIG. 50, when magnitudes of strains at a distance of 0 mm, for example, in Examples 16 to 20 on the basis of Example 15 are compared, each magnitude of strains in Examples 16 to 20 is within about 5% with respect to the magnitude of a strain in Example 15. That is, it can be seen that the degrees of amplification of strain in Examples 16 to 20 are substantially the same as that in Example 15.

Figure 51:
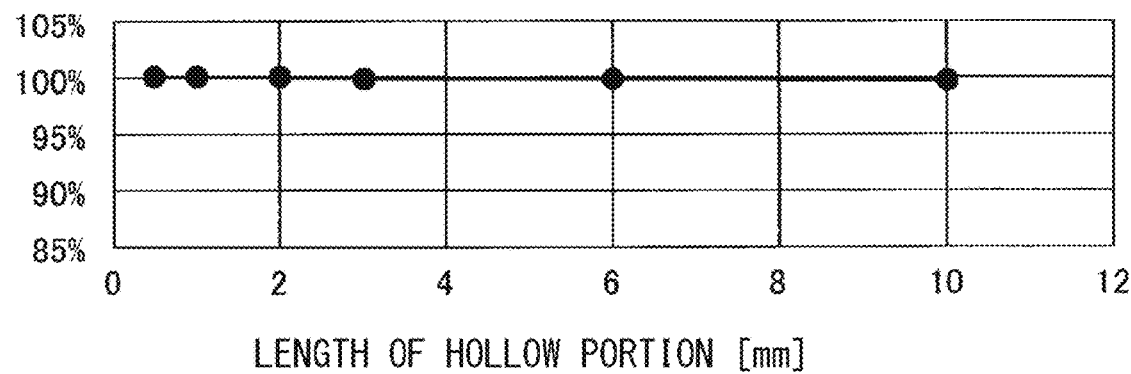
FIG. 51 is a graph illustrating a simulation result of a shape of a hollow portion of a cutting tool according to the fifth embodiment of the present disclosure.

FIG. 51 is a graph illustrating a simulation result of a shape of a hollow portion of a cutting tool according to the fifth embodiment of the present disclosure. Specifically, FIG. 51 illustrates a degree of influence of a length of hollow portion 28 in the direction of central axis 17 on a rigidity ratio of a tip portion when six Examples 15 to 20 of cutting tools 1001 according to the fifth embodiment are regarded as cantilever beams and rigidities of the tip portions obtained upon applying the same loads to the respective tip portions are compared. In FIG. 51, a horizontal axis and a vertical axis represent a length of hollow portion 28 in the direction of central axis 17 and a rigidity ratio on the basis of Example 15, respectively.

Referring to FIG. 51, rigidities of cutting tools in Examples 16 to 20 were almost the same as the rigidity of a cutting tool in Example 15.

Figure 52:
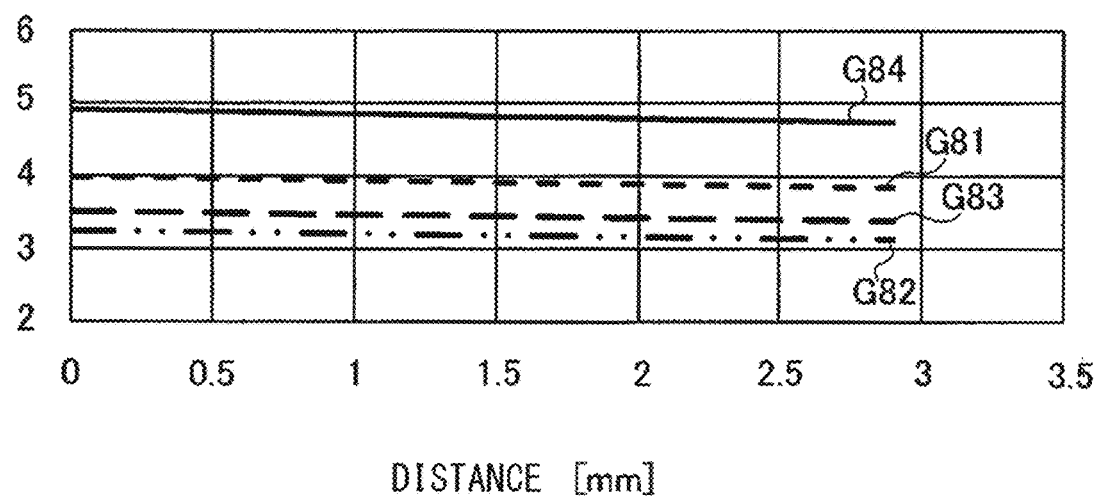
FIG. 52 is a graph illustrating a simulation result of a shape of a hollow portion of a cutting tool according to the fifth embodiment of the present disclosure.

FIG. 52 is a graph illustrating a simulation result of a hollow portion of a cutting tool according to the fifth embodiment of the present disclosure. Specifically, FIG. 52 illustrates a degree of influence of a diameter of columnar hollow portion 28 on a stress distribution of strain sensor 14 when four Examples 15 and 21 to 23 of cutting tools 1001 according to the fifth embodiment are regarded as cantilever beams and the same load is applied to a tip portion of each of the cantilever beam. Here, strain sensor 14 is mounted to increased-diameter portion 152 so as to span the first section in which hollow portion 28 is formed.

A horizontal axis and a vertical axis in FIG. 52 respectively represent a distance toward a base portion from an end portion close to the tip portion of each of the cantilever beams to each of multiple sampling positions in a portion of strain sensor 14 spanning the first section, that is, on a portion of the first section in increased-diameter portion 152, and a stress generated at each of the sampling positions. In FIG. 52, Examples 15 and 21 to 23 correspond to graphs G81 to G84, respectively.

Conditions of Example 15 are as described above. Conditions of Examples 21 to 23 are as follows. Diameters of hollow portions 28 in Examples 21 to 23 are 35 mm, 40 mm, and 50 mm, respectively. Further, lengths of hollow portions 28 of Examples 15 and 21 to 23 in the direction of central axis 17 are 3 mm. In Examples 15 and 21 to 23, other conditions are identical.

Referring to FIG. 52, when hollow portion 28 was 35 mm in diameter, a stress was about 3.2 MPa and was generally constant from one end portion of strain sensor 14 to the other end portion. When hollow portion 28 was 40 mm in diameter, a stress was in the range of about 3.1 MPa to 3.5 MPa, and no significant change in strain has been observed from one end portion to the other end portion of strain sensor 14. When hollow portion 28 was 40 mm in diameter, a stress was in the range of about 3.8 MPa to 4.0 MPa, and no significant change in strain has been observed from one end portion to the other end portion of strain sensor 14. When hollow portion 28 was 50 mm in diameter, a stress was in the range of about 4.7 MPa to 4.9 MPa, and no significant change in strain has been observed from one end portion to the other end portion of strain sensor 14. When the diameter of hollow portion 28 is changed from 35 mm to 50 mm, the stress is amplified by about 1.5 times.

Figure 53:
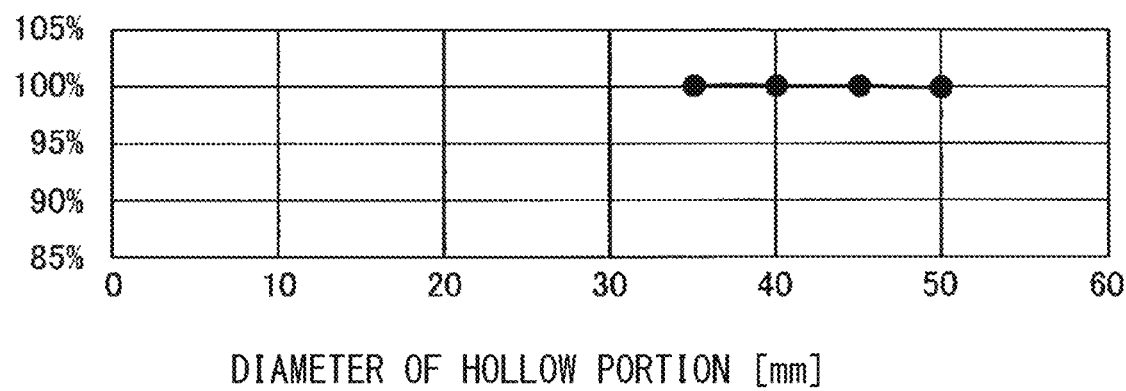
FIG. 53 is a graph illustrating a simulation result of a shape of a hollow portion of a cutting tool according to the fifth embodiment of the present disclosure.

FIG. 53 is a graph illustrating a simulation result of a shape of a hollow portion of a cutting tool according to the fifth embodiment of the present disclosure. Specifically, FIG. 53 illustrates a degree of influence of a diameter of hollow portion 28 on a rigidity ratio of a tip portion when four Examples 15 and 21 to 23 of cutting tool 1001 according to the fifth embodiment are regarded as cantilever beams and rigidities of the tip portions obtained upon applying the same load to the respective tip portions are compared. In FIG. 53, a vertical axis represents a rigidity ratio on the basis of Example 15. A horizontal axis represents a diameter of hollow portion 28.

Referring to FIG. 53, the rigidities of the cutting tools in Examples 21 to 23 were almost the same as the rigidity of the cutting tool in Example 15.

From the above results, it can be seen that cutting tool 1001 in which hollow portion 28 is formed inside increased-diameter portion 152 has a rigidity equivalent to that of the cutting tool in which the recessed portion is formed in the peripheral surface of increased-diameter portion 152. However, the variation in the magnitude of the strain in Example 15 is larger than the variation in the magnitude of the strain in Example 1. Therefore, it can be seen that the cutting tool in which hollow portion 28 is formed has a larger absolute value of strain and a larger effect of amplifying a strain than the cutting tool in which the recessed portion is formed.

Modification 1

Figure 54:
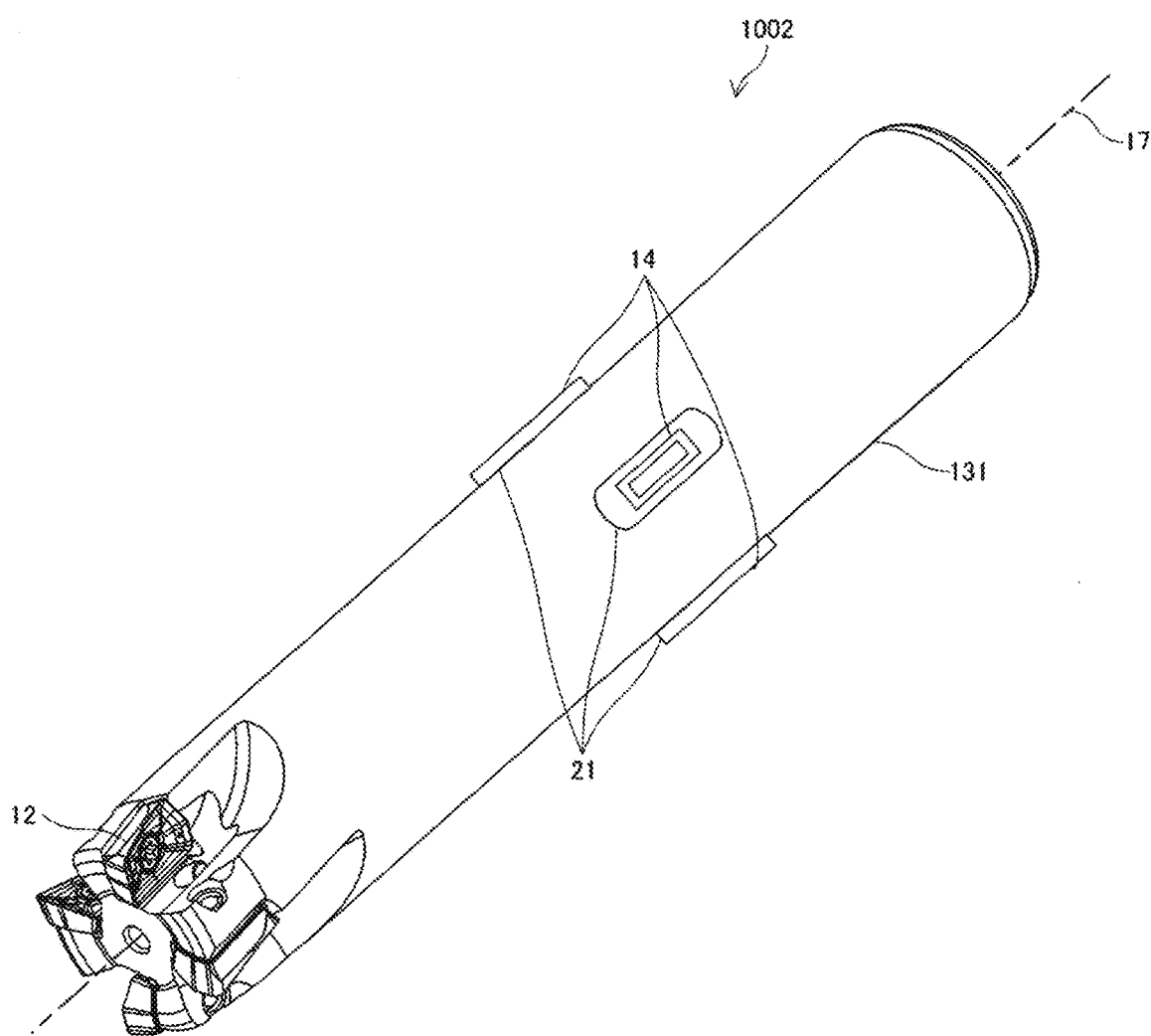
FIG. 54 is a perspective view illustrating a configuration of a cutting tool according to a first modification of the fifth embodiment of the present disclosure.

FIG. 54 is a perspective view illustrating a configuration of a cutting tool according to a first modification of the fifth embodiment of the present disclosure.

Referring to FIG. 54, a cutting tool 1002 includes a shaft portion 131 instead of shaft portion 130, as compared with cutting tool 1001 illustrated in FIG. 46. Further, an increased-diameter portion is not formed in shaft portion 131.

Figure 55:
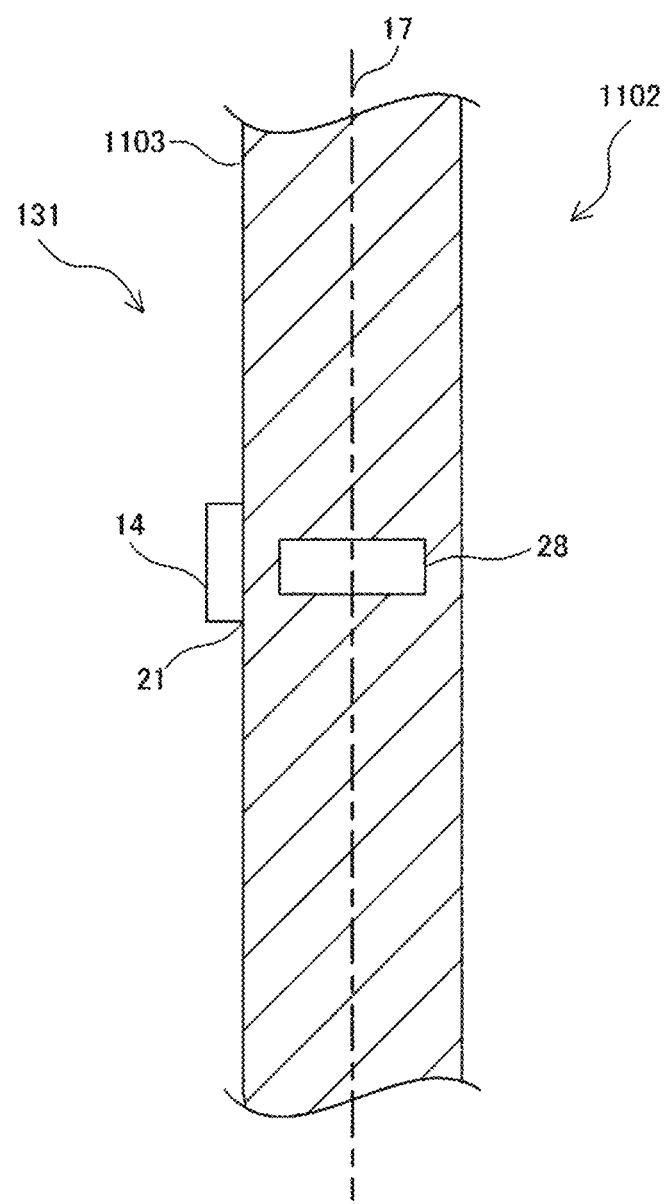
FIG. 55 is a cross-sectional view of a cutting tool according to the first modification of the fifth embodiment of the present disclosure taken along a plane including the central axis of a shaft portion.

FIG. 55 is a cross-sectional view taken along a plane including a central axis of a shaft portion of a cutting tool according to the first modification of the fifth embodiment of the present disclosure.

Referring to FIG. 55, shaft portion 131 includes hollow portion 28 formed inside shaft portion 131 and sensor mounting portion 21 to which strain sensor 14 is mountable at a peripheral surface of shaft portion 131.

Sensor mounting portion 21 overlaps hollow portion 28 when hollow portion 28 is projected onto the peripheral surface of shaft portion 131 in a direction perpendicular to the direction of central axis 17 of shaft portion 131. Details of hollow portion 28 are similar to those described above, and will not be described in detail in the first modification. In short, cutting tool 1002 according to the first modification of the fifth embodiment is obtained by replacing the recessed portion of the cutting tool according to the second embodiment with hollow portion 28.

Even in such a configuration, as described above, a strain generated in shaft portion 131 can be locally increased by locally reducing a cross-sectional second moment of shaft portion 131. Further, since the processing heat passes through a vicinity of the peripheral surface of shaft portion 131, by measuring a temperature of the peripheral surface of shaft portion 131, a thermal strain generated in shaft portion 131 can be grasped, and the strain can be measured more accurately.

The above-described embodiments are to be considered in all respects as illustrative and not restrictive. The scope of the present invention is defined not by the above description but by the scope of claims, and is intended to include all modifications within the meaning and scope equivalent to the scope of claims.

For example, in the cutting tools according to the second embodiment, the shaft portion may be integral to a holder.

Figure 56:
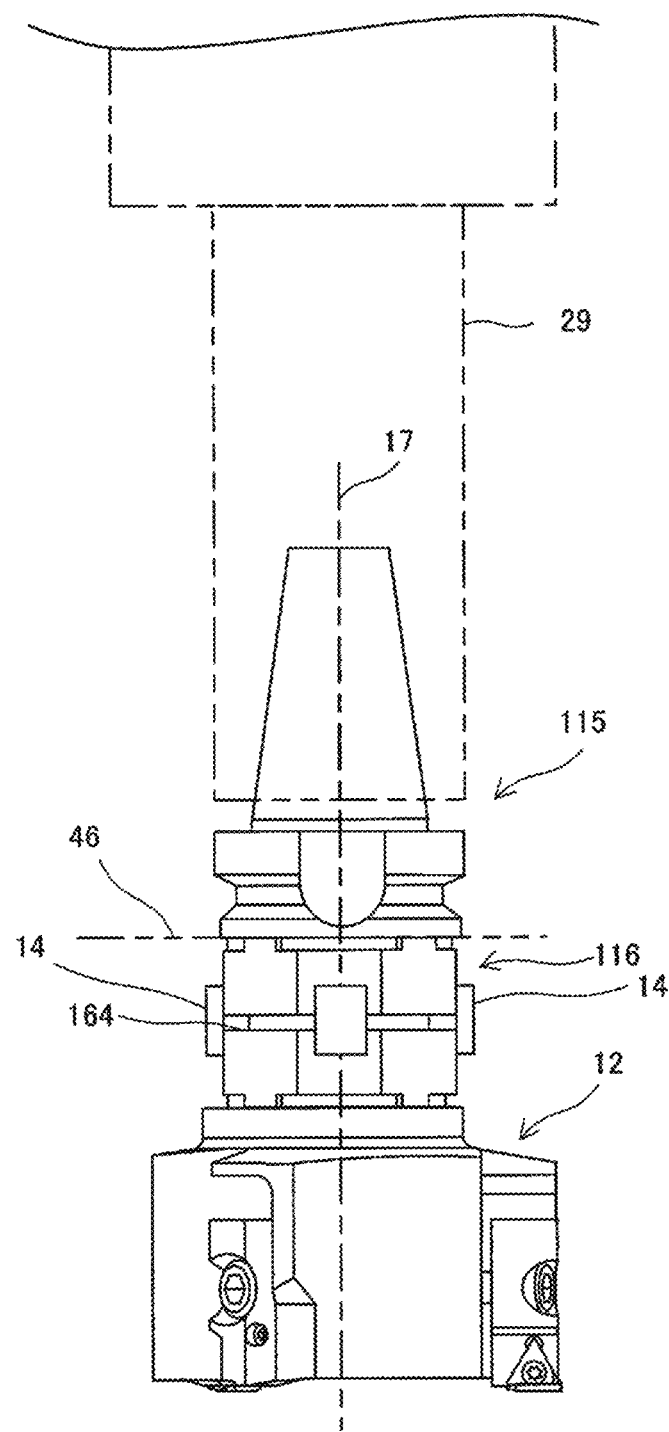
FIG. 56 is a side view illustrating another example of a cutting tool according to the second embodiment of the present disclosure.

FIG. 56 is a side view illustrating another example of a cutting tool according to the second embodiment of the present disclosure. Referring to FIG. 56, a cutting tool 505 includes a holder portion 115, a shaft portion 116, and blade mounting portion 12.

Holder portion 115 is mounted to a main shaft 29 of a cutting device. An upper portion of holder portion 115 has a truncated cone shape, and a lower portion of holder portion 115 has a cylindrical shape whose center is constricted.

Shaft portion 116 has an octagonal prism shape and includes recessed portion 164 formed in the circumferential direction of shaft portion 116 at the center in a direction of a central axis. One end of shaft portion 116 is connected to holder portion 115. Shaft portion 116 is fixed to holder portion 115 by a screw or other components and is thus integral to holder portion 115. A diameter of shaft portion 116, that is, a diagonal line on an end face of the octagonal prism, is equal to or smaller than a diameter of holder portion 115. In FIG. 56, a boundary between shaft portion 116 and holder portion 115 is indicated by a chain double-dashed line 46.

Blade mounting portion 12 is fixed to the other end of shaft portion 116 by a screw or other components. A connecting portion of blade mounting portion 12 that connects to shaft portion 116 has a columnar shape. The diameter of the connecting portion of blade mounting portion 12 is the same as or larger than the diameter of shaft portion 116.

The above descriptions include the features noted below.

[Supplementary Note 1]

A cutting tool including:

a shaft portion, wherein the shaft portion includes an increased-diameter portion having a diameter larger than a diameter of other portion of the shaft portion, wherein the increased-diameter portion includes a recessed portion formed in a peripheral surface of the increased-diameter portion, wherein the recessed portion is formed in a circumferential direction of the increased-diameter portion, and wherein the cutting tool further including:
  a strain sensor mountable to the shaft portion,
    wherein the strain sensor is mounted so as to span the recessed portion.

[Supplementary Note 2]
A cutting tool including:
a shall portion,
wherein the shaft portion includes:
  a recessed portion formed in a peripheral surface of the shaft portion; and
  a sensor mounting portion that is provided near the recessed portion and to which a strain sensor is mountable,
  wherein the recessed portion is formed in a circumferential direction of the increased-diameter portion, and
wherein the cutting tool further including:
  a strain sensor mountable to the shaft portion,
    wherein the strain sensor is mounted so as to span the recessed portion.

[Supplementary Note 3]
A module mountable to a shaft portion of a cutting tool including the shaft portion, the module including:
a body having a cylindrical shape allowing insertion of the shaft portion, the body being mountable to the shaft portion so that an inner peripheral surface of the body covers a peripheral surface of the shaft portion,
wherein the body includes a recessed portion formed in an outer peripheral surface of the body, and
wherein the module further includes:
  a strain sensor mountable to the module,
    wherein the strain sensor is mounted so as to span the recessed portion.

[Supplementary Note 4]
A module mountable to a shaft portion of a cutting tool including the shaft portion, the module including:
a body having a columnar shape, the body being mountable to the shaft portion in an axial direction of the shaft portion,
wherein the body includes:
  a recessed portion formed in a peripheral surface of the body, and
  a sensor mounting portion that is provided near the recessed portion and to which a strain sensor is mountable, and
wherein the module further includes:
  a strain sensor mountable to the module,
    wherein the strain sensor is mounted so as to span the recessed portion.

[Supplementary Note 5]
A cutting tool unit including:
a cutting tool including a shaft portion; and
the module according to Supplementary Note 3 or Supplementary Note 4,
wherein the strain sensor is mounted so as to span the recessed portion.

[Supplementary Note 6]
A cutting system including:
the cutting tool according to Supplementary Note 1 or Supplementary Note 2; and
a management device,
wherein the cutting tool transmits sensor information indicating a measurement result of the strain sensor, and
wherein the management device receives the sensor information from the cutting tool and analyzes the measurement result indicated by the sensor information, and
wherein the strain sensor is mounted so as to span the recessed portion.

[Supplementary Note 7]
A cutting system including:
the cutting tool unit according to Supplementary Note 5 or Supplementary Note 6; and
an analysis device,
wherein the cutting tool transmits sensor information indicating a measurement result of the strain sensor,
wherein the analysis device receives the sensor information from the cutting tool and analyzes the measurement result indicated by the received sensor information, and
wherein the strain sensor is mounted so as to span the recessed portion.

[Supplementary Note 8]
A cutting tool including:
a shaft portion,
wherein the shaft portion includes an increased-diameter portion whose diameter is increased in a direction perpendicular to an axial direction, in an area of the shaft portion along the axial direction, and
wherein the increased-diameter portion includes a recessed portion formed in a peripheral surface of the increased-diameter portion.

11, 110 to 113, 121 to 123, 130 shaft portion
1101 cutting-side section
1102 gripping-side section
1103 shank
12 blade mounting portion
14 strain sensor
15, 152 increased-diameter portion
16, 161, 162, 1620 recessed portion
17 central axis
18, 20 plane
19 intersection point
21 mark (sensor mounting portion)
22 battery
23 radio communication device
24 housing
25 bottom plate portion
26 side wall portion
27 recessed portion
28 hollow portion
101, 201, 301, 401, 501 to 504, 601, 901, 1001, 1002 cutting tool
112 shaft portion
120 boss portion
125 body portion
141 end portion close to tip portion of cantilever beam in a portion of strain sensor over recessed portion
150 increased-diameter module
151, 1123C body
170 rotational axis
210 cutting system
211 cutting device
213 management device
214 radio communication unit
215 control unit
216 storage unit
217 operation input unit
218 display unit
1121 blade-sideblade-side portion
1121B, 1123B recessed portion
1122 blade-side opposite blade-side portion
1122B, 1123A protrusion portion
1123 mounting module 701, 801 cutting tool unit
P sampling position

The invention claimed is:

1. A cutting tool comprising:
a shaft portion; and
a strain sensor mounted to the shaft portion,
wherein the shaft portion includes
at least one recessed portion recessed inwardly from a peripheral surface of the shaft portion, and
a sensor mounting portion outside of and adjacent to the at least one recessed portion and to which the strain sensor is mounted,
wherein the strain sensor is mounted to the shaft portion at the sensor mounting portion so as to span the at least one recessed portion such that one end of the strain sensor is on the shaft portion at one side of the at least one recessed portion and another end of the strain sensor is on the shaft portion at another side of the at least one recessed portion.

2. The cutting tool according to claim 1, wherein the at least one recessed portion is formed in a circumferential direction of the shaft portion, and has a rectangular shape when viewed in a cross section including a central axis of the shaft portion.

3. The cutting tool according to claim 1, wherein, in a plane in which a central axis of the shaft portion is a normal line, the at least one recessed portion has a shape that is point-symmetrical with respect to an intersection point where the central axis and the plane intersect each other.

4. The cutting tool according to claim 1, wherein, in a plane in which a central axis of the shaft portion is a normal line, the shaft portion includes at least one set of the recessed portions provided at positions that are point-symmetrical with respect to an intersection point where the central axis and the plane intersect each other.

5. The cutting tool according to claim 4, wherein the one set of the recessed portions have identical widths and identical depths.

6. The cutting tool according to claim 1, wherein a shape of a bottom surface of the at least one recessed portion in a cross section including a central axis of the shaft portion is rounded.

7. The cutting tool according to claim 1, wherein the shaft portion is provided with a mark indicating a position where a strain sensor is to be mounted.

8. The cutting tool according to claim 1, wherein
the shaft portion includes a normal-diameter portion and an increased-diameter portion, a diameter of the increased diameter portion being greater than a diameter of the normal-diameter portion,
the at least one recessed portion is in the increased-diameter portion, and
a distance from a bottom surface of the at least one recessed portion to a central axis of the shaft portion is greater than or equal to a radius of a portion of the shaft portion other than the increased-diameter portion.

9. The cutting tool according to claim 1, wherein
the shaft portion includes a normal-diameter portion and an increased-diameter portion, a diameter of the increased diameter portion being greater than a diameter of the normal-diameter portion,
the at least one recessed portion is in the increased-diameter portion, and
a distance from a bottom surface of the at least one recessed portion to a central axis of the shaft portion is less than a radius of a portion of the shaft portion other than the increased-diameter portion.

10. The cutting tool according to claim 2, wherein a width of the at least one recessed portion is 0.1 mm or greater and 10 mm or less.

11. The cutting tool according to claim 2, wherein a depth of the at least one recessed portion is 2 mm or greater and 40 mm or less.

* * * * *